Nov. 21, 1967  R. A. BURGY  3,353,631
ELEVATOR DISPATCH CONTROL USING INTEGRATED STOP TIME AS A
MEASURE OF TRAFFIC
Original Filed Feb. 21, 1957  26 Sheets-Sheet 1
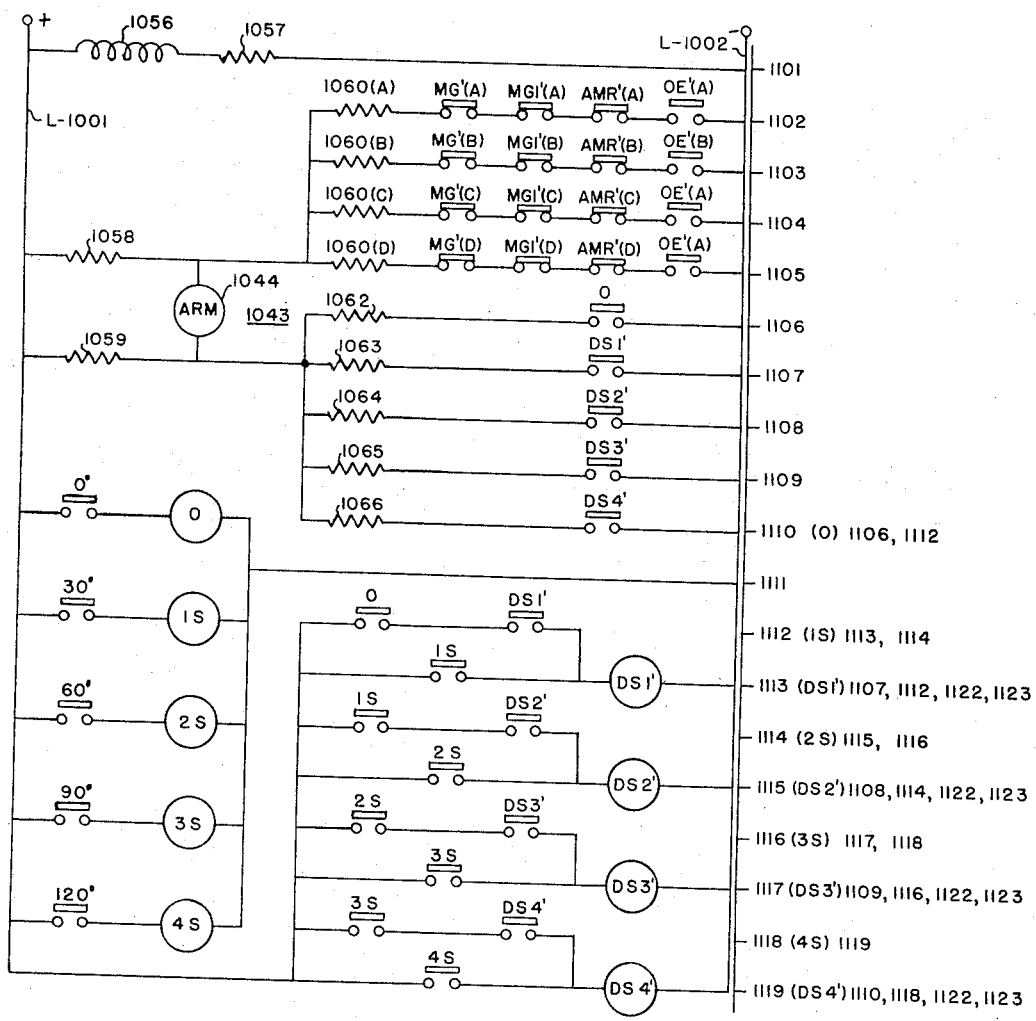
Fig. II
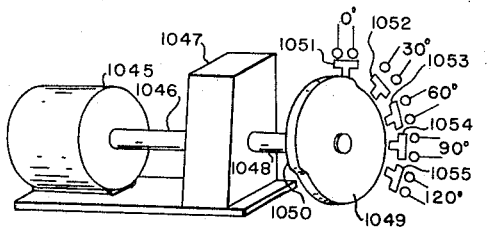
Fig. III
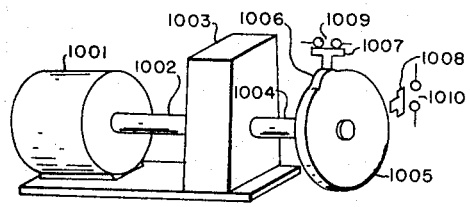
Fig. I
INVENTOR.
RAYMOND A. BURGY
BY
Marshall, Marshall & Yeasting
ATTORNEYS

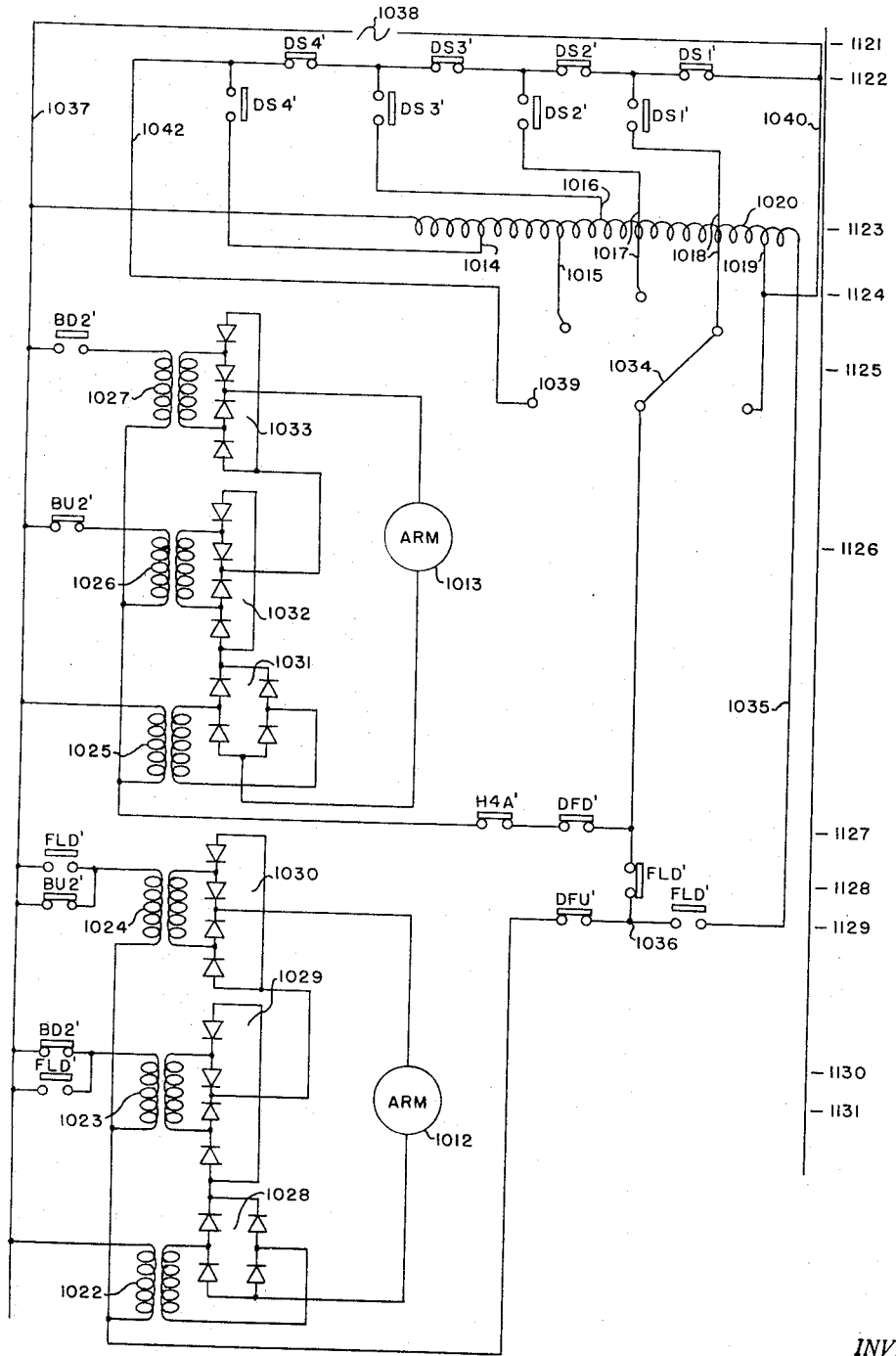
Fig. IV

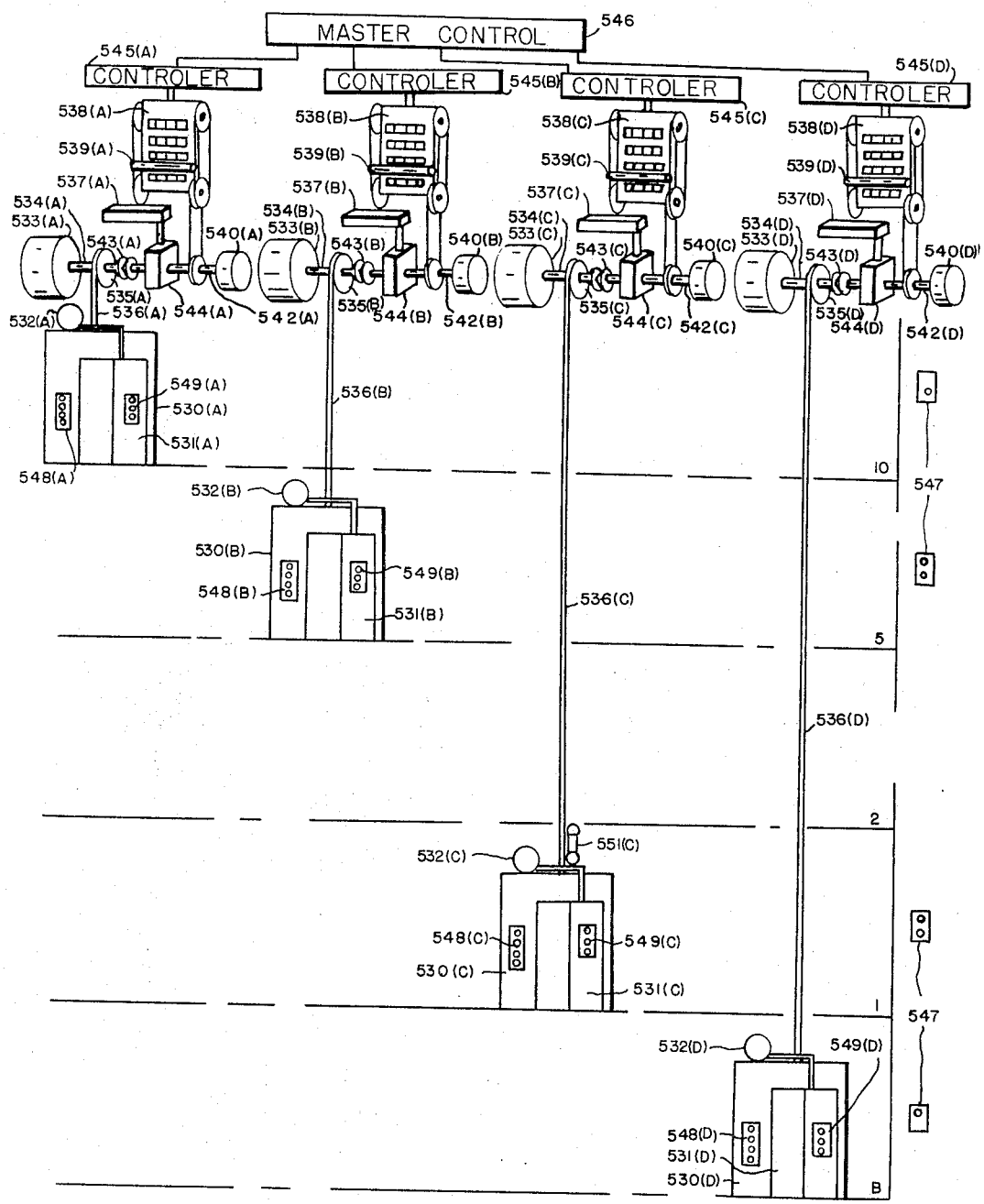
Fig-V

Nov. 21, 1967  R. A. BURGY  3,353,631
ELEVATOR DISPATCH CONTROL USING INTEGRATED STOP TIME AS A MEASURE OF TRAFFIC
Original Filed Feb. 21, 1957  26 Sheets-Sheet 4
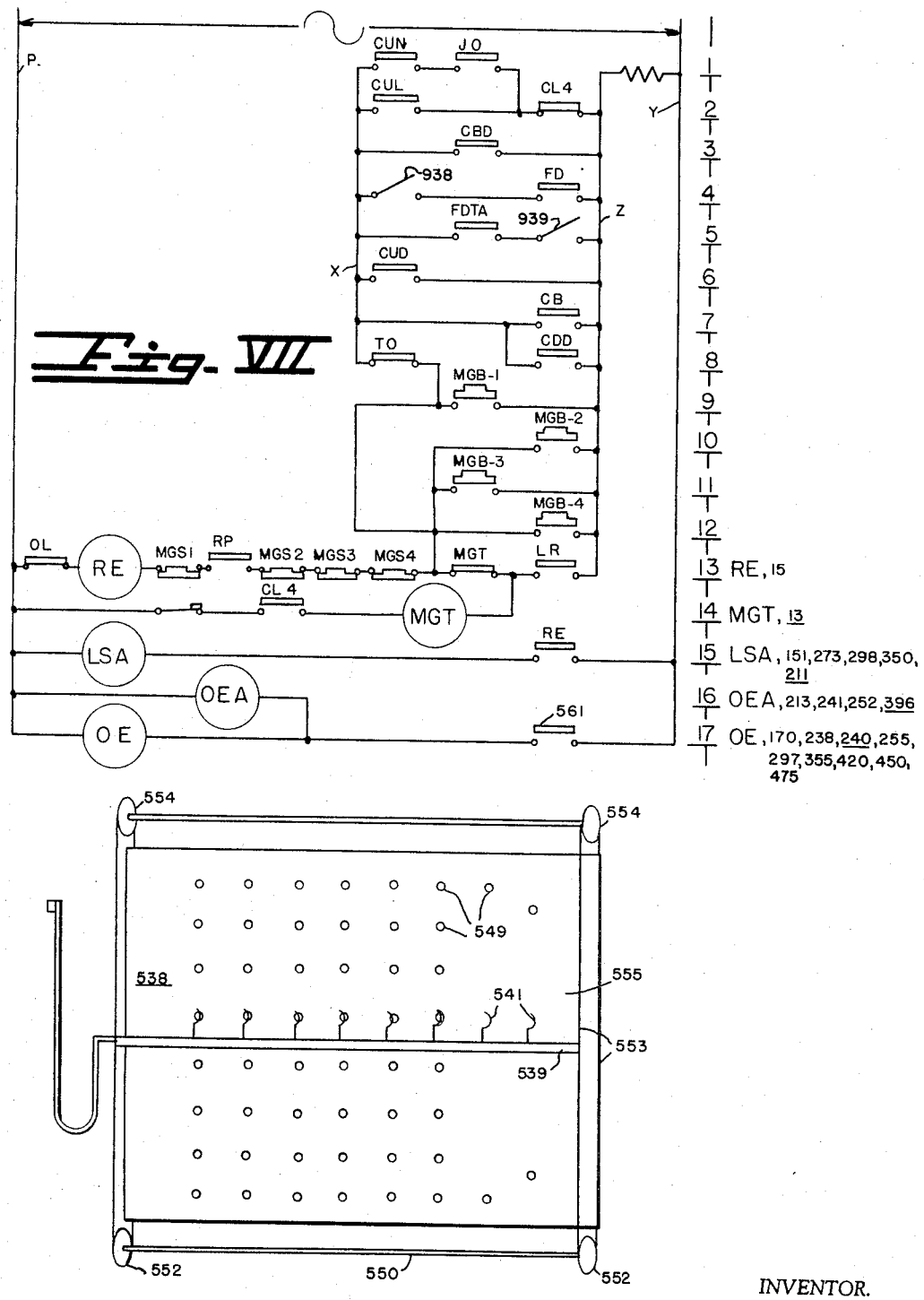
Fig. VII
Fig. VI
INVENTOR.
RAYMOND A. BURGY
BY
Marshall, Marshall & Yeasting
ATTORNEYS

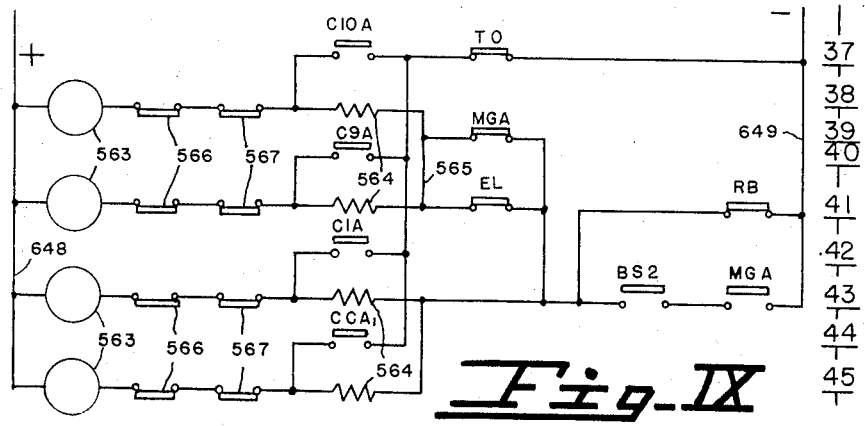
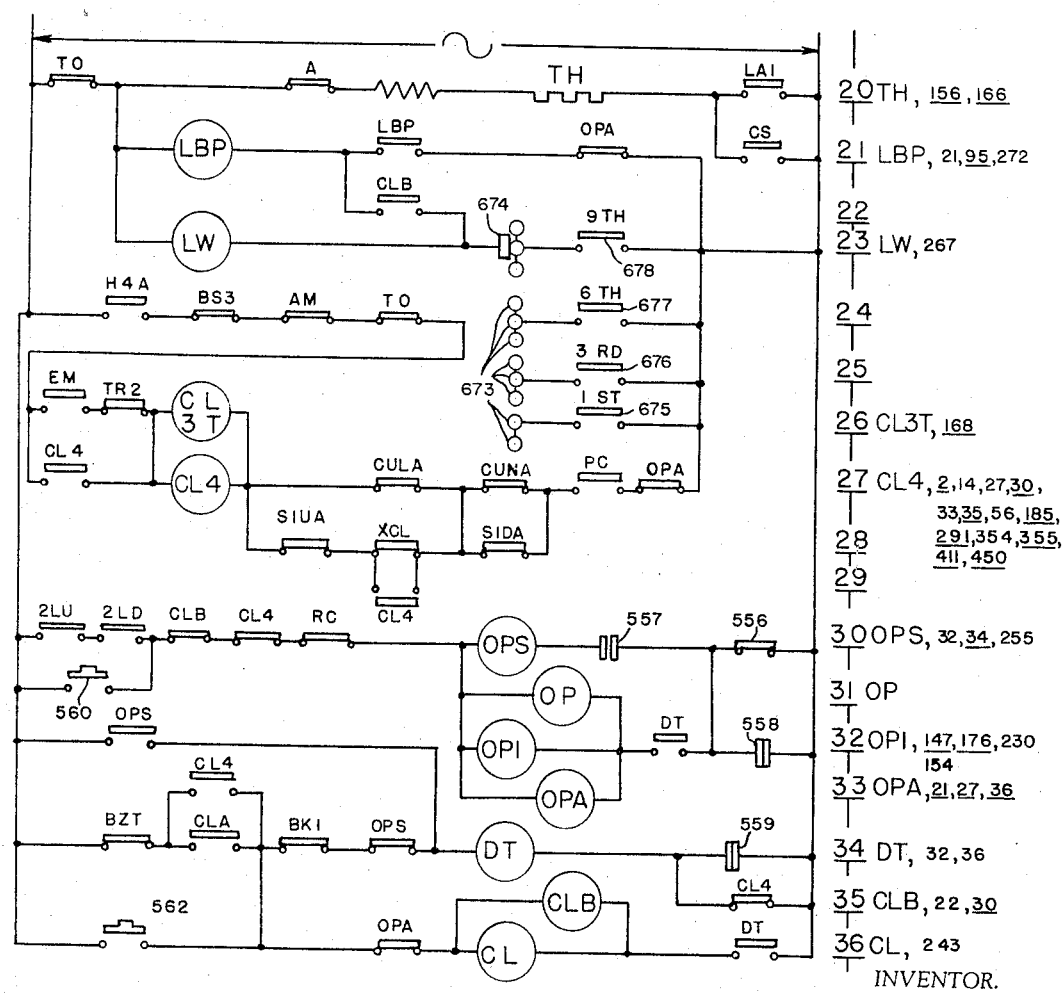
Fig. IX
Fig. VIII

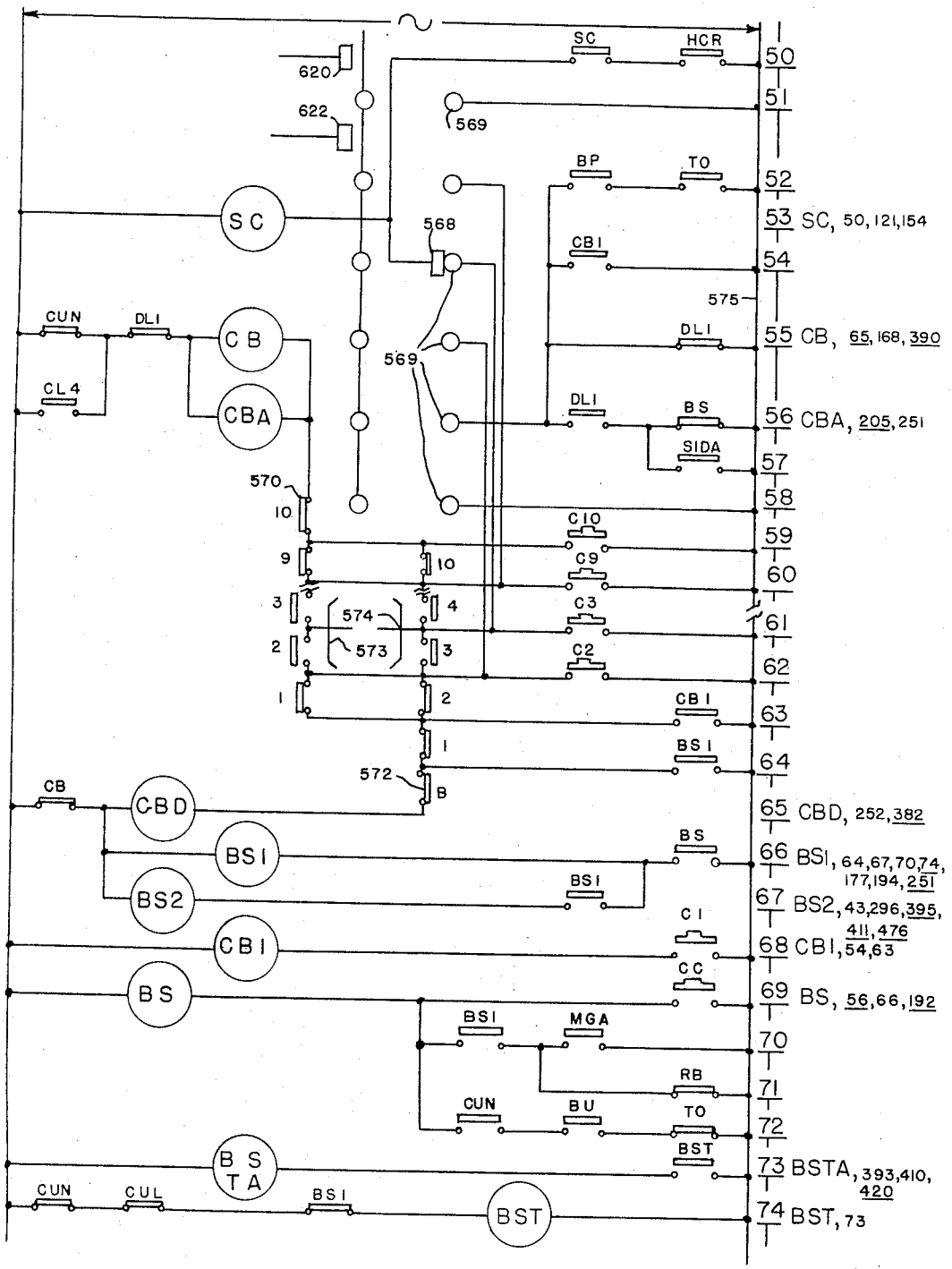

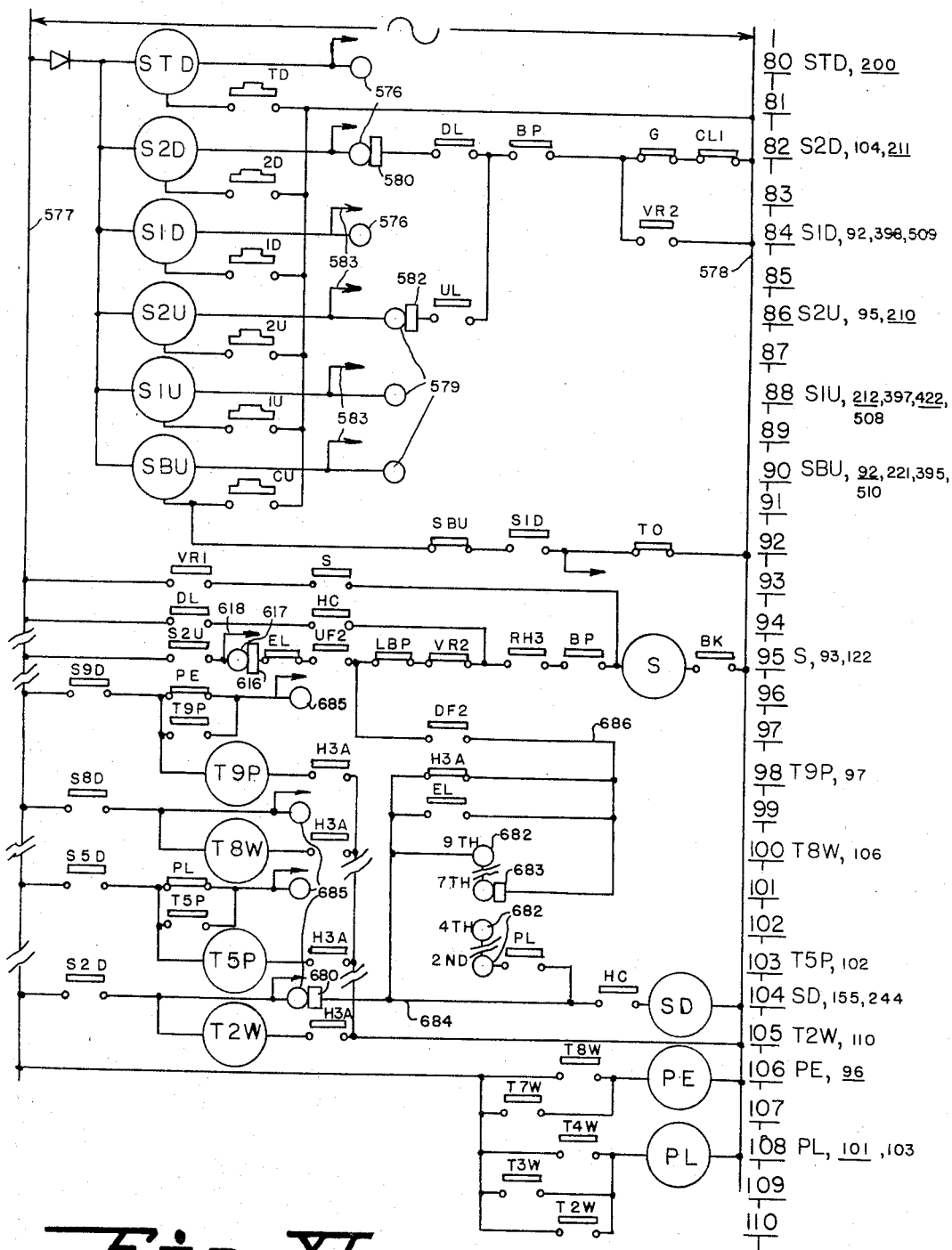
Fig. XI

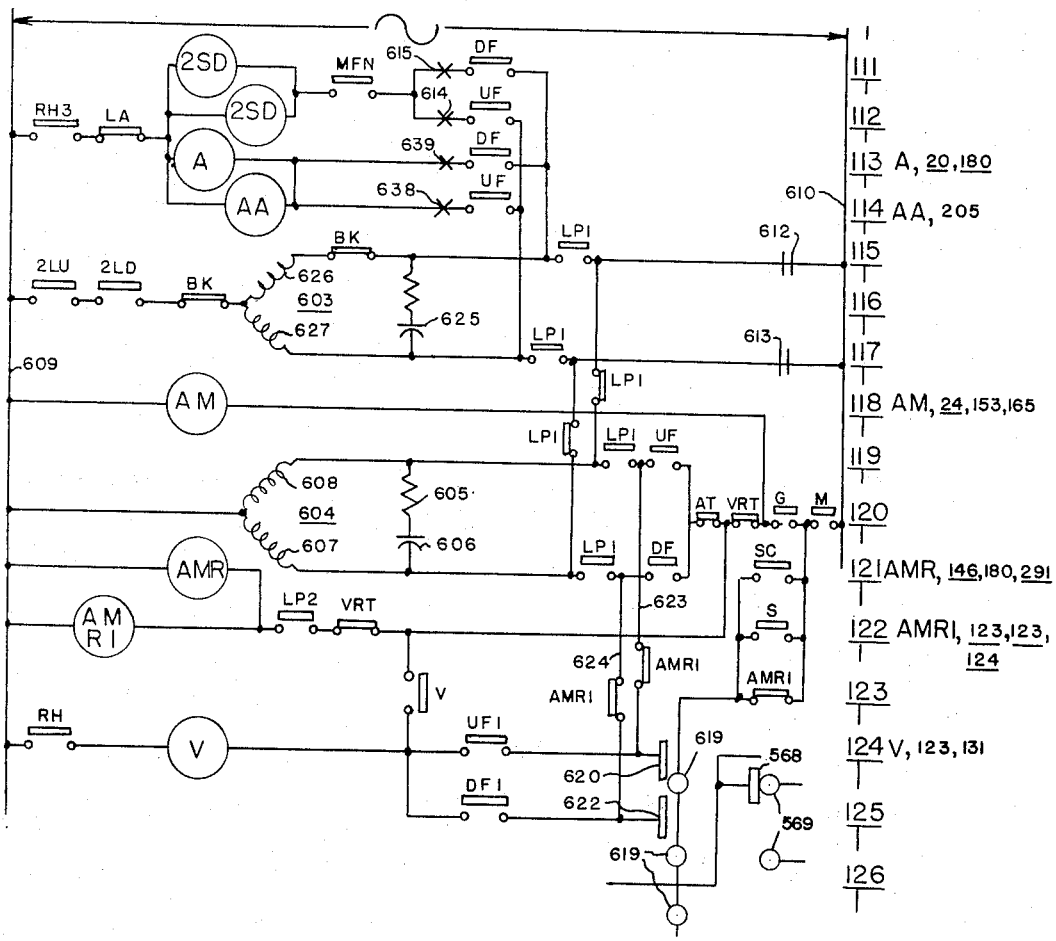
Fig. XII

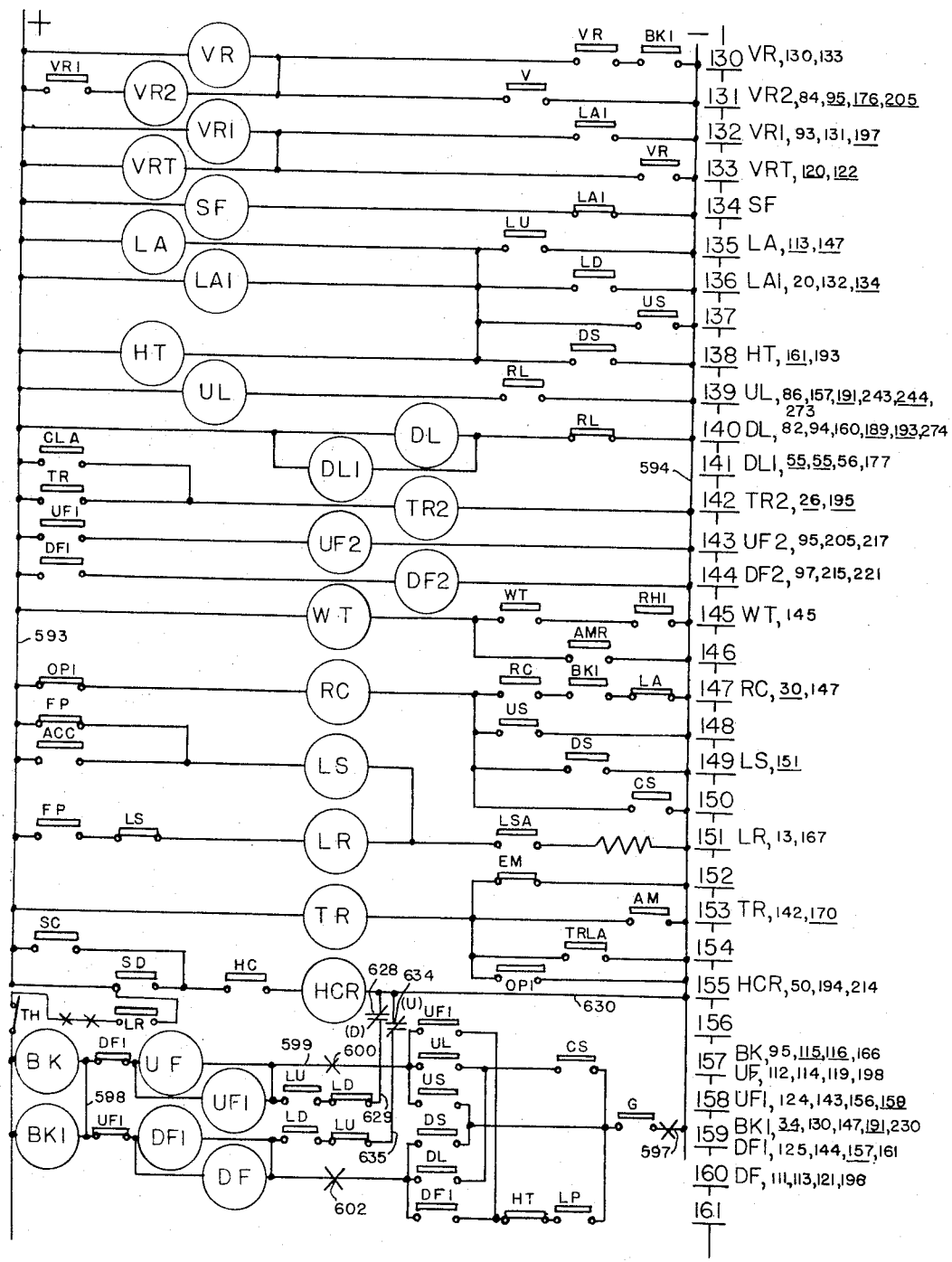
Fig. XIII

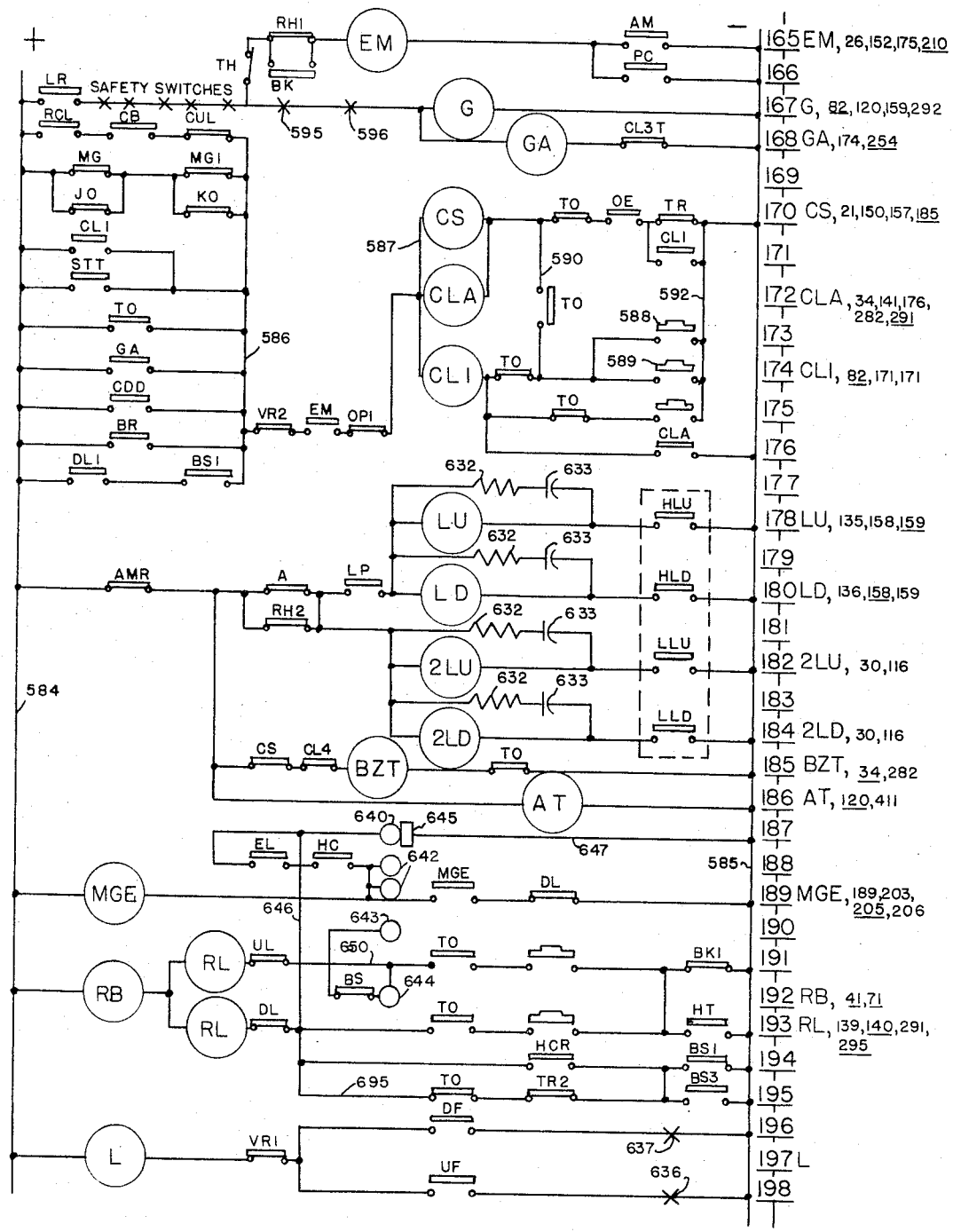
Fig. XIV

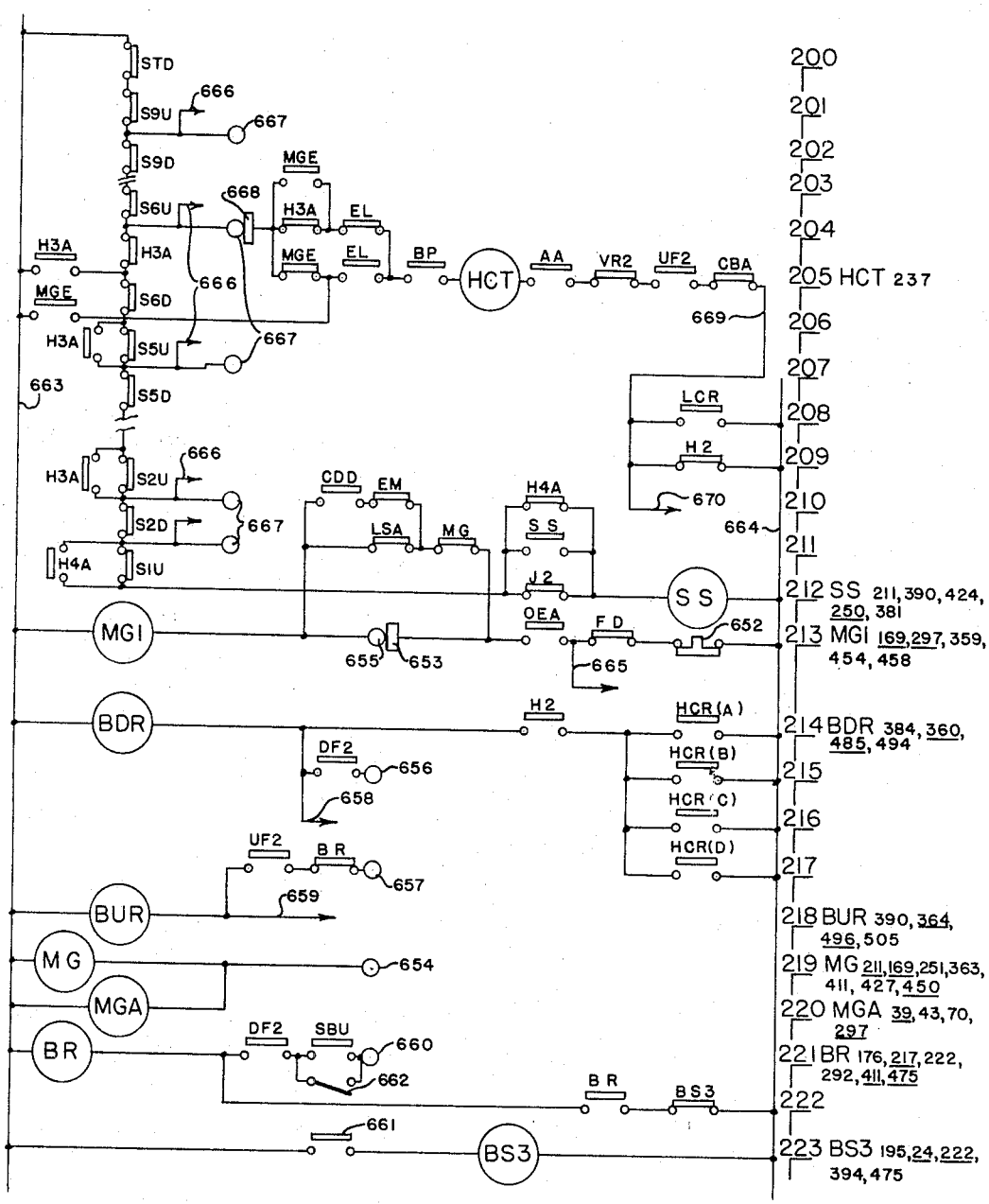
Fig. XV
INVENTOR.
RAYMOND A. BURGY
ATTORNEYS

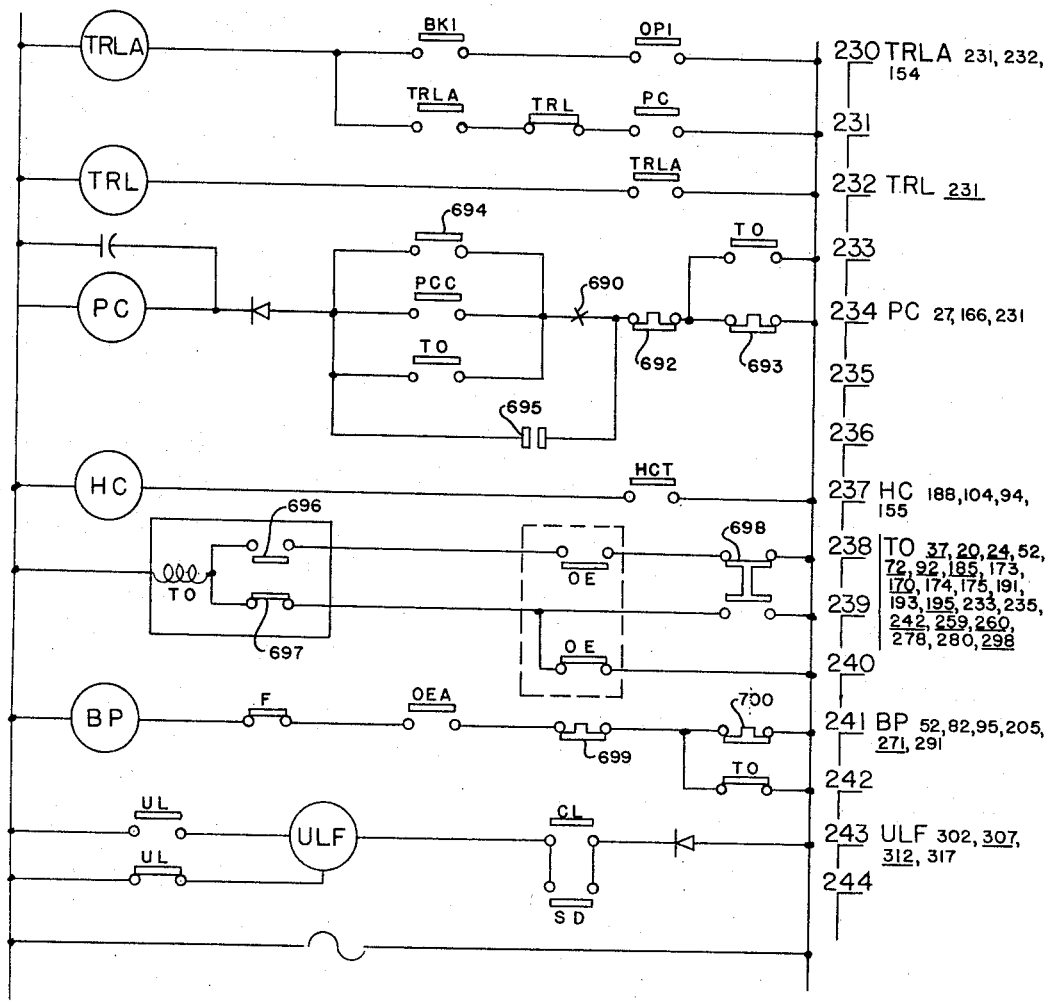
Fig. XVI
INVENTOR.
RAYMOND A. BURGY
BY
Marshall, Marshall & Yeasting
ATTORNEYS

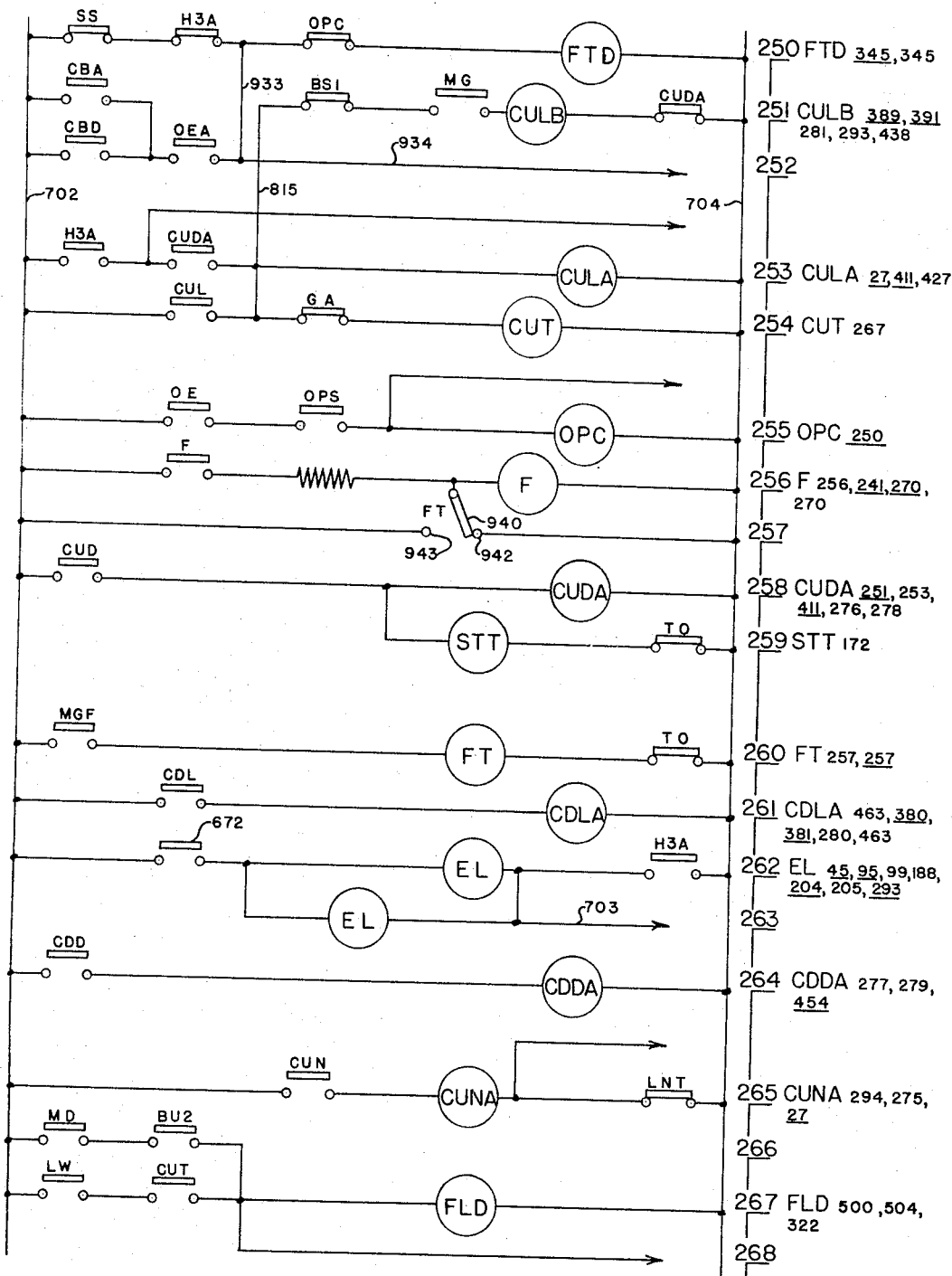
Fig. XVII

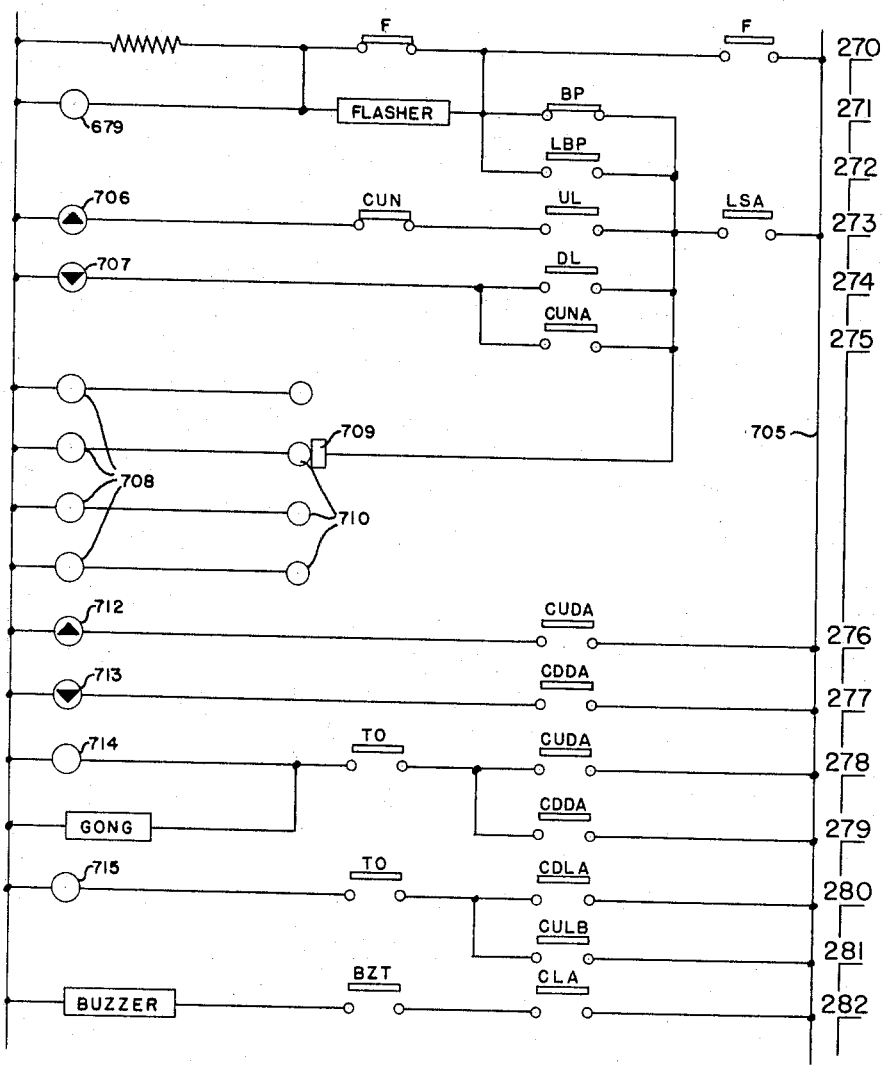
Fig. XVIII

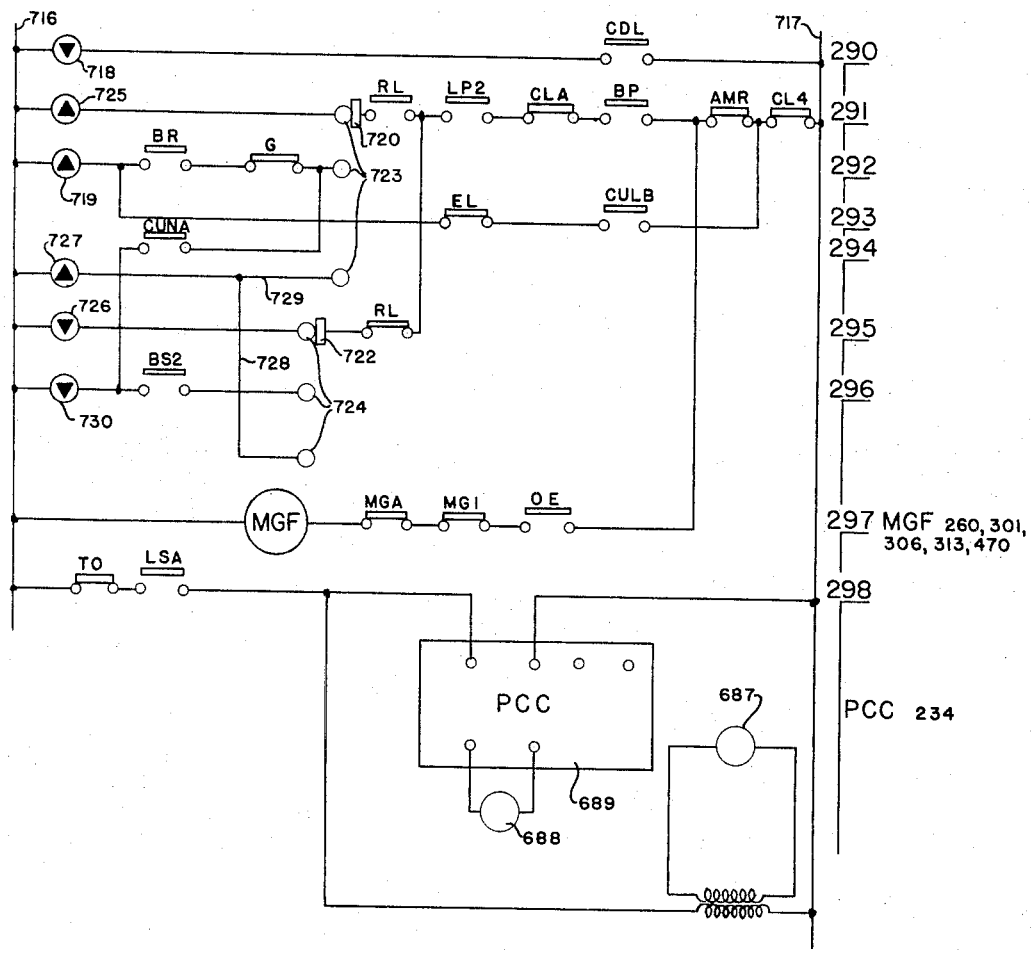
Fig. XIX

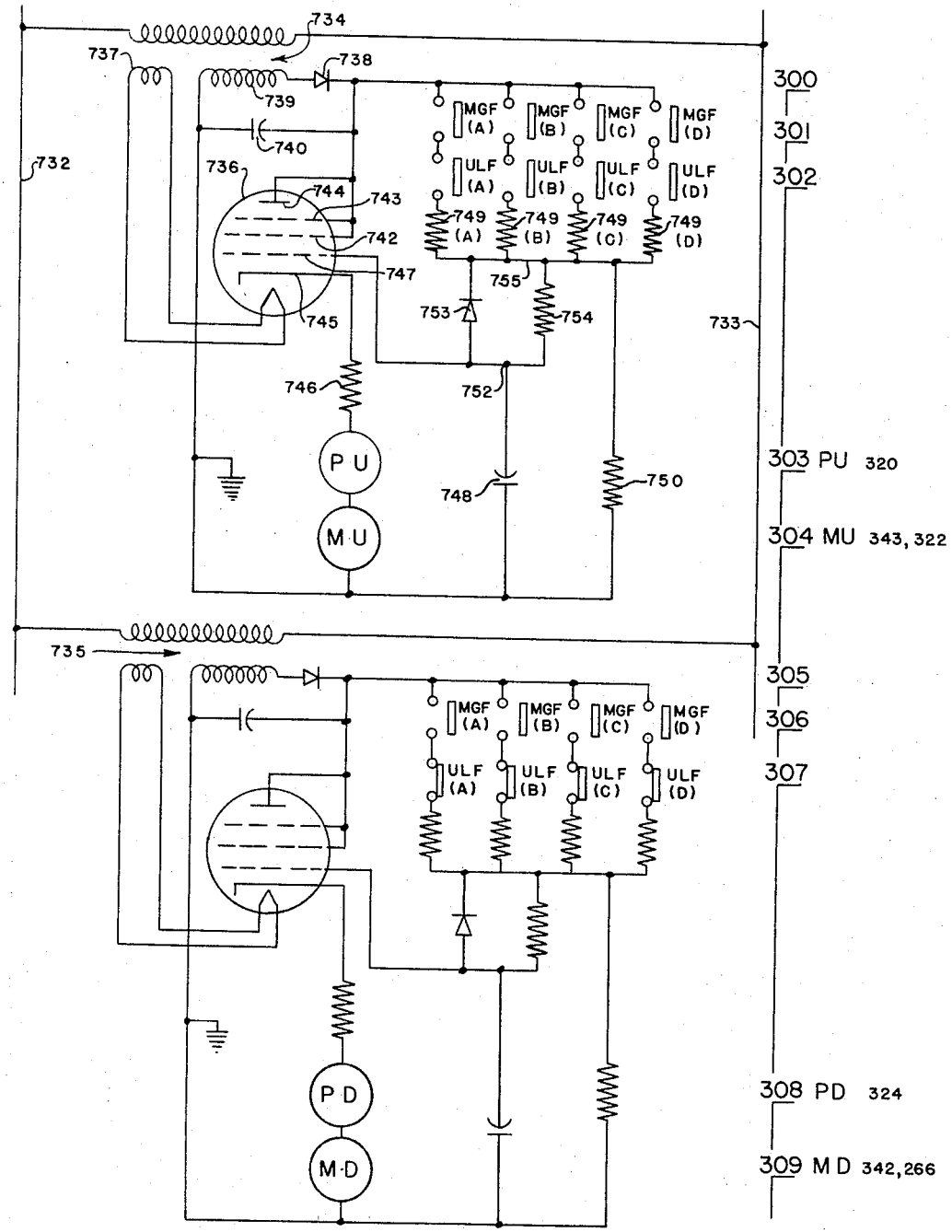
Fig. XX

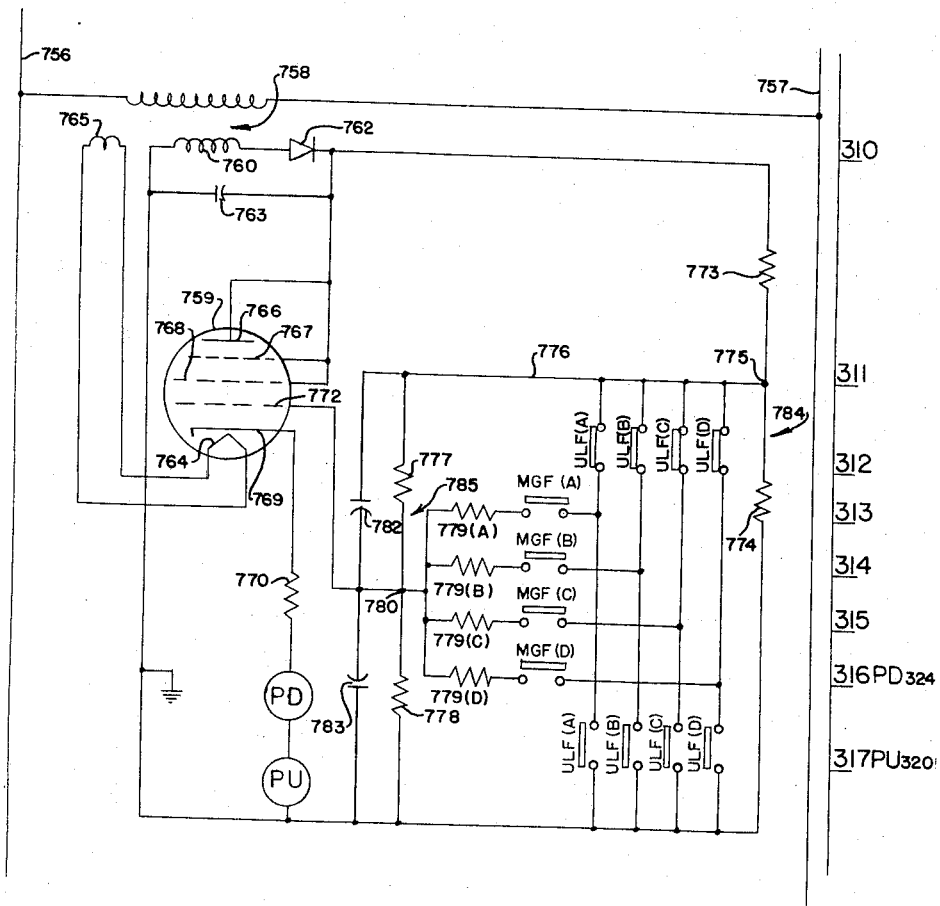
Fig. XXI

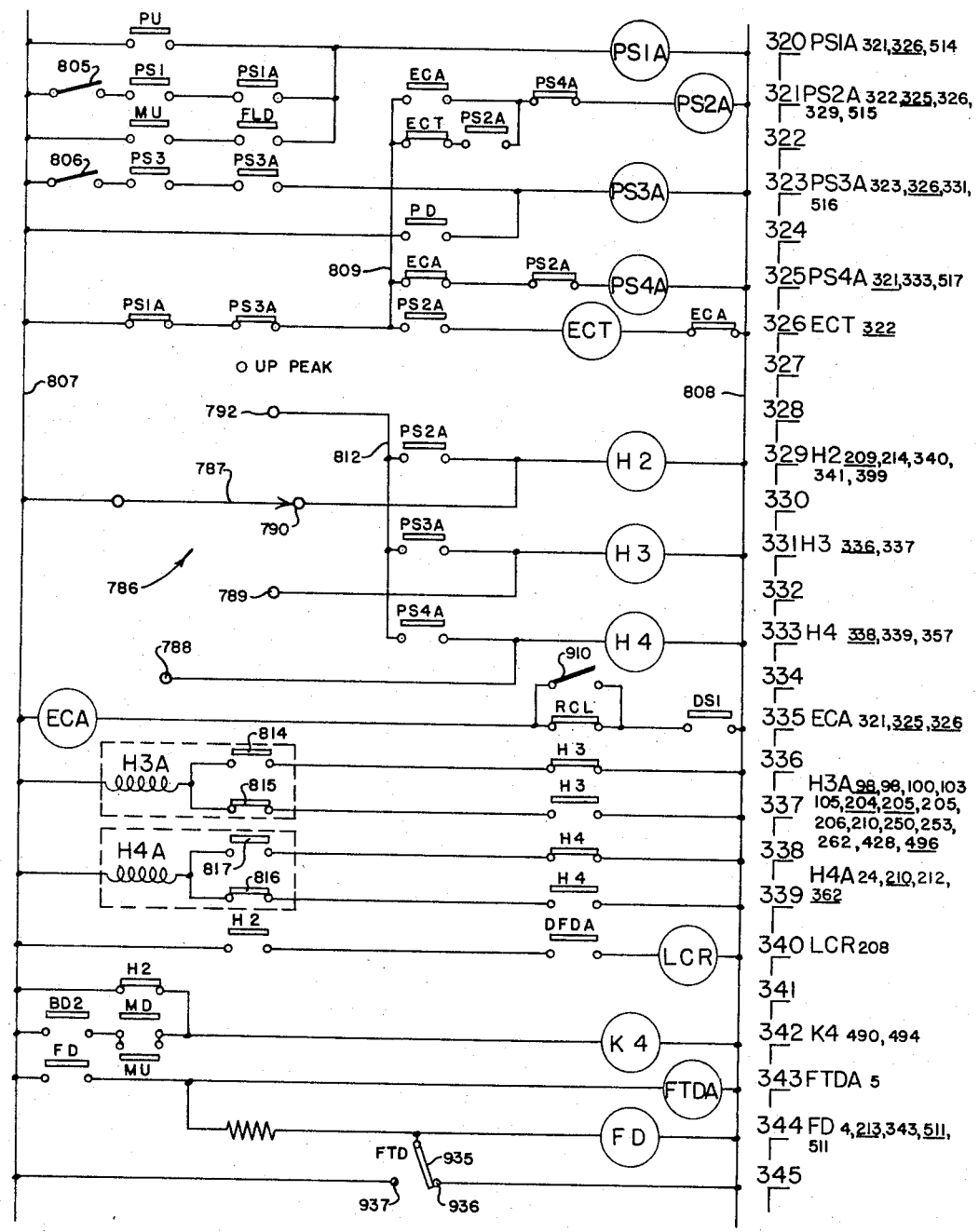
Fig. XXII

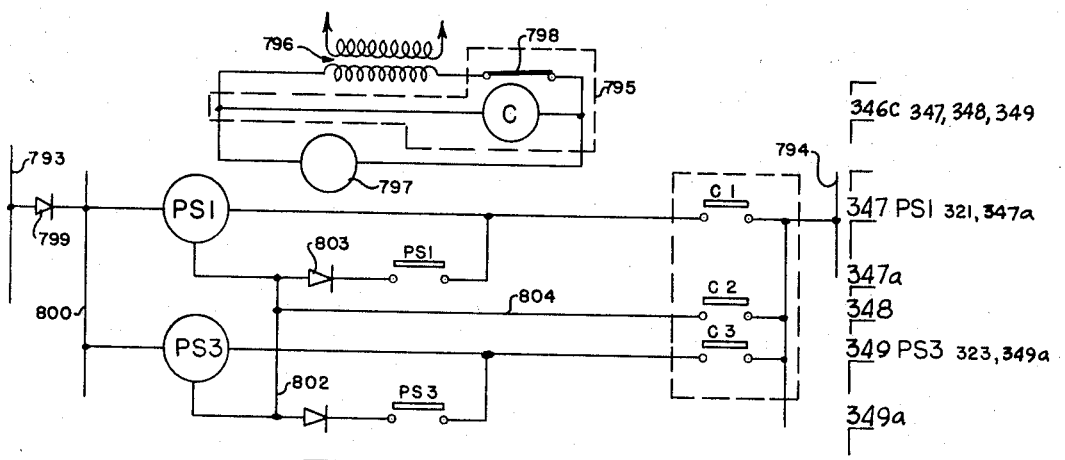
Fig. XXIII
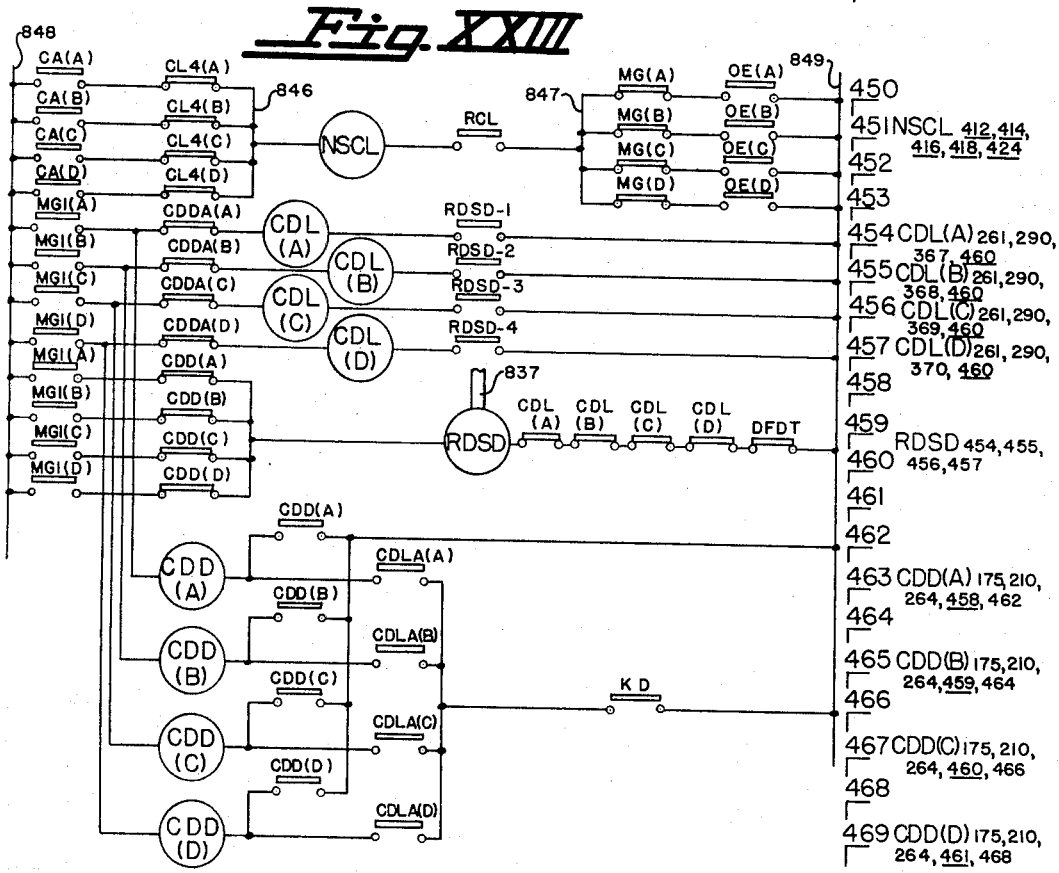
Fig. XXVII
INVENTOR.
RAYMOND A. BURGY
BY
Marshall, Marshall & Yeasting
ATTORNEYS

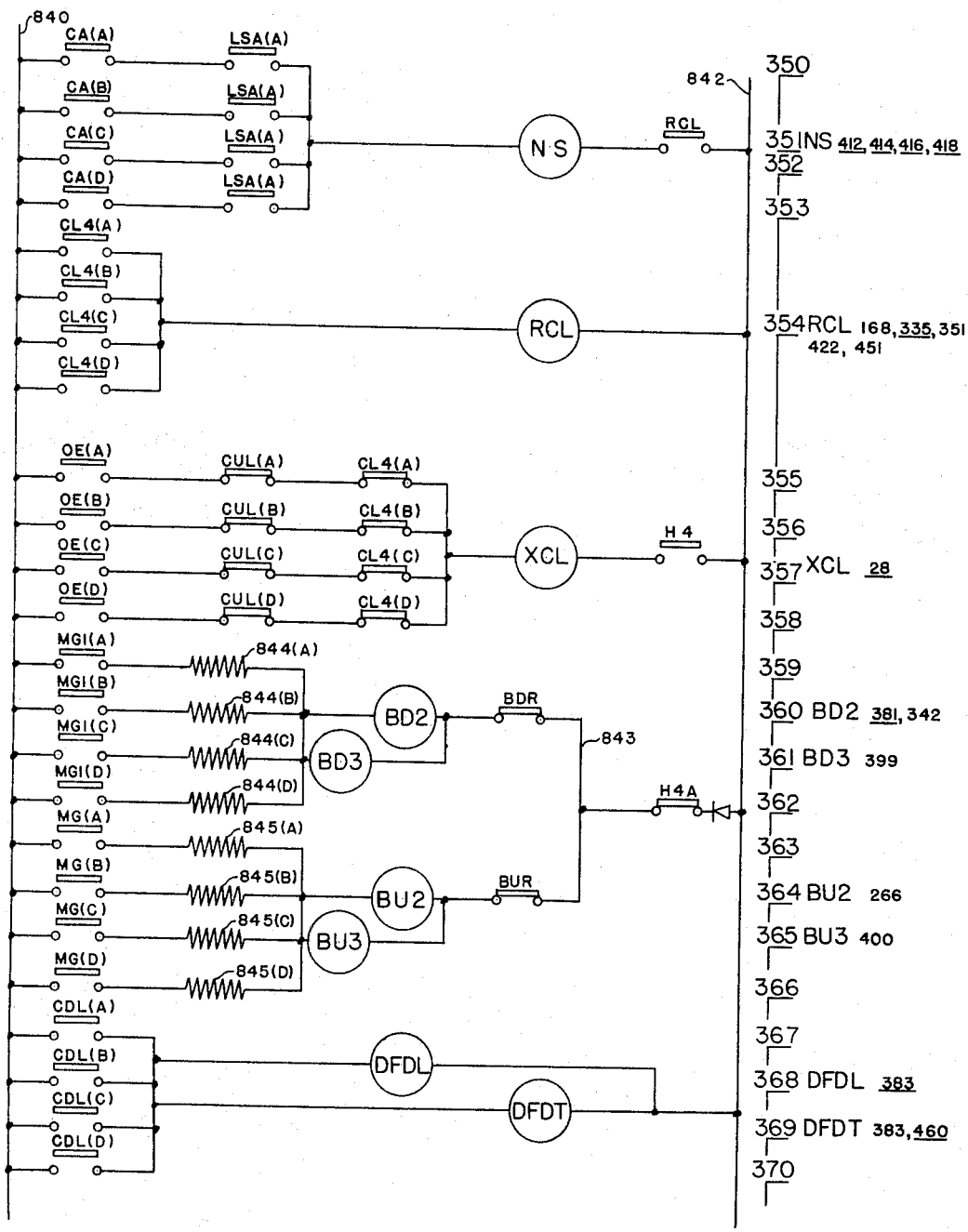
Fig. XXIV
INVENTOR.
RAYMOND A. BURGY

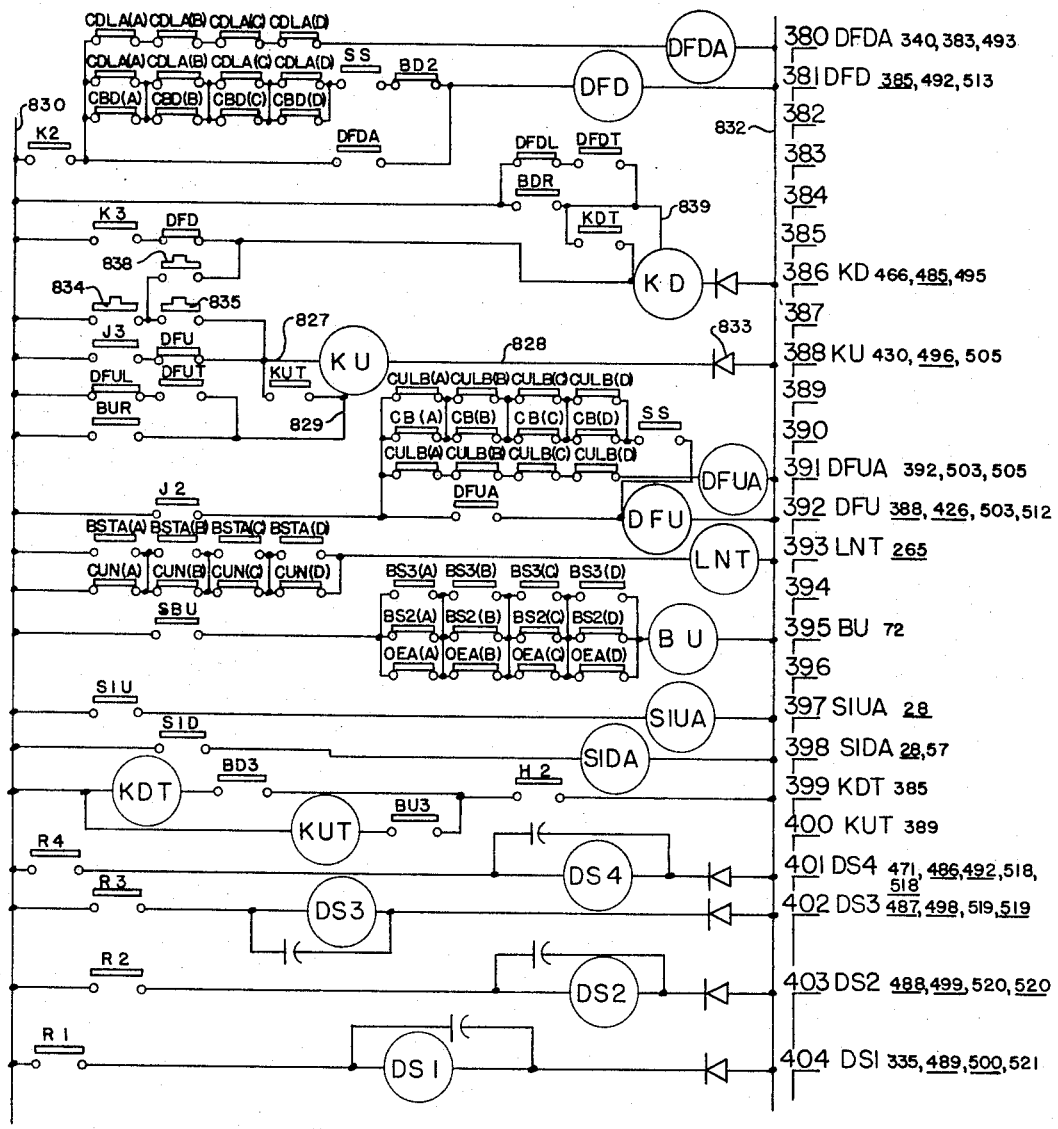
Fig. XXV

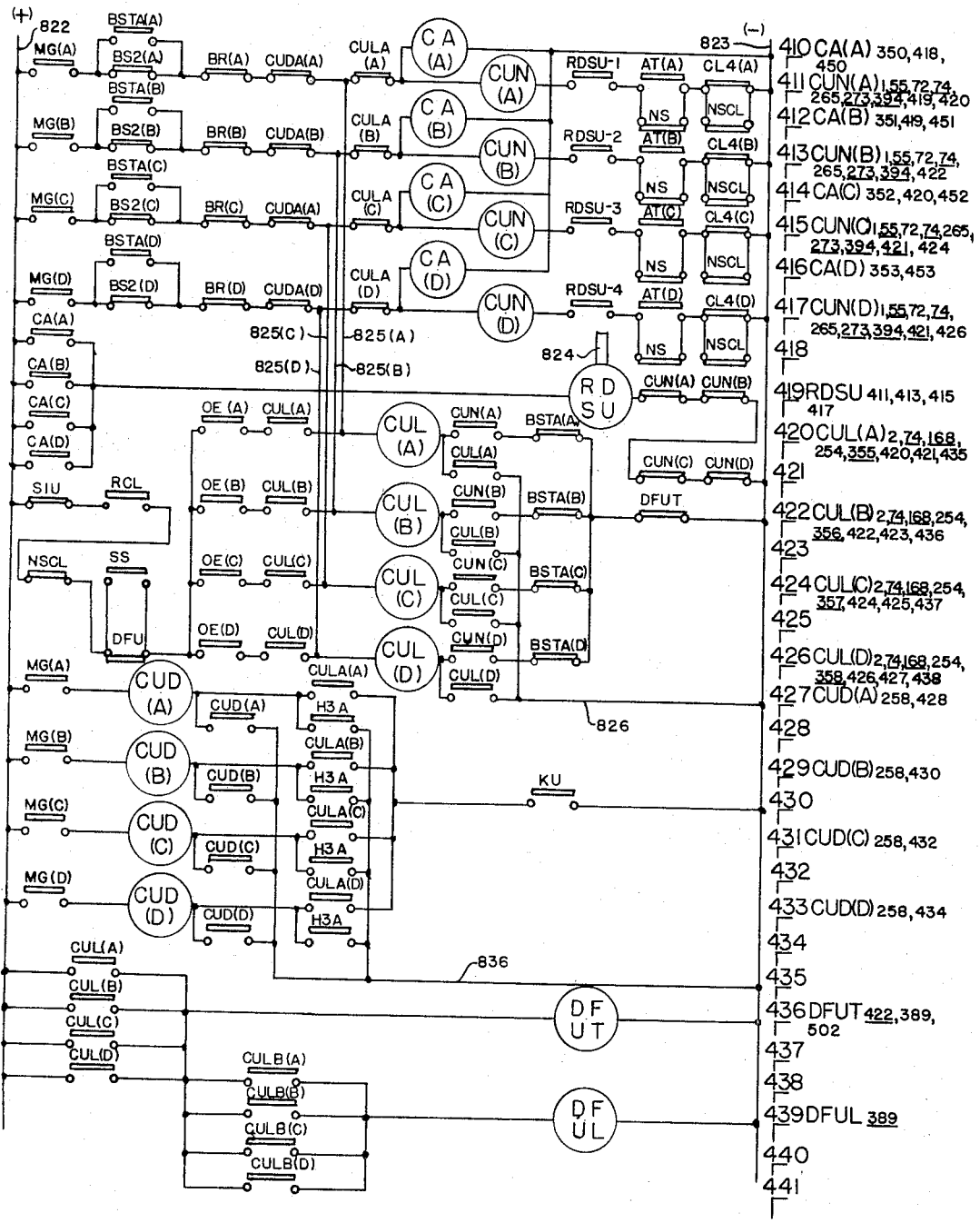
Fig. XXVI

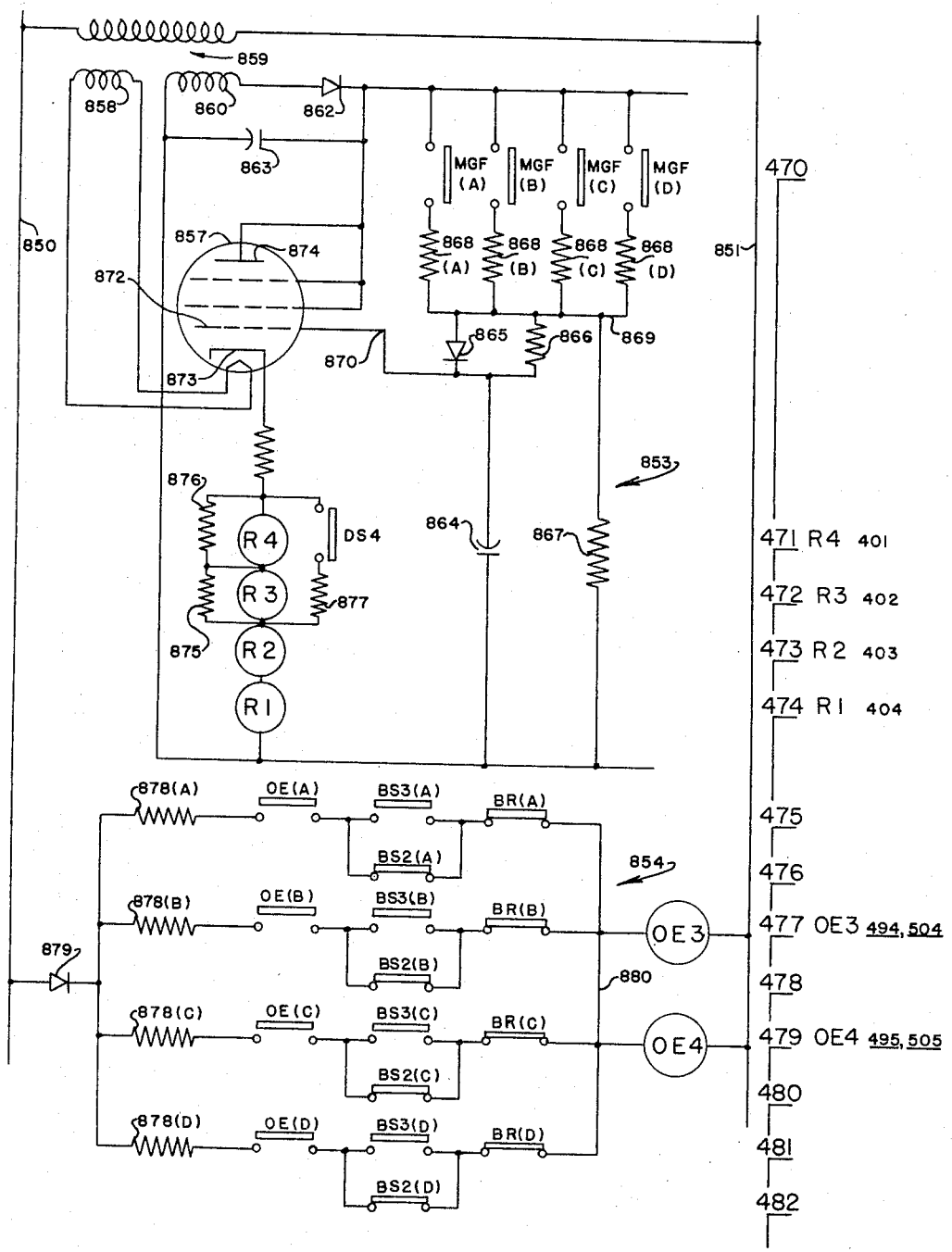
Fig. XXVIII

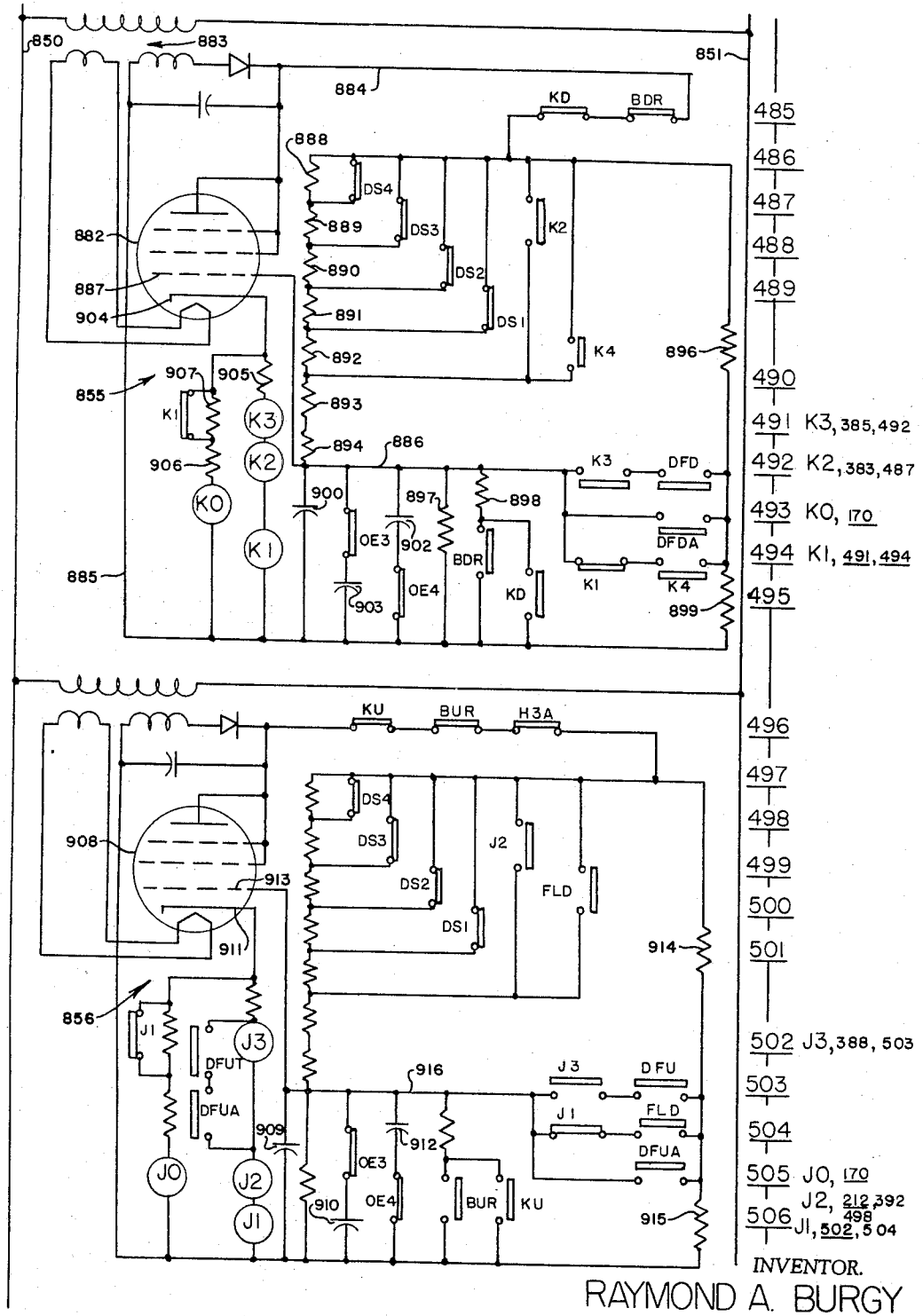
Fig. XXIX

Nov. 21, 1967   R. A. BURGY   3,353,631
ELEVATOR DISPATCH CONTROL USING INTEGRATED STOP TIME AS A
MEASURE OF TRAFFIC
Original Filed Feb. 21, 1957   26 Sheets-Sheet 25
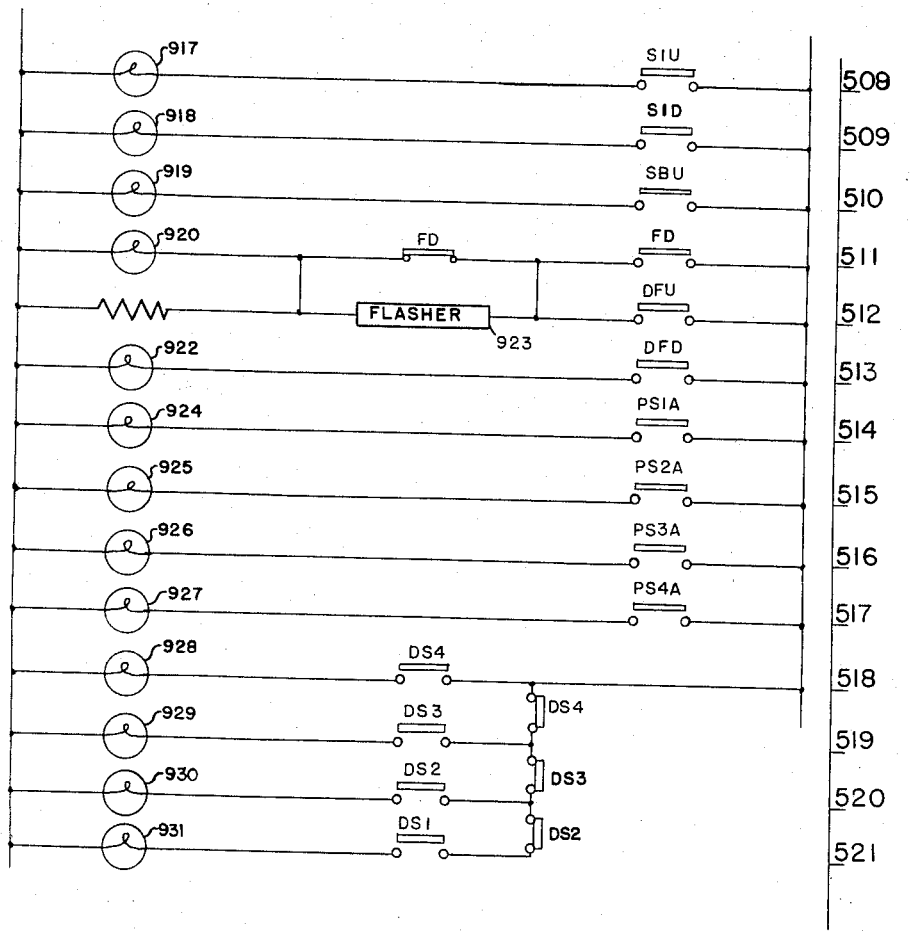
*Fig. XXX*
INVENTOR
RAYMOND A. BURGY
BY
Marshall, Marshall & Yeasting
ATTORNEYS Nov. 21, 1967    R. A. BURGY    3,353,631
ELEVATOR DISPATCH CONTROL USING INTEGRATED STOP TIME AS A
MEASURE OF TRAFFIC
Original Filed Feb. 21, 1957    26 Sheets-Sheet 26
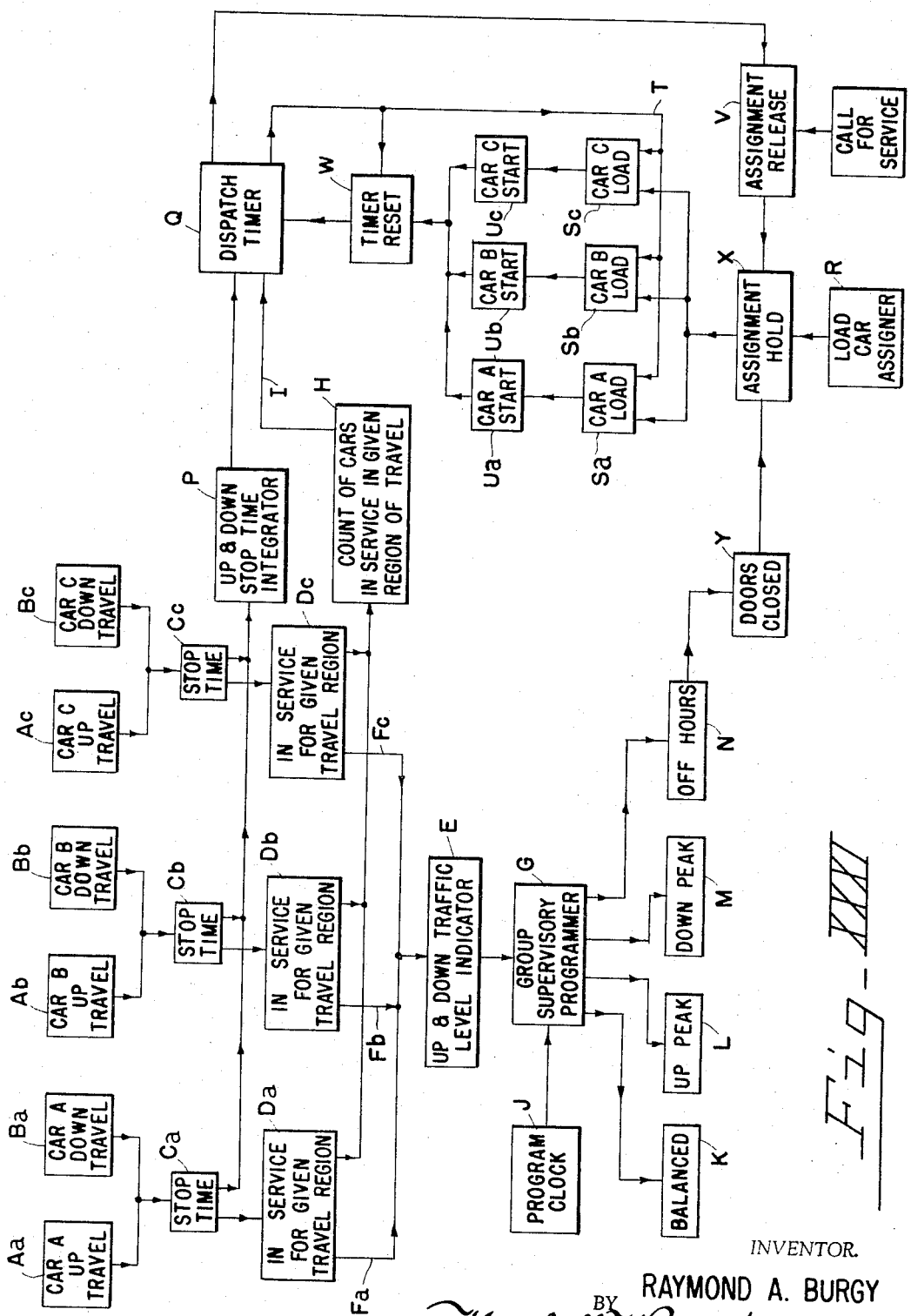
Fig-XXXI
INVENTOR.
RAYMOND A. BURGY
BY Marshall, Wilson & Yeasting
-attorneys-

United States Patent Office

3,353,631
Patented Nov. 21, 1967

3,353,631
ELEVATOR DISPATCH CONTROL USING INTEGRATED STOP TIME AS A MEASURE OF TRAFFIC
Raymond A. Burgy, Maumee, Ohio, assignor to Toledo Scale Corporation, Toledo, Ohio, a corporation of Ohio
Continuation of applications Ser. No. 641,600, Feb. 21, 1957, and Ser. No. 683,327, Sept. 11, 1957. This application Mar. 30, 1959, Ser. No. 808,290
14 Claims. (Cl. 187—29)

This invention relates to signal and control equipment for elevator systems and more particularly to such equipment for indicating or establishing a desired operating pattern for one or more elevator cars in response to the current pattern of car operation.

This application is a continuation of pending application Ser. No. 641,600 of Raymond A. Burgy entitled, "Elevator Controls," filed Feb. 21, 1957, and also a continuation of pending application Ser. No. 683,327 of Raymond A. Burgy entitled, "Elevator Controls," filed Sept. 11, 1957, both now abandoned.

Objects of the invention are to improve elevator systems, to improve elevator service, to increase the efficiency and speed of response of elevators, to facilitate the control of elevators, and to control elevators as a function of car stop time.

The present invention is also directed to means for generating dispatching signals at intervals dictated by the travel pattern of the cars in service, a further object being to improve upon the dispatching and general operating techniques, equipment, and results of the systems of the prior art.

Another object is to simplify the equipment required to issue dispatch signals in response to car travel.

A further object is to facilitate the integration of dispatch control equipment which is responsive to car travel with existing equipment.

An additional object is to measure the travel time between selected points or to measure the variables in such time, as stopping time of one or more cars, and actuate car and system controls in accordance therewith.

In considering the philosophy of elevator operation which has been employed in the present invention, it is believed that a new criterion for elevator operation has been invented which enables an elevator system to be monitored conveniently and effectively evaluated as to the service it is performing. This criterion, as set forth above, is the interval which elevator cars are stopped. Once such a yardstick for services is suggested it is apparent that it is significant in the measurement of the utilization of the elevator system since a stop wherein a large number of passenger transfers is effected will necessarily be a greater length than a stop where one passenger is transferred, and a stop wherein the passenger leaves the car often is of shorter duration than a stop wherein a passenger enters the car. Similarly, as a number of stops increase on a given trip, the car stopping time for that trip will increase and the interval between instants when the elevator is available to be sent away from a dispatching station will increase. Thus elevator car stop time can be employed as a measure of load and traffic utilization, both factors which heretofore have been ascertained by means of weighing devices applied to the car, call registration counting devices, call registration timing devices and the like.

In view of the importance of this new concept and its novelty, it is applicable to a wide range of utilizations. Thus, it might be used as a measuring or evaluating means to alert either an elevator operator or an elevator starter to effect appropriate manual changes in the mode of operating an elevator system in order to better serve the demands on the system. In a more highly developed system the stop time or a function of that stop time can be utilized to automatically effect changes in the controls of an elevator system. As illustrated in this application, changes are made in the speed of the dispatch timer or by altering other controls, such as program controls.

The concept of measuring or detecting stop time and of utilizing that measured or detected stop time to indicate a service load, alter a specific control, alter a dispatching interval or alter a program control is within the concept of this invention.

As indicated above, it is believed that the approach herein disclosed constitutes a new theory for the control of elevator operation which as embraced in the application is believed to be novel and to embrace a wide range of utilizations. Therefore it is endeavored to also define the invention as a new method for the evaluation, monitoring, or controlling of elevator systems. The method of monitoring the elevator operation may be defined as at least two method steps which are defining an interval in conjunction with each stop of the elevator car, which as spelled out in the specification might be the door open interval for that car, and integrating the defined interval during operation of the system. This new mode of operation might be utilized for any of the concepts discussed above including the technique of indicating to an attendant the operating state of the system or the technique of setting up the prerequisites for automatically controlling the system. These combinations of method steps can be effected automatically with the equipment illustrated or could be effected manually as by having an operator utilize a stop watch to accumulate the length of the stopping intervals during the given operating period. The method of monitoring the operation of an elevator system by measuring car stops for a plurality of cars, and utilizing the stopping intervals to effect or alter operation or programming for the system is a method of properly defining the invention herein disclosed.

To further set forth the scope of the invention the present application comprises an entire elevator system utilizing broadly new concepts of elevator control. In particular, a system and a mode of operation have been conceived wherein the controls are responsive to various levels of utilization of the elevator cars as represented in particular by the length of time the cars are stopped. Various aspects of car stop time are utilized in different ways, for example, car stop time during up trips is distinguished from car stop time during down trips and both up and down stop times are used to modify the program controller of the system. Stop time on both up and down trips is utilized to modify the dispatching interval defined by a dispatch timer. Stop time at particular floors is critical for other control functions by restricting the measurement of stop time to floors between and exclusive of the dispatching terminals. The stop time of cars at other than the dispatching terminal floors is utilized in some instances and in other instances is further qualified by excluding the stop time of cars while they are at floors beyond the dispatching terminals as, for example, basement landings. Levels of stop time are also critical in performing different functions, thus a first level of a particular type of stop time may alter one operation in the elevator system, a second level alter the operation further and a third level introduce a still different operation, and so forth. Coincidence of a particular type or a particular level of stop time with other conditions in the system such as the number of cars in a particular range of floors, the number of cars at a dispatching terminal, the number of hall calls or car calls registered, the extent to which a dispatch interval has expired, the presence of calls above a car to which that car can respond, the degree of loading of a car and the time of day as determined by a clock controller are all features which are combined with the variations of stop time outlined above to alter the operating controls of the system. In one embodiment the relationship of up stop time to down stop time is monitored and a preponderance of one over the other also varies the system control.

Many new control functions are introduced by the aforenoted condition responsive means. A principal operating feature is that employed on the "off hours" or "night" program when less than all the cars are required to satisfy the demands placed upon the system. That program involves a unique form of doorway closing wherein the doors of all cars including the car subject to dispatching remain closed even after the car is dispatched unless a hall call is registered at the dispatch landing in which case the door of the car to be dispatched will open to receive the passenger registering that call, if it is an up hall call, and the next succeeding car in the dispatching sequence will have its door open if it is a down hall call since that car is conditioned to serve calls below the main or lower dispatching terminal. Also on night service the load status is maintained on a car while it is away from the main dispatching terminal. One advantage of this feature is to reduce the number of times that motor generator sets must be started and stopped. Four major programs are disclosed and stop time levels are employed to switch between the several programs.

Heretofore attempts have been made to control the operation of elevator cars either singly or in combination by sensing certain conditions in the system. Usually the conditions sensed have been the number of car or landing calls in registration, the rate of registration, the accumulated time calls have remained unanswered, the number of cars present at a landing, the existence of special service calls, the loading of the cars, and even their operation as compared to a predetermined or idealized schedule. In particular, attempts have been made to improve the distribution of cars by indicating or establishing starting intervals from landings which have been designated dispatching landings. Dispatching has been effected on a number of bases including uniform intervals between dispatch signals or from the departure of a next preceding car, intervals of altered duration as determined by a supervisor, intervals which vary with the number of unanswered calls for service or the accumulated time registered calls remain unanswered. Since a prime objective of dispatching devices is to avoid the bunching of cars, another technique employed frequently is to issue dispatch signals to cars as the number present at a dispatching terminal increases either by shortening the dispatching interval or by issuing dispatch signals to at least one car immediately upon the number of cars exceeding a predetermined level. Other approaches have involved mechanisms which monitor the travel of the cars and alter dispatching in accordance therewith. These latter approaches have included means insuring that the number of cars traveling in each direction are maintained in a predetermined ratio and issuing dispatch signals to cars so as to maintain that ratio, and means to establish an idealized car trip schedule and compare the actual travel of the car with that schedule so that a car head of schedule is caused to travel at a slower speed than one on time, a car behind schedule travels at a faster rate than one that is on time. The dispatch intervals in this type of system tend to be increased by cars behind time and to be decreased by cars ahead of schedule.

Ideally, the cars in an elevator system should be distributed in time throughout the system so that a car is available at a landing at the end of a regular interval following the next preceding car. The present invention achieves a distribution approaching this ideal by establishing a regular dispatch interval on the basis of the travel time, for example, the round trip time of a car plus a given amount of time for car loading and unloading at the terminals. The system is arranged to continuously correct operation as the operating pattern changes even during a single trip of but one car. This time interval is increased as traffic increases as a function of the integrated stopping time of the cars at intermediate floors. The dispatch timer interval is based upon the round trip time of a car as a function of the number of cars in service. Thus, if a basic round trip plus a reasonable loading time at the terminals required 80 seconds and four cars were in operation a dispatch interval of 20 seconds might be employed. If the number of stops at intermediate landings increased to an average of three for each car, each landing stop requiring approximately 12 seconds so that the round trip time is increased to 116 seconds, the dispatch interval can be increased to 29 seconds or one quarter of the round trip time. Similarly, if only three cars were in service, the interval can be altered to a third of the round trip time.

In accordance with the above objects, one feature of this invention resides in monitoring the stopping time of operating cars.

Another feature involves altering one or more controls determining the operating pattern of a car or system, such as the dispatch time, as a function of round trip time and the number of cars in service, and ancillary thereto, altering the fraction of the round trip time establishing the dispatching interval between cars from a basic value in response to the stopping time of the cars.

Another feature utilizes means adjusting the dispatching interval of cars as a function of the integrated stopping time of elevator cars.

A fourth feature includes means for changing the speed of a dispatch timer motor in response to landing stops by elevator cars.

A fifth feature involves means relating the number of cars stopped to the established dispatching interval and altering the length of that interval if a disproportionate relationship exists. In particular, this relationship is sensed in a bridge circuit which when unbalanced causes a displacement of a contact actuating armature. The armature closes contacts as it is displaced to alter the balance in the bridge and to control the speed of a dispatch timer motor.

A further feature includes a bridge circuit in which an impedance is changed as the car operating pattern changes so that a translating device responsive to the bridge balance alters an impedance in the bridge to tend to restore the initial state of balance. A control means for the operating pattern of one or more active cars is altered by changes in said translating device thereby tending to establish a mode of operation better suited to the requirements placed upon the system.

In the past considerable effort has been expended to control the operation of elevator systems to meet the service requirements imposed thereon. Dispatching on various bases has been employed to distribute the cars in multi-car systems. The operating pattern of individual cars and groups of cars has been dictated to satisfy the requirements with the best compromise between service to all landings and service for the traffic concentrations. A preferred approach is the establishment of several discrete operating patterns often defined as a balanced program for approximately equal up and down traffic, an up peak program for a preponderance of up traffic as at the beginning of the day and at the end of the noon period, a down peak program for a preponderance of down traffic as at the beginning of the noon period and at the end of the day, and an off hours or night program for traffic substantially below the capacity of the system.

Until recently, dispatch intervals have been set and operating programs have been selected manually and the car has been maintained under the primary control of an attendant so that the system controls augumented the attendant's control functions. With the advent of improved equipment, attendants and system supervisors have been eliminated to a large extent. In general the concept of operation for the automatic equipment replacing the manually actuated controls has been predicated on one of two bases. One approach has been to endeavor to anticipate the service requirements imposed and alter the operation to meet those requirements. This often entails shifting the mode of operation to the detriment of one class or type of service where no need for such a shift materializes. Another approach has been to await the development of a service demand that cannot be met by the current mode of operation and then effect a shift to a new mode better calculated to satisfy the requirements. Once excessive requirements have built up it is difficult to meet them and bring the system back into equilibrium.

The present system avoids the disadvantages enumerated above by continuously monitoring the operation of the cars and by altering the dispatching interval and the general operating program or individual service features in accordance with the current service provided. Certain aspects of the system are altered in response to a combination of current service conditions and other conditions characteristic of anticipated service, car distribution, service demand and the like.

The primary factor influencing the operation of this system is the interval cars are stopped, termed the "stop time of cars". Stop time represents the current service provided and is particularly significant when measured or detected as a level of stop time while the cars are away from dispatching terminals since the variations in car trip time are a function of such stop time.

In order to achieve uniform distribution of cars in an elevator system, a dispatching interval should be established which is the average round trip time divided by the number of cars in service. A running integral of the stop time of cars in service is made and utilized to control the speed of a dispatch timer in this system to define intervals closely approaching the ideal. The number of cars in service is also effective in altering the dispatch timer speed. Thus the dispatch timer is slowed as the stop time of the cars increases and is slowed as the number of cars subject to dispatching decline.

Dispatching is effected as the release of a car a predetermined interval after the release of a preceding car so that the released car is permitted to start from its dispatching landing if a call is registered to which it is capable of responding. The dispatch interval is initiated upon the issuance of a dispatch signal to a preceding car. In the event that a preceding car fails to start in response to a dispatch signal, as where its doors are held, its dispatch signal is maintained without blocking the dispatch of a following car. Thus, dispatch failure circuits, previously employed to prevent the lock up of a dispatching system, have been eliminated. When a car responds to a dispatching signal, for example by initiating movement from the dispatching landing, the dispatch timer is reset to cancel the partially expired interval and initiate a new interval. Normally, the timer is reset within a few seconds and the dispatch intervals defined thereby are calculated to take these few seconds into account in defining the time spacing of cars.

Several discrete functions are performed by the dispatch timers including a shortening of the dispatch interval under certain circumstances, the holding of a partially expired interval and the actuation of a dispatch signal. The speed at which a dispatch interval expires is accelerated in response to a predetermined level of load in a car by setting the interval ahead to a given point and then causing it to run at high speed from that point. A similar acceleration of the interval is achieved when the stop time attains a predetermined level while a given number of cars are accumulated at a terminal.

At a given point in the running of a dispatch interval, the presence of a car at the dispatching landing and its availability for dispatching are sensed, and the speed of the timer is increased. If no car is available, the timer interval expires in a fixed period. Upon expiration of the interval, a dispatch signal is generated if a demand for service is registered to which the car can respond. If no such demand is registered, the timer is held at its expiration point until one is.

When a car subject to dispatching is required to provide service from a dispatching landing in a direction opposite that in which it is dispatched, it can be taken out of dispatching up to the instant a dispatch signal is issued. Another car is substituted for the removed car, when it becomes available, and can be dispatched without further timing.

When the level of stop time is such as to indicate a moderate amount of service is being provided, it is undesirable to permit an accumulation of cars to stand at a terminal while they are dispatched in succession even for several shortened dispatch intervals. Impairment of service on this account is avoided by permitting more than one car to be dispatched from a terminal at the end of a single dispatch interval. In the exemplary four car system, the dispatch interval is accelerated when two cars are at a terminal and the stop time is characteristic of moderate service, and cars are dispatched on the termination of a single dispatch interval until only one remains if three or more are present at the terminal and moderate service is indicated by the level of stop time.

A dispatching system can be locked up by failure of a dispatch timer. In order to avoid the loss of service from this cause, a failure circuit is provided for the timer which in the event of timer failure causes cars to be started from dispatching landings in the same manner as from intermediate landings and, in cases where the lifting mechanism of a car has been deenergized, enables it to be energized prior to the starting controls.

Deenergization of the lifting mechanism for the cars, motor-generator sets in the example, has been provided to enable cars which are not required for service to be shut down while at a dispatching landing. This automatic shutdown occurs in response to the stop time remaining below a selected level for a given interval. Accordingly, restarting means are provided which are responsive to the dispatching means at that terminal as the dispatching sequence is actuated by increased service requirements. In the event of a power failure the motor-generator sets of cars at the terminal are restarted as the dispatch controls advance the cars through the dispatching sequence. Cars at floors other than those arranged for automatic shutdown are restarted by dispatch controls by simulating their presence at a dispatching landing. In the exemplary system, the sets are shutdown automatically only when their cars are at the bottom terminal and cars at other than the bottom terminal having their sets shutdown operate controls simulating their presence at the top terminal so that the top dispatcher can start them in sequence.

Four primary operating programs are illustrated. The programs comprise an up peak program, an off peak program, a down peak program, and an off hours program. They can be selected manually or automatically. Automatic selection is effected in response to stop time or combinations of stop time and other conditions. The selection of a program bars any other program.

The up peak program is introduced when the stop time of cars set to travel upward attains a given level characterized as the peak up stop time or when a second level is attained characteristic of moderate up stop time and the loading of a car reaches a given level. A clock control is provided to maintain the up peak program during a period for which a peak of up traffic is anticipated so that once up peak conditions are established during that period the program is held until the termination of the period or the decline in the up peak instituting conditions below the effective level, whichever is later.

The down peak program is introduced when the stop time for down traveling cars attains a down peak level.

It too is maintained if it is introduced during a period when down peak service is anticipated as defined by a clock control. Termination of the program occurs when the down stop time subsides below the down peak level or the period terminates, whichever is later.

When neither an up or down peak stop time level exists and the up and down peak programs are not in effect, the off hours program, or the off peak or balanced program is effective. If the stop time is above a predetermined level the off peak program prevails. This program can be made subject to the absence of a door reclosing feature which is instituted as the need for service by cars declines. As shown, under one option, the off peak program can be introduced only if no car is subject to door reclosing and the level of stop time is greater than a given level. When stop time falls below the level sustaining the off peak program, the off hours program is introduced. Transfer from the off peak to the off hours program requires the cessation of off peak conditions for an interval, which may be several minutes, in order to avoid premature shifting as where the requisite conditions change only momentarily.

Up and down stop time below the peak levels and above a predetermined level introduce timed dispatching from both terminals, high call reversing of cars, and late car dispatching from high calls by virtue of the introduction of the balanced or off peak program.

A level of stop time below that required to introduce the off peak program institutes door reclosing at the lower terminal, motor-generator set shut down of inactive cars, assignment of a load status car to serve all but the basement landing, and assignment of the car selected as next for load status assignment for service to the basement. It also sets up a car starting circuit which is immediately responsive to a car call registered in a car having its doors reclosed, and deenergizes the controls responsive to the number of cars at a terminal. These features are all incidents of the off hours program.

A unique aspect of the off hours program which avoids the activation of dormant cars unless absolutely required for service, yet does not impair service, is the maintenance of the load status on a car when it is away from the lower dispatching landing. Under these circumstances no change in the status of the remaining cars is required. Load status is maintained only if door reclosing is in effect. It is also dependent upon the absence of an up landing call at the first landing, since such a call causes the car selected as next for load assignment to receive that assignment and open its doors. Generally the load status will be maintained by a car absent from the dispatching landing if no calls to which a load car can respond are registered at the end of a given interval following the departure of the load car. A preference for cars having their motor-generator sets running for next car assignment is maintained during the interval any car has its doors reclosed so that the return of a car to the dispatching landing causes a next car having its set shut-down to revert to a standby status and substitutes the returning car therefore.

Confusion of passengers is avoided as cars subject to reclosing return to the lower dispatching terminal by preventing the reclosing of the returned load car doors until the doors of all other cars have been closed. Thus, a returning non-load car closes its doors a suitable interval after opening them upon its arrival at the lower dispatching landing and the load car, which had returned earlier, then recloses its doors. The first of any operating non-load car to return to the lower dispatching terminal prior to the load car operating away from the terminal will assume the load assignment.

Stop time of a given level is utilized to initiate zoning, preferential service to landing calls registered for a long interval, and immediate upward dispatching wherein timed dispatching from the lower terminal is eliminated. These features are incidental to the down peak program.

The above and additional objects and features of this invention will be appreciated more fully from the following detailed description when read with reference to the accompanying drawings wherein:

FIG. I is a diagrammatic representation of a dispatch timer motor suitable for utilization with this invention;

FIG. II is an across the line schematic circuit diagram of the stopping time monitoring and dispatcher control equipment of one embodiment of this invention;

FIG. III is a diagrammatic representation of a balancing motor such as can be incorporated with the bridge circuit of FIG. II to effect a feedback balancing;

FIG. IV is a dispatch timer control circuit utilizing this invention, set forth in across the line schematic form;

FIG. V is a schematic diagram of an elevator system typical of the type to which this invention is applicable, showing representative landings, cars, actuating motors and controls;

FIG. VI is an exemplary form of floor selector apparatus individual to each car for correlating signal and control functions with car position;

FIG. VII is an across the line wiring diagram of those circuits individual to each car for energizing its lifting mechanism and certain of its signal and control circuits;

FIG. VIII is an across the line wiring diagram of load weighing and door control circuits for a car;

FIG. IX is an across the line diagram of representative car call registering circuits for a car;

FIG. X is an across the line diagram of representative car call stopping circuits and the basement service circuits for a car;

FIG. XI is an across the line diagram of representative hall call registering and reset circuits hall call registration timer circuits, and hall call preference circuits common to a plurality of cars in the system, and fragments of the cooperating car circuits and hall call car stopping circuits for a typical one of the cars;

FIG. XII is an across the line diagram of a portion of the circuits controlling the floor selector and the acceleration and deceleration of a typical car;

FIG. XIII is an across the line diagram of signal and control circuits individual to a typical car including circuits for controlling the car accelerating mechanism, leveling mechanism, signal direction, motor field direction, retiring cam, motor-generator set controls, door standing time, high call reversal and brake;

FIG. XIV is an across the line diagram of circuits individual to a typical car including safety circuits, car starting circuits, leveling control circuits, car position indicating circuits, direction throwover circuits and travel limit circuits;

FIG. XV is an across the line diagram of car position indicating circuits and circuits for indicating the registration of and the position of hall calls with relation to car position which are common to the cars of the system, and a typical individual car's cooperating circuits for responding to and actuating those circuits;

FIG. XVI is an across the line diagram of individual car circuits for timing door operations, sensing obstructions in the door path, actuating high call controls, setting the car for attendant operation, by-passing calls and defining the extent of the up travel interval;

FIG. XVII is an across the line diagram of individual car circuits for failure sensing, next load car control, load car control, dispatching control and zoning or express-local control;

FIG. XVIII is an across the line diagram of the signal circuits for an individual car including those signals at the landings and in the car;

FIG. XIX is an across the line diagram of the hall lantern, the stop time measuring, and the door obstruction sensing photocell circuits for a typical car;

FIG. XX is an across the line diagram of the up and down trip stop time integrators for all the cars of the system;

FIG. XXI is an alternative form of up and down trip stop time integrator which can be substituted with certain modifications for the integrators of FIG. XVI;

FIG. XXII is an across the line diagram of the program selection and control circuits of the system;

FIG. XXIII is a clock controlled auxiliary to program selectors shown in across the line form;

FIG. XXIV is an across the line diagram of certain of the controls common to all cars which enable night selection, door reclosing, car counting and down dispatch signal sensing means;

FIG. XXV is an across the line diagram of the up and down dispatch detenting, scheduling, basement service and stop time level controls for the system;

FIG. XXVI is an across the line diagram of the up dispatching controls;

FIG. XXVII is an across the line diagram of the down dispatching controls;

FIG. XXVIII is an across the line circuit for measuring the integrated stop time of cars and for measuring the number of cars in service;

FIG. XXIX is an across the line diagram of the up and down dispatch timers;

FIG. XXX is an across the line diagram of the master control panel signal circuits; and FIG. XXXI is a functional block diagram of certain features of the invention presented to facilitate an appreciation of some of the broader concepts involved.

The material to follow is presented as it was disclosed in pending application Ser. No. 641,600, which was filed Feb. 21, 1957, and of which this application is a continuation.

Before proceeding with a detailed discussion of the illustrative embodiment of the invention, it should be noted that the invention is not to be read as restricted to the present disclosures and that numerous alternatives are available to those skilled in the art. The following discussion embraces a motor driven control for a dispatch timer which is also motor driven. Electronic timers employing discharge devices or their equivalents, transistors, as shown in the application Ser. No. 641,693, filed Feb. 21, 1957 of Joseph H. Borden and Raymond A. Burgy entitled "Elevator Controls" are embraced within the concepts of this invention. Further alternatives include timing devices utilizing condenser discharge or flux decay mechanisms to establish delays.

The mode of operation afforded by this invention is suited particularly to systems whereby the cars operate without attendants. However, it should be appreciated that the control actuated as taught here might also be employed to signal attendants. Similarly, in the instant example applied to control of a dispatcher machine the dispatch interval is measured from the departure of the next preceding car. Alternatively, the dispatch interval can be initiated from any convenient point such as the instant dispatch signal of the next preceding car to be dispatched from that landing is issued or from some predetermined instant in the dispatching operation at another dispatching landing.

Correlation between the relay actuated contacts and their actuating coils has been maintained in this description by employing the same reference characters for the several elements and indicating the spatial relationship by a marginal index on the drawings. Each actuating coil is positioned on an index line numbered at the right of the circuit diagram and its reference character is repeated in a marginal column adjacent the line number. The contacts illustrated which are actuated by that coil are listed by the number of the line in which they are located in the index column to the right of the reference character. The form of the contact location numbers in the index also indicates the nature of the contact, back contacts, those which are closed when the actuating coil is deenergized and are opened when the coil is energized, having their location numbers underlined, while front contacts, those normally opened and closed by the energization of their actuating coils, are not underlined. All contacts are illustrated in the positions they assume when their actuating means are deenergized.

The present disclosure embraces only a portion of an elevator system and illustrates only those elements considered necessary to an understanding of the invention. These elements are combined in a multicar system with the usual controls for stopping and starting the individual cars, registering car and landing calls, dispatching the cars from suitable locations and setting up operating patterns for the cars. The dispatching functions contemplated can include means for selecting a car from a plurality available at a dispatching landing and means for issuing a dispatching signal to the car either to start it in operation away from the landing or for issuing a signal to an attendant indicating that the dispatch interval has expired. The automatic features of this invention particularly adapt it for integration in known operatorless elevator systems; however, they also offer advantages when incorporated in systems operating under attendant control or to systems that can run with or without attendants.

A functional portrayal of certain salient features of this invention is set forth in the block diagram of FIG. XXXI. Two primary functions of the system are the dispatching of cars from dispatching landings and the programming of the operating modes of the group of cars to best satisfy the current service needs of the structure for which the system provides elevator service. Both of these functions are affected by the stop time of individual cars.

Stop time of cars provides a significant criteria of the service requirements currently imposed upon the system. Accordingly, this factor is employed to ascertain the need for any changes in the programming of the system or the dispatching of cars. A further refinement in the monitoring of the service provided is afforded by segregating the direction each car is set to travel and the region of its travel which the car is serving at the time its stop interval is measured. As shown in FIG. XXXI block $Aa$, $Ab$ and $Ac$ represents up travel sensing means for each of cars A, B and C, typical of the plurality of cars in the system, while blocks $Ba$, $Bb$ and $Bc$ represent the means for sensing that each car is set for down travel. The travel direction setting for the cars is combined with means for sensing the stop interval for each car as represented by blocks $Ca$, $Cb$ and $Cc$ and with means defining the region in which the car is located, represented by blocks $Da$, $Db$ and $Dc$ from which that information is applied to a traffic level integrator E over paths $Fa$, $Fb$ and $Fc$.

The group supervisory programmer G determines the operating modes of the system according to the stopping time of the cars as indicated from the traffic level indicator E, and other factors such as the number of cars in service or in service in a given region of the travel as determined by the car counter H, and the time of day indicated from program clock J. Programmer G is illustrated as establishing four discrete programs, balanced service K, up peak service L, down peak service M and off hours or night service N. While each of these discrete programs are essentially responsive to defined levels of car stop time, it is to be appreciated that particular features of service which may be gradations of these known programs or may be distinct therefrom may also be introduced in response to that factor and other factors significant of service conditions or demands for service.

The up and down stop time of the cars in significant regions of their travel, particularly at other than dispatching floors and floors beyond dispatching floors such as basements and attics, is fed to a stop time integrator P such as shown in FIG. XXVIII which controls the basic dispatching interval for dispatch timer Q such as those of FIG. XXIX. The number of cars available to be controlled by the dispatchers is also indicated over path I from control H to the dispatch timer to influence the length of intervals defined thereby. These timers issue dispatch signals to elevators conditioned to receive them as in the case of cars assigned by the load car assigner R to be loaded and located at the dispatching landings. Once a car is placed in its load assignment by actuating controls such as S$a$ for car $a$, it is conditioned to be started from the dispatching landing by a dispatch signal from timer Q as over path T. Ordinarily, shortly thereafter the dispatched car should start away from the dispatching landing as signified by the functional boxes U$a$, U$b$ or U$c$. In some instances the car doors may be held as by inconsiderate passengers or a failure in the car controls may prevent the running of the car. In the past the failure of the dispatched car to run blocked the introduction of another car into the load car assignment and locked up the dispatching sequence. A feature of the dispatcher which eliminates the lockup of the dispatching sequence when a car is held at the dispatching floor involves the release of the load car assignment at V upon the issuance of a dispatch signal.

In the present dispatcher a new load car can be assigned following the issuance of a dispatch signal. The dispatch timer is reset when the dispatch signal is applied to timer reset W. Following the reset of the timer it starts to define a new dispatch interval which, if permitted to expire, will cause the dispatch of a following load car. The previously dispatched load car retains a start signal as a result of its dispatch and when permitted to run leaves the dispatching landing and operates its start responsive means U to actuate timer reset W. Thus the timer is reset both at the time it issues a dispatch signal and at the time that dispatch signal causes a car to run so that the dispatch interval is defined from the preceding dispatch signal if the car does not run and from its departure if it does run.

Another feature of the dispatching and programming accomplished by this system involves improved off hours or night service. When the stop time of the cars diminishes below a chosen level, the off hours program is placed in effect. At this time the cars which are not required to serve the traffic are shut down by stopping them at the lower terminal, closing their doors, and turning off their motor generator sets. It is desirable to avoid restarting the motor generator sets unnecessarily. This is accomplished by concentrating service in as few cars as possible, preferably in a single car, through the retention of load assignment on a car even while it is away from the dispatching landing. Normally, cars are selected when available at a dispatching landing in response to a vacncy in the sequence which conditions cars first to respond to calls for service beyond the landings, as basement calls requiring downward travel from the lower dispatch landing, then if not sent to the basement introduces them to a "load" status when a vacancy occurs in that status. The load status vacancy, as explained, normally occurs when a dispatch signal is issued to a load car to actuate assignment release means V.

A load assignment holding means X is actuated during the off hours program when the control Y causing doors to be closed on cars at the dispatching landing is operated. Assignment holding means X maintains the load assignment on an elevator while it is away from the dispatching landing so that it can return to the landing and be available for further use without requiring the advance of the next car in the load assignment sequence or the advance of the returned car through that sequence. This holding of the load assignment is not permitted to impair service since the assignment release V is actuated if a given interval as measured by the dispatch timer expires without the return of the load car to the dispatching landing or if a call for service is registered at the dispatching landing while the load car is elsewhere.

In the illustrative embodiment a conventional motor driven dispatch timer is shown in FIG. I. It comprises a motor 1001, advantageously of the direct current type to facilitate speed control, having an armature shaft 1002 driving a gear train within gear box 1003 to rotate shaft 1004 at a reduced speed. A cam disk 1005 having a protuberance 1006, arranged to engage successively followers 1007 and 1008 of contacts 1009 and 1010, is rotated by shaft 1004 to issue dispatch signals in a well known manner as illustrated, for example, in J. H. Borden Patent 2,759,564 of Aug. 21, 1956 entitled "Elevator dispatchers."

As set forth in the Borden patent, motor 1001 is controlled by a circuit of the type shown in FIG. IV wherein rectified current is applied to the motor armatures 1012 and 1013 for the lower and upper dispatch timers respectively. The current is derived from a multivoltage source so that it can be applied to the armatures at different levels of voltage, as established for example by a selector switch 1034 which can be connected to the several taps 1014 through 1019 of an autotransformer 1020. These currents are fed to transformers 1022 through 1027 which in turn each feed respective rectifier bridges 1028 through 1033 supplying direct current to the armatures 1012 and 1013. Field windings (not shown) for armatures 1012 and 1013 are supplied from a source of direct current so that the speed of the motors is determined by the voltage applied to the transformers 1022 through 1027 and the number of transformers which are effective.

The current to the armatures 1012 and 1013 derived from contact arm 1034 of the autotransformer tap selector is fed to the transformers 1022, 1023 and 1024 supplying armature 1012 through the normally closed contacts FLD' of a full load dispatch relay (not shown) at line 1128 and back contacts DFU' at line 1129 of the up dispatch timer holding relay (not shown) while down dispatch armature 1013 is fed through back contacts DFD' of a down dispatch timer holding relay (not shown) and back contacts H4A' of a program relay (not shown) at line 1127. The full load dispatch relay is energized when the load in the car while at the lower terminal exceeds a predetermined level to increase the speed of the up dispatch timer. When the load reaches a level actuating the full load dispatch relay, contacts FLD' at line 1129 are closed and back contacts FLD' at line 1128 are opened to supplant the voltage from contact arm 1034 with a higher voltage from lead 1035 connected to the end of the autotransformer 1020. The current at junction point 1036 is fed through back contacts DFU' of an up dispatch timer holding relay which deenergizes that timer if no car is available for dispatching at the lower terminal or if the system is arranged to dispatch cars only while there is a demand for service, "on call operation," and the requisite demand is absent.

The portion of the voltage at junction 1036 which is effective to drive armature 1012 depends upon the number of transformers 1022, 1023 and 1024 which are in circuit and is greatest when all are effective. Operation of the full load dispatch relay energizes them all by closing contacts FLD' at lines 1128 and 1131 to complete the circuits for transformers 1024 and 1023, respectively, to lead 1037 and thus source 1038. These transformers are also operated in response to the accumulation of cars at the terminals so that the up dispatch timer armature 1012 rotates faster to shorten the dispatch interval when three or more cars are at the lower terminal by the closing of contacts BU2' at line 1129 of an up three car relay (not shown). This operation also reduces the rate at which additional cars arrive at that terminal by retarding the dispatching at the upper terminal. Down dispatch timer 1013 is slowed by opening back contacts BU2' at line 1126 to disconnect transformer 1026 and reduce the voltage applied to its armature. Conversely an accumulation of three or more cars at the upper terminal shortens the dispatch interval by closing contacts BD2' of a down three car relay (not shown) at line 1025 to energize transformer 1027 thereby increasing the voltage applied to armature 1013 and increasing the speed of the down dispatch timer while the up dispatch timer is retarded by opening back contacts BD2' at line 1130 to reduce the voltage applied to armature 1012 unless a full load dispatch relay has been actuated.

In accordance with the present invention the voltage at contact arm 1034 can be altered in response to the integrated stopping time of the system by engaging contact 1039 with arm 1034. This enables the contacts DS1′ through DS4′ at lines 1122 and 1123 to effect the connection of arm 1034 to various taps of autotransformer 1020 as the operating pattern of the active or "in service" cars change and thereby change the speed of the dispatching motors as a function of that pattern.

Connection of contact arm 1034 to contact 1039 in FIG. IV places full line voltage across the circuits driving armatures 1012 and 1013 from lead 1040 connected to source 1038 through back contacts DS1′, DS2′, DS3′ and DS4′ of the dispatcher speed control relays in line 1122, lead 1042 and thence to contact 1039. Dispatch speed control relays are successively energized as the integrated stopping time of the operating cars increases to reduce the voltage applied to arm 1034. Operation of these relays can best be understood by reference to FIGS. II and III.

Control of the dispatcher speed is realized by means of a bridge 1043 which continuously compares the number of cars stopped at landings between the terminals with the displacement of a contact actuator from a reference position. Displacement of the contact actuator establishes which of the dispatcher speed control relays is energized. Bridge 1043 is connected across leads L–1001 and L–1002 which are supplied from a direct current source. Armature 1044 of a direct current motor 1045 is connected across its output diagonal to respond to a predetermined balance and thereby actuate contacts. Other forms of translator devices can be substituted for the motor such as current sensitive relays. Further, while the following discussion of the bridge operation assumes the armature is quiescent when the null condition exists in the output diagonal due to a balance of the bridge arms, such null condition might be shifted by superimposing a signal on the bridge output so that the translator is quiescent at a selected point of unbalance in the bridge.

The contact actuating structure including motor 1045 of which armature 1044 is an integral part is shown in FIG. III. It is similar generally to the dispatch timer assembly of FIG. I in that its armature shaft 1046 drives a reduction gear, housed in gear box 1047, coupled to a shaft 1048 upon which is mounted a contact actuating disk 1049. A sector 1050 of greater radius than the remainder of the circumference extends over somewhat greater than 120° of the circumference of disk 1049 and is arranged to advance followers 1051 through 1055 radially outward as the disk is rotated clockwise from its reference position. Each follower actuates contacts identified by their general angular relationship around the axis of shaft 1048 from their reference positions as 0°, 30°, 60°, 90° and 120°, respectively. Thus, as shaft 1048 is driven clockwise the contacts 0° are first closed followed in succession by the other contacts.

A shunt motor field winding 1056 for motor 1045 is connected through resistor 1057 at line 1101 to leads L–1001 and L–1002.

Bridge 1043 comprises four legs, a first and second leg each including a resistor 1058 and 1059 which can be of equal magnitude and a third and fourth leg which vary in resistance with the operating conditions within the system. The third bridge leg comprises a group of parallel resistors 1060(A) through 1060(D), one for each of cars A through D which can be introduced into the bridge by stoppage of their respective cars at points intermediate the terminal landings. It should be noted that the number of cars which can be controlled by this mechanism is unlimited, each car merely requiring a parallel branch in the third bridge leg. Resistors 1062 through 1066 in the fourth bridge leg are the counterpart of resistors 1060(A) to 1060(D). As the resistance in the third leg of the bridge is reduced below that in the fourth leg conventional current tends to flow upward through the output diagonal causing armature 1044 to drive disk 1049 clockwise as shown in FIG. III. Conversely, when the fourth arm has less resistance than the third arm current tends to flow downward in armature 1044 and cam 1049 is rotated counterclockwise.

The third leg is reduced in resistance only when a car which is in service is coming to a stop or is stopped at an intermediate floor since under all other conditions the resistance 1060 is disconnected from line L–1002. Back contacts MG′(A) through MG′(D) at lines 1102 to 1105 are actuated by car position relays (not shown) which are energized when the cars A through D, respectively, are below the landing immediately above the lower dispatching landing. Note that the parenthetical suffix on a reference character identifies an element which is individual to a car having the corresponding designation. Thus, when a car is at the lower dispatching landing or a floor below, such as the basement, its MG′ contact is open and its resistor 1060 cannot conduct bridge current. Similarly, back contacts MG1′(A) to MG1′(D) at lines 1102 to 1105 are actuated by car position relays (not shown) which are energized when the car is above the landing immediately below the upper dispatching terminal to exclude stops above that position. The resistors are also disconnected unless the car's respective in service relay (not shown) is energized to close its contacts OE′(A), OE′(B), OE′(C) or OE′(D) in lines 1102 to 1105.

Monitoring of the stopping intervals of the several cars as reflected by the insertion of their individual resistors 1160 in the third bridge leg is effected by back contacts AMR′(A) through AMR′(D) in lines 1102 through 1105. These contacts are actuated by an advance motor relay (not shown) which is arranged to be energized while the car is running and until the car picks up a signal to stop. It remains deenergized throughout the stopping interval and until the car starting controls are operated at which time it is reenergized. It is recognized that the controlled introduction of resistors or other impedance elements into the bridge can be effected by other control elements or for other intervals, for example the door open interval might be measured for each car by including in the circuits for resistors 1060 a contact actuated by a door limit switch or gate relay.

Resistance in the fourth leg of the bridge is controlled by the angular displacement of armature 1044 through speed control relays, 0, 1S, 2S, 3S and 4S in lines 1110 to 1118 and in turn by dispatcher speed control relays DS1′ through DS4′. When the disk 1049 is in its reference position, just sufficiently counterclockwise from the 0° contact follower 1051 to permit those contacts to open (as shown in FIG. III), the fourth leg of the bridge is open. If the system is dormant, as when no calls are registered in an "on call" dispatching arrangement so that the third leg is also open and all cars are at positions which operate either their MG′ or MG1′ relays to disconnect their resistors 1060, the translator 1044 is deenergized. Introduction of a resistor 1060 into the third leg enables an upward flow of current in the bridge output diagonal causing armature 1044 to rotate disk 1049 clockwise to close contacts 0° in line 1111. This energizes relay 0 thereby closing contacts 0 at line 1106 to introduce resistance 1062 into the fourth bridge leg and closing contacts 0 at line 1112 to prepare the holding circuit for relay DS1′. The resistances of the third and fourth legs may thus be established at a level eliminating the flow of actuating current in the output diagonal and armature 1044 as in the case of equal resistance values for resistors 1060 and 1062 or they may merely alter the magnitude of that current.

If the current in the diagonal flows upward with both legs in circuit, armature 1044 would drive disk 1049 further clockwise actuating follower 1052 to close contacts 30° and energize relay 1S in line 1112. Relay 1S closes its contacts at line 1113 to energize relay DS1′ and closes its contacts at line 1114 to enable the holding circuit for relay DS2′. Relay DS1′ adds a second resistor 1063 in parallel with resistor 1062 in the fourth bridge leg thereby tending to reduce the upward flow of current through armature 1044. It also actuates back contacts DS1′ in line 1122 of FIG. IV to disconnect arm 1034 from lead 1040 and closes contacts DS1′ at line 1123 to connect the arm 1034 to tap 1018 which is at a potential below that of lead 1040. Thus, the potential applied to the dispatch timer motors is reduced reducing the speed of those motors.

Additional contacts of the dispatcher speed control relays DS1′ to DS4′ are closed, if the upward flow of current in armature 1044 continues, introducing additional parallel paths in the fourth bridge leg and further reducing the speed of the dispatch timer motors. At some point the flow of current upward is terminated either by a balance of the bridge in which case no current flows and the armature 1044 remains stationary maintaining the then established dispatching interval, or, as is more usually the case, by an overbalance of the bridge causing a downward current flow.

Downward flow might be introduced by a reduction in the number of parallel paths in the third bridge leg as where one of several cars having overlapping stopping intervals is started or where the fourth leg is reduced sufficiently in resistance. This flow causes armature 1044 to drive disk 1049 counterclockwise. If the downward flow began while the leading edge of sector 1050 was between followers 1052 and 1053 so that relays 0, 1S and DS1′ was energized, the retreat of this edge to open contact 30° and deenergize relay 1S has no effect upon the remainder of the circuit since now open contact 1S in line 1113 is by-passed by the hold circuit for relay DS1′ including contacts 0 and DS1′. Accordingly, the maintenance of that condition causes the continued clockwise motion of disk 1049. This motion might be arrested by the stoppage of another car in the system. If it continues, contacts 0° are opened deenergizing relay 0 and opening contacts 0 at line 1112 in the holding circuit of dispatcher speed control relay DS1′. Relay DS1′ is thus deenergized when disk 1049 is 30° behind the position wherein it effects its energization, as are succeeding relays of the group introducing resistors in the fourth leg.

The deenergization of relay 0 also opens contacts 0 in line 1106 to remove the only remaining complete path for the fourth bridge leg. Thus, the armature is deenergized and motion of disk 1049 is terminated with the disk displaced clockwise from follower 1051 just enough to open contacts 0°, this has been designated the reference position of the disk and armature.

The above successive closures and openings of contacts 0°, 30°, 60°, 90° and 120° occur more rapidly as the number of car stops is increased since the stopping of two cars reduces the resistance of the third leg to one half that for a single stopped car while three stopped cars reduce it to one third and four to one quarter. Accordingly, the voltage differences are greater and the motion of armature toward a balanced position is more rapid the greater the degree of change of activity in the system. In such instance, hower, the greater the total length of the stopping intervals for the several cars the greater the clockwise displacement of disk 1049, and the greater the number of the dispatcher speed control relays which are maintained energized. Thus, the displacement of disk 1049 and the number of dispatcher speed control relays energized is a function of the integrated stopping time of cars A through D at the intermediate landings.

An understanding of the measurement effected by the system illustrated in FIG. II can be attained by considering the operation of a single car, car A for example, which is placed in operation after the system has been quiescent for an interval sufficient to enable armature 44 to rotate to the position permitting contact 0° to open, to the reference position. During the first stop, resistor 60′(A) is connected through contact AMR′(A) to alter the resistance of the upper variable bridge arm from an infinite resistance to the resistance of the resistor. Since the resistance of the lower variable bridge arm is infinite at the reference position, all of contact 0 and DS1′ through DS4′ are open, a fixed current flows upward in armature 1044 until it is rotated to close contact 0°. The closure of contact 0° inserts resistor 1062. If the car remains stopped, the speed of the armature will be constant for the initial voltage level developed across it and will be altered at the instant contact 0° is closed in accordance with the new voltage developed by ratio of the resistances in the two arms of the bridge. Assume that resistor 1062 is of greater resistance than resistor 60′(A) so that current continues to flow upward in armature 1044 but that a lower voltage level is developed so that the speed of armature rotation is reduced at this step. Thus, if the stop continues, resistors 1062, 1063, 1064, 1065 and 1066 will successively be added in parallel at successively longer intervals, as the parallel resistors making up the resistance of that arm are added to reduce the resistance until it is equal to or less than the resistance of resistor 1062 and upward current in the armature ceases.

When car A is restarted contact AMR′(A) is opened increasing the resistance of the upper arm to infinity. The degree of displacement of armature 1044 from the reference position at this moment is determined by the length of time car A was stopped. When it starts, the current flows through armature 1044 in a downward direction and a voltage is developed across the armature to determine its speed of rotation toward the reference position, in accordance with the level of resistance in the lower arm including resistors 1002 to 1066.

If the interval to the next stop is of sufficient length, armature 1044 is rotated back to the reference position. If another stop is made before the armature is driven to the reference position its rotation is reversed, again at a speed in accordance with the voltage developed across the bridge output by the relative resistance levels of the third and fourth arms. Thus, it will be seen that armature displacement which introduces the control operations of this system is a function of the integrated stop time as it is related to the elapsed time less the stop time and that therefore the control operations are introduced as a function of the relationship of a function of integrated stop time (i.e., the resistance periodically introduced into the upper arm of the bridge as related to that in the lower arm, the length of its introduction, and the resultant rotation of the armature from the reference position) and a function of the elapsed time less that integrated stop time (i.e., the resistance of the lower arm of the bridge as related to that in the upper arm, the length of time it is predominant in causing downward current flow in the armature, and the resultant rotation of the armature toward the reference position). These relationships are maintained as additional cars operate and are stopped, since their stopping time is also integrated as a function of armature displacement from the reference position, and while they are not stopped that function is reduced to either reduce the speed of displacement from the reference position, assuming sufficient other cars are stopped to cause the resistance of the upper arm to be less than that of the lower arm, or to permit displacement in the opposite direction, if the lower arm is of less resistance than the upper arm. Armature displacement is thereby determined at any instant in accordance with the displacement from the reference point due to the integrated stop time as reduced or overcome by the displacement toward the reference point during the period which is the difference between elapsed time and stop time. This results in a function (armature displacement) which approximates a continuous average of the ratio of a function of stop time to a function of the difference between elapsed time and stop time.

The highest order of energized dispatcher control relay is the only one effective in controlling the speed of the dispatch timer motor and the resultant speed of the motor is an inverse function of the integrated stopping time of the cars. In the initial condition the disk 1049 closes none of contact 0° through 120° and hence line voltage is applied to arm 1034 of FIG. IV. The timer motors operate at their maximum normal speed, barring the acceleration introduced by operation of a full load dispatch relay for a car, in this condition. As the number and length of stops, the integrated stopping time, attains higher levels, successively higher dispatcher speed control relays are energized by the further clockwise displacement of disk 1049 and a smaller portion of the line voltage is applied to arm 1034 since less of the winding of autotransformer is effective in supplying lead 1042. The dispatch timer motors therefore run slower and the dispatch intervals are greater.

The above arrangement lends itself to many adjustments and therefore can be set to provide a dispatch interval which is any of a wide range of functions of the integrated stopping time, integrated round trip time or other integrated time dependent function of the operating pattern of one, a plurality or all cars of an elevator system. Thus, the circuits introducing the parallel resistors in the third leg of the bridge might be modified to means bypassing one or more of a series of resistors in response to car stops and might be actuated by other controls such as elevator gate control relays which close contacts while the car gates are open. Also means monitoring total trip time in a single direction might be substituted, admittedly with a much coarser sensing of integrated operating time and a substantial delay in response to shifts in the operating pattern. Such operation can be sensed by monitoring integrated stopping time as represented by the operation of contacts actuated by the direction control of lifting motor field relays. The degree of response of the armature is subject to adjustment by choice of the number and magnitude of resistors 1060, and 1062 through 1066, the number of dispatcher speed control relays, the gears in box 1047, the angular relationship of contacts 0° through 120°, and the location of taps 1014, 1016, 1017 and 1018 on autotransformer 1020. In addition, the control can be applied to only a single dispatch timer or can be arranged to alter the dispatch intervals of two dispatchers in a different manner as by increasing the speed of one and decreasing the speed of the other.

The above dispatcher control thus enables a pattern to be set up with a great deal of flexibility as to the number of cars, number of landings, stopping time at landings, running speed of cars and choice of landings effective in the stop sensing circuits by choice of circuit components as taught here. The use of such circuits correlates the dispatch interval with the trip time by taking account of the major variable in trip time, the stopping time, continuously averaging that stopping time and continuously altering the dispatch interval in accordance therewith. While the interrelating function between stopping time and the dispatch interval is a matter of choice and falls within a wide range so far as the capacities of the present circuit are concerned, it has been found desirable to smooth the peaks and valleys of the operating pattern. Thus, the increases in dispatch interval, particularly those for the longest intervals, have been chosen somewhat less than the proportional increase in average round trip time and a lag in the reversion to the next lower relay in the dispatcher speed control group has been introduced by establishing a drop out level for each of those relays somewhat below that required for pull in.

In one installation involving service by four cars to twelve landings and including dispatching both upward and downward the basic round trip time has been set at about 72 seconds. This is determined from a running time in each direction of about 24 seconds when the door closing interval, and acceleration and deceleration at the terminals are considered, a minimum standing time at each terminal of about 5 seconds, and a single stop of 14 seconds at a landing intermediate the terminals. This indicated a dispatch interval for four cars of 18 seconds. Each additional stop consumes about 14 seconds so that the system is arranged to introduce the first change in dispatch timer motor speed, raising the dispatch interval to 25 seconds, when each car on the average makes somewhat greater than three stops per round trip. A second step is effected when the number of stops increases to about five per average round trip so that a dispatching interval of 31 seconds is set up, while a 38 second interval is appropriate for about seven stops and a 45 second interval is utilized when nine or more stops are required in an average round trip.

Note that the inclusion of the stopping time at the dispatching landing or landings is included in the basic interval and is not monitored since it is relatively fixed. However, if desired or if no fixed loading time is employed, stops at the dispatching terminal might also be made effective in the bridge for one or more of the cars by eliminating appropriate back contacts of the car position relays MG' or MG1'. An appropriate choice of circuit parameters will enable any stopping interval to alter the controls for the car or the system in a desired manner as determined by the above stopping time integrating equipment as by adding to the dispatch interval to maintain a uniform car distribution in the system. Conversely, as the number of stops declines the dispatch interval is decreased until the basic interval is reestablished. While not essential to the invention, it is advantageous in some instances to introduce a slight lag in the return of a controller to the initial state when the length of stopping intervals decline as by maintaining a dispatching interval until the integrated stopping time falls below the ascending threshold level for the introduction of the next lower level of time from that presently in effect. This lag reduces hunting in the dispatch timer.

While the details of another stopping time integrating means are set forth in the above-noted application Ser. No. 641,693, filed Feb. 21, 1957, of J. H. Borden and R. A. Burgy filed herewith it is to be understood that the present system is intended to embrace the concepts detailed therein as well as other integrating techniques employing monitoring of the operating pattern by sensing the stopping time of the cars, and thereby controlling pattern altering equipment. These might be realized with other forms of bridge and balancing circuits and can employ other than electro-mechanical means either with the bridge or with other balancing circuits.

In view of the wide range of equivalents available to one skilled in the art it is to be appreciated that the above is merely illustrative of the present invention and is not to be read as limiting its spirit or scope.

The material just preceding was disclosed in copending application, Ser. No. 641,600, which was filed Feb. 21, 1957, of which this application is a continuation. The material to follow is represented as it was disclosed in copending application, Ser. No. 683,327, filed Sept. 11, 1957, and also of which this application is a continuation.

A typical elevator system of four cars serving ten floors and a basement has been chosen for illustration of this invention in FIGS. V through XXX. Such a system is represented in FIG. V wherein each car 530 is provided with a closure 531 of one or more doors and a door operating mechanism 532 including a motor, timers for measuring the interval the car is open, limit switches responsive to door position, and safety mechanisms. The four cars are designated cars A, B, C and D and the reference characters for individual elements associated therewith where shown in duplicate for the several cars are identified with the respective cars by a parenthetical suffix letter as 531(A) for the closure of car A and 531(D) for the closure of car D. The cars are illustrated as located at the tenth, fifth, first and basement landings, many of the intermediate landings being deleted for convenience in illustrating the invention.

A lifting motor 533 advantageously of the variable voltage, direct current type, is energized from a motor-generator set (not shown) in any convenient manner as is known to the art, and is coupled to the car by means of a shaft 534 upon which is mounted a cable sheave 535 for lifting cables 536. Control of the lifting motor is effected for accelerating and and decelerating by means of sequencing device 537, advantageously a cam operated rheostat. Operation of a car and the system as a function of car position is implemented by a floor selector 538 comprising an array of contacts positioned to correspond to landings and a cross head 539 carrying brushes for engaging the contacts and arranged for movement in accordance with the effective car position as will be discussed more fully with reference to FIG. VI. The crosshead 539 is driven by an essentially constant speed advance motor 540 to advance the brushes along the contacts. A shaft 542 of advance motor 540, and shaft 534 coupled thereto through a clutch 543 in combination drive a differential 544 which in turn drives the sequencing device 537.

Each car is provided with a group of individual control circuits represented by block 545 and the system master control is represented by block 546 coupled to the individual car controls.

Service requirements are registered at the several landings by registering devices 547 conveniently located with respect to the car entrances. These devices will be considered as push button switches for illustrative purposes although alternative devices are known. Each landing except those at the car travel limits is provided with an up and a down hall button while the uppermost landing has only a down button and the basement landing only an up button. Car occupants register their service requirements on car buttons for the several landings located on a panel 548 which can include additional controls as will be discussed. For the convenience of the passengers a second car button panel 549 is located in the car in a position remote from the panel 548, as on another wall of the car, so that car calls can be registered at either position.

The presence of a car at a landing and the direction in which it is set to leave the landing is indicated by some conveniently located means such as a hall lantern 551. Separate up and down indicators for each car can be provided at the landings intermediate the limits of travel, each car has an up indicator at its lower limit, and each has a down indicator at its upper travel limit.

Correlation of the operation of floor selector 538 with car position so that signals are picked up in advance of the car, the car is slowed and stopped, effective car position is indicated, signals to which the car has responded are reset, the car is reversed at its highest call or at the top of its zone and other functions are affected, is accomplished by mechanically advancing a brush supporting crosshead 539 as the car is operated. That crosshead is positioned with respect to rows of contacts 549 associated with the several landings served in correspondence with the effective car position, as best seen in FIG. VI. These contacts 549 are arranged in lanes along the path of the crosshead, shown as vertical in the drawing, so that contacts of a lane perform like or related functions for the landings of their respective rows when engaged by brushes 541. Since the cars travel at speeds requiring substantial slow down intervals, the crosshead 539 is driven ahead of the car while the car is in motion or conditioned to move and is in actual correspondence with car position only while the car is stopped. The means for advancing the crosshead with respect to the car position is an advance motor 540 which runs, when the car is set to run, to rotate a shaft 550 coupled to the crosshead by means of the pulleys 552 and chain 553 which extends to corresponding pulleys 554 at the top of the selector machine contact panel 555.

An appreciation of this system will be facilitated by first considering the operation of an individual car and then integrating that operation with other elements, the combinations and subcombination providing the comprehensive service demanded of present day systems. Many of the controls are individual to the cars, a four car system having them duplicated four times. In the interest of reducing the disclosure of the system to its simplest terms the control circuits of only one car have been illustrated in most instances and points at which controls are multiplied or paralleled are shown as discontinuous arrow-headed lines.

Those relays which are provided for each car but are shown only once in this disclosure to illustrate their functions for a typical car are as follows:

| Symbol—Name: | Line Location |
|---|---|
| A—Acceleration Relay | 113 |
| AA—Acceleration Relay | 114 |
| AM—Auxiliary Main Switch | 118 |
| AMR—Advance Motor Auxiliary Relay | 121 |
| AMR1—Advance Motor Auxiliary Relay | 122 |
| AT—Acceleration Time Relay | 186 |
| BK—Brake Relay | 157 |
| BK1—Brake Relay | 159 |
| BP—By-Pass Relay | 241 |
| BR—Basement Run Relay | 221 |
| BS—Basement Service Relay | 69 |
| BST—Basement Service Time Relay | 74 |
| BSTA—Basement Service Time Relay | 73 |
| BS1—Basement Service Relay | 66 |
| BS2—Basement Service Relay | 67 |
| BS3—Car Position Relay | 223 |
| BZT—Door Close Buzzer Time Relay | 185 |
| CB—Car Signal Direction Relay | 55 |
| CBA—Car Signal Direction Relay | 56 |
| CBD—Car Signal Direction Relay | 65 |
| CB1—Car Signal Direction Relay | 68 |
| CDDA—Down Dispatch Relay | 264 |
| CDLA—Down Load Relay | 261 |
| CL—Door Closing Relay | 36 |
| CLA—Door Closing Relay | 172 |
| CLB—Door Closing Relay | 35 |
| CL1—Door Closing Relay | 174 |
| CL3T—Door Reclosing Timer Relay | 26 |
| CL4—Door Reclosing Relay | 27 |
| CS—Car Starting Relay | 170 |
| CUDA—Up Dispatch Relay | 258 |
| CULA—Up Load Relay | 253 |
| CULB—Up Load Relay | 251 |
| CUNA—Up Next Car Relay | 265 |
| CUT—Minimum Dispatch Timer | 254 |
| DF—Down Generator Field Relay | 160 |
| DF1—Down Generator Field Relay | 159 |
| DF2—Down Generator Field Relay | 144 |
| DL—Down Signal Direction Relay | 140 |
| DL1—Down Signal Direction Relay | 141 |
| DT—Door Motor Holding Timer Relay | 34 |
| EL—Express-Local Relay | 263 |
| EM—Emergency Relay | 165 |
| F—Failure Relay | 256 |
| FD—Dispatch Failure Relay | 344 |
| FLD—Full Load Dispatch Relay | 267 |
| FT—Failure Timer | 260 |
| FTD—Dispatch Failure Timer | 250 |
| FTDA—Dispatch Failure Timer | 343 |
| G—Gate Relay | 167 |
| GA—Auxiliary Gate Relay | 168 |
| HC—Highest Call Relay | 237 |
| HCR—High Call Reverse Relay | 155 |
| HCT—Highest Call Relay | 205 |
| HT—Switch Time Relay | 138 |

| Symbol—Name: | Line Location |
|---|---|
| L—Limit Relay | 198 |
| LA—Leveling Acceleration Relay | 135 |
| LA1—Leveling Acceleration Relay | 136 |
| LBP—Load By-Pass Relay | 21 |
| LD—Down Leveling Relay | 180 |
| LR—M-G Set Run Switch | 151 |
| LS—M-G Set Start Switch | 149 |
| LSA—M-G Set Starting Relay | 15 |
| LU—Up Leveling Relay | 178 |
| LW—Load Weighing Relay | 23 |
| MG—Bottom Dispatching Floor Relay | 219 |
| MGA—Bottom Dispatching Floor Relay | 220 |
| MGE—Local Zone Car Position Relay | 189 |
| MGF—Stop Time Relay | 297 |
| MGT—M-G Set Automatic Shutdown Timer | 14 |
| MG1—Top Dispatching Floor Relay | 213 |
| OE—Individual Service Relay | 17 |
| OEA—Individual Service Relay | 16 |
| OP—Door Opening Relay | 31 |
| OPA—Door Opening Relay | 33 |
| OPC—Door Opening Slowdown Relay | 255 |
| OPS—Door Opening Slowdown Relay | 30 |
| OP1—Door Opening Relay | 32 |
| PC—Photocell Relay | 234 |
| RB—Car Button Reset Relay | 192 |
| RC—Retiring Cam Relay | 147 |
| RE—Rectifier Disconnect Relay | 13 |
| RL—Direction Throwover Relay | 191 |
| S—Landing Signal Stopping Relay | 95 |
| SC—Vernier Stopping Sequence Relay | 53 |
| SD—High Call Slowdown Relay | 104 |
| SF—Low Speed Series Field Switch | 134 |
| STT—Up, Dispatch Starting Time Relay | 259 |
| TR—Start Time Relay | 153 |
| TRL—Standing Time Saver Relay | 232 |
| TRLA—Standing Time Saver Relay | 230 |
| TR2—Start Time Relay | 142 |
| UF—Up Generator Field Relay | 157 |
| UF1—Up Generator Field Relay | 158 |
| UF2—Up Generator Field Relay | 143 |
| UL—Up Signal Direction Relay | 139 |
| ULF—Up Signal Direction Relay | 243 |
| V—Advance Motor Stopping Relay | 124 |
| VR—Advance Motor Stopping Relay | 130 |
| VRT—Advance Motor Stopping Relay | 133 |
| VR1—Advance Motor Stopping Relay | 132 |
| VR2—Advance Motor Stopping Relay | 131 |
| WT—Rheostat Sequence Relay | 145 |
| 2LD—Low Down Speed Leveling Relay | 184 |
| 2LU—Low Up Speed Leveling Relay | 182 |
| 2SD—Second Slowdown Relay | 111 |

Those relays individual to the cars which are shown for each car are:

| Symbol | Name | Line Location |
|---|---|---|
| CA(A), CA(B), CA(C), CA(D) | Car Available Relays | 410, 412, 414, 416 |
| CDD(A), CDD(B), CDD(C), CDD(D) | Down Dispatch Relays | 463, 465, 467, 469 |
| CDL(A), CDL(B), CDL(C), CDL(D) | Down Load Relays | 454, 455, 456, 457 |
| CUD(A), CUD(B), CUD(C), CUD(D) | Up Dispatch Relays | 427, 429, 431, 433 |
| CUL(A), CUL(B), CUL(C), CUL(D) | Up Load Relays | 420, 422, 424, 426 |
| CUN(A), CUN(B), CUN(C), CUN(D) | Up Next Car Relays | 411, 413, 415, 417 |

Those relays common to the system and functioning as master control elements comprise:

| Symbol—Name: | Line Location |
|---|---|
| BDR—Down Car Run Relay | 214 |
| BD2—Down 2-Car Relay | 360 |
| BD3—Down 3-Car Relay | 361 |
| BU—Basement Service Relay | 395 |
| BUR—Up Car Run Relay | 218 |
| BU2—Up 2-Car Relay | 364 |
| BU3—Up 3-Car Relay | 365 |
| C—Clock Relay | 346 |
| DFD—Down Dispatch Timer Hold Relay | 381 |
| DFDA—Down Dispatch Timer Hold Relay | 380 |
| DFDL—Down Dispatch Timer Reset Relay | 368 |
| DFDT—Down Dispatch Timer Reset Relay | 369 |
| DFU—Up Dispatch Timer Hold Relay | 392 |
| DFUA—Up Dispatch Timer Hold Relay | 391 |
| DFUL—Up Dispatch Timer Reset Relay | 439 |
| DFUT—Up Dispatch Timer Reset Relay | 436 |
| DS1—Stop Time Relay | 404 |
| DS2—Stop Time Relay | 403 |
| DS3—Stop Time Relay | 402 |
| DS4—Stop Time Relay | 401 |
| ECA—Program Selection Relay | 335 |
| ECT—Program Selection Timer | 326 |
| H2—Program Selection Relay | 329 |
| H3—Program Selection Relay | 331 |
| H4—Program Selection Relay | 333 |
| J0—Up Dispatch Timer Failure Relay | 505 |
| J1—Up Dispatch Timer Relay | 506 |
| J2—Up Dispatch Timer Relay | 505 |
| J3—Up Dispatch Timer Relay | 502 |
| KD—Down Scheduling Relay | 386 |
| KDT—Down Scheduling Timer | 399 |
| KU—Up Scheduling Relay | 388 |
| KUT—Up Scheduling Timer | 400 |
| K0—Down Dispatch Timer Failure Relay | 493 |
| K1—Down Dispatch Timer Relay | 494 |
| K2—Down Dispatch Timer Relay | 492 |
| K3—Down Dispatch Timer Relay | 491 |
| K4—Down Dispatch Expediter Relay | 342 |
| LCR—Late Car Reversal Relay | 340 |
| LNT—Terminal Lantern Relay | 393 |
| MD—Moderate Down Stop Time Relay | 309 |
| MU—Moderate Up Stop Time Relay | 304 |
| NS—Next Selection Relay | 351 |
| NSCL—Load Selection Relay | 451 |
| OE3—3-Car In Service Relay | 477 |
| OE4—4-Car In Service Relay | 479 |
| PD—Peak Down Stop Time Relay | 308 |
| PE—Express By-Pass Relay | 106 |
| PL—Local By-Pass Relay | 108 |
| PS1—Program Selection Relay | 347 |
| PS1A—Program Selection Relay | 320 |
| PS2A—Program Selection Relay | 321 |
| PS3—Program Selection Relay | 349 |
| PS3A—Program Selection Relay | 323 |
| PS4A—Program Selection Relay | 325 |
| PU—Peak Up Stop Time Relay | 303 |
| RCL—Door Reclosing Relay | 354 |
| RDSU—Up Rotary Dispatch Selector | 419 |
| RDSD—Down Rotary Dispatch Selector | 460 |
| R1—Stop Time Relay | 474 |
| R2—Stop Time Relay | 473 |
| R3—Stop Time Relay | 472 |
| R4—Stop Time Relay | 471 |
| SBU—Hall Call Relay | 90 |
| SS—Hall Call Indication Relay | 212 |
| STD—Hall Call Relay | 80 |
| S1D—Hall Call Relay | 84 |
| S1DA—Hall Call Relay | 398 |
| S1U—Hall Call Relay | 88 |
| S1UA—Hall Call Relay | 397 |
| S2D—Hall Call Relay | 82 |
| S2U—Hall Call Relay | 86 |
| T2W—Overtime Wait Timer | 105 |
| T5P—By-Pass Timer | 103 |
| T8W—Overtime Wait Timer | 100 |
| T9P—By-Pass Timer | 98 |
| XCL—Load Car Door Hold Relay | 357 |

These relays and all others illustrated are shown in across the line diagrams. Their contacts therefore are often located remote from the actuating coils. In order to illustrate the relationship and location of actuating coils and contacts, a marginal key has been employed with each circuit diagram whereby the circuits are divided into horizontal bands which are identified by line numbers in the right hand margin of the figure. Relay symbols are located in that margin to the right of the key numerals and in horizontal alignment with the relay actuating coil positions. Each contact actuated by a relay coil is designated to the right of the relay symbol by the numeral of its line location. Back contacts, those which are normally closed when the relay armature is dropped out and are opened when the actuating coil is energized, are underlined in the key to distinguish them from front contacts, those which are closed upon the coil being energized. Thus, for example, individual service relay OEA has its actuating coil located on line 16 of FIG. VII and when energized closes its front contacts at lines 213, 241 and 252 of FIGS. XV, XVI and XVII, respectively designated in the margin as 213, 241 and 252 and opens its back contacts at line 396 of FIG. XXV designated in the margin by 396. Each contact is also labeled with the symbol of its actuating means and is illustrated in the condition it assumes while its armature is dropped out so that the front contacts of the individual service relay are shown open as in line 213 and is labeled OEA while the similarly labeled back contact in line 396 is shown closed.

In initiating operation of a car the motor generator set is first placed in operation. The motor-generator actuating controls for an individual car are shown in FIG. VII. They comprise means for energizing the motor-generator set and the remainder of the control system associated with that car upon the energization of rectifier disconnect relay RE at line 13. Main leads P and Y are energized from an alternating current source and supply relay RE through normally closed contacts of an overload relay OL (not shown), a normally closed motor-generator set stop switch MGS1 located at the set, the closed contacts of a reverse phase relay RP (not shown) connected in the three phase supply to the system so as to be pulled in as long as the lines are connected properly, and normally closed motor-generator stop switches MGS2, MGS3 and MGS4 which can be located at the controller panel for the car, in the starter's panel at a dispatching terminal and in the car respectively. This circuit is completed to main lead Y by closure of one of the contacts or series of contacts extending from lead X to lead Z and thence to lead Y. The functions of those circuits above the normally closed attendant throwover contacts TO in the line X will be discussed below with the overall system controls. Manual starting of the motor-generator set is accomplished by closing one of the motor-generator start switches MGB–1, MGB–2, MGB–3 and MGB–4 located with the corresponding stop switches at the set, the controller, the starter's station, and in the car respectively. The start switch is maintained closed until the set is up to speed and contacts LR are closed in line 13 to establish a holding circuit for relay RE which is retained until the conditions in the system reach a state warranting the shutting down of the set by opening of one of the overload, stop, reverse phase or motor generator automatic shutdown timer contacts MGT.

Upon closure of its energizing circuit, relay RE closes contacts (not shown) which apply a direct current source across the direct current car controller circuits of FIGS. XIII and XIV, closes contacts RE in line 15 to energize motor-generator set starting relay LSA, and opens back contacts (not shown) in the elevator motor shunt field (not shown) to remove a shunt around a current sensitive, motor field protective relay FP (not shown) so that relay will pull-in when the field current has built up to a predetermined level. While the motor field current is below the pull-in level for relay FP, motor-generator starting relay LS in line 149 of FIG. XIII is energized through back contacts FP in line 148 and closed contacts LSA in line 151. Front contacts (not shown) of relay LS connect the three phase motor (not shown) of the motor generator set in a Y connection to start the motor. This connection is maintained until the motor has attained a predetermined speed, essentially synchronous, as measured by the current level in one arm of the Y by a motor-generator acceleration relay ACC (not shown) which drops out when the current falls below the hold-in value of that relay. Thus contacts ACC at line 149 are closed until the set is up to speed.

When the set attains speed, contacts ACC at line 149 open to deenergize relay LS thereby opening the Y connection in the set motor and closing back contacts LS at line 151 to energize motor-generator set running relay LR since contacts FP of the lifting motor field protective relay are now closed. Relay LR closes contacts (not shown) in the set motor to connect it in delta and maintain that connection until the set is shutdown. It also establishes a holding circuit for relay RE which is maintained during car operation by the closure of contacts LR at line 13.

The car is conditioned to operate when its motor-generator set is placed in operation provided individual car cut-out switch 561 at line 17 is closed to energize individual service relays OEA and OE at lines 16 and 17 respectively. This switch is maintained closed while the car is operated. When it is desired to remove a car from service with those in the bank remaining in service, switch 561 for that car is opened to drop out its relays OEA and OE.

Opening of the car doors is effected when an "in service" car is stopped at a landing. As the car approaches a landing, low speed up and down leveling relay contacts 2LU and 2LD are closed at line 30 of FIG. VIII. Door close relay contacts CLB and CL4 are closed while the car is set to move. The retiring cam relay RC at line 147 of FIG. XIII is dropped out by opening contacts LA at line 147 when the car begins to level to permit back contacts RC to close. The interlock on the landing doors which is unlocked by release of the retiring cam incidental to the drop out of relay RC cooperates with switch contacts 556 which close as the interlock is unlocked. This switch insures that the doors are mechanically free to open prior to energization of the door operator motor (not shown). Limit switch 557 is closed until the door has been moved substantially to its fully open position. Thus, door operator slowdown relay OPS in line 30 is the first energized in the door opening sequence to energize a relay OPC in the failure circuit, to be described, by closing its contacts at line 255 of FIG. XVII, energize door motor holding timer relay DT at line 34 by closing contacts OPS at line 32 through back contacts CL4 at line 35, and by opening back contacts OPS at line 34.

Relay DT provides a safety feature in the door operation in that it maintains power on the door operator motor for a brief interval after the system has been set to perform its next function thereby assuring that the door will be fully opened or closed. This feature is particularly desirable on high speed doors in that it guards against improper operation as where the door bounces on reaching its travel limits and maintains a closing impetus until the mechanical latch holding the door at those limits has an opportunity to seat. Relay DT picks up the moment it is energized to close its contacts in line 32 and energize door opening relays OP, OP1 and OPA through contact 556. Relay OP actuates contacts (not shown) in the door operator motor circuit (not shown) to cause the motor to initiate the driving of the door to an open position. Relay OP1 opens its back contacts at line 147 to insure that the retiring cam relay is maintained deenergized thereby deenergizing the retiring cam solenoid (not shown) so that the cam (not shown) remains in engagement with the landing door interlock (not shown) so that the door will remain unlocked. Contacts OP1 are closed at line 155 of FIG. XIII to energize door timer TR and at line 230 of FIG. XVI to energize standing time saver relay TRLA, to be discussed, and back contacts OP1 are opened in the car starting circuits of FIG. XIV at line 176 preventing the start of the car. Relay OPA opens its back contacts in the load by-pass relay circuit LBP at line 21, breaks the door reclosing circuits by opening its back contacts at line 27, and opens its back contacts at line 36 to maintain door closing relays CLB and CL at lines 35 and 36 deenergized.

As the door begins to open, limit switch 558 is permitted to close by-passing cam contact 556. This limit switch enhances door operation by expediting the reversal of door motion when an obstruction is sensed adjacent the door path while the door is closing. Because of its mass, retiring cam contact 556 is slow operating. When an obstruction is sensed, it is desirable to stop and reverse the closing door as rapidly as possible, however, cam contact 556 is open while the door is closing. The presence of limit switch 558 provides an alternate energizing path for the family of door opening relays which is available until the door is closed to an extent which would eliminate the possibility of it encountering an obstruction. When the door approaches the fully closed position, limit switch 558 is opened.

Limit switch 557 is opened when the door approaches its fully open position to deenergize door operator slowdown relay OPS. Contact OPS at line 32 is opened to deenergize door motor holding timer relay DT, which may be a flux decay type timer. After a suitable interval for the completion of the door movement to the fully open position, usually at a reduced speed as established by door operator motor controlling limit switches (not shown), relay DT drops out deenergizing the family of door opening relays OP, OP1 and OPA by opening contacts DT at line 32. The dropping out of relay OPS also prepares a new energizing path for relay DT by closing its back contacts at line 34. Similarly, the dropping out of relay OPA closes its back contacts at line 36 to prepare an energizing path for door closing relays CL and CLB.

In closing the door, contacts CLA at line 34 are closed incidental to the completion of a car starting circuit, to be described. At this time an audible warning signal is sounded briefly during the dropout time of a door close buzzer timer relay BZT at line 185 which upon dropping out closes back contacts BZT. Relay DT is energized through closed contacts BZT, CLA, BK1 of the brake relay, OPS and limit switch 559 to close its contacts DT at line 36 thereby completing a circuit for relays CLB and CL through closed contacts BZT, CLA, OPA and DT.

Relay CLB enters into the load by passing circuit operation by closing contacts CLB at line 22 as described below. It also locks out relay OPS by interrupting its energizing circuit at line 30, opening back contacts CLB, while the door closing operation is occurring.

Relay CL aids in the definition of the up trip and down trip portions of a car round trip by the operation of its contacts CL at line 243 of FIG. XVI as will be discussed. The door motor is energized by operation of relay CL with a polarity opposite that established by relay OP so that the motor rotates in a direction driving the door operator to close the doors of the car.

Pushbutton contacts 560 and 562 are inspection switches enabling the car doors to be opened and closed by the respective operation without dependence upon the leveling of the car or the car starting circuits.

This system is arranged for the reclosing of the car doors at the lower dispatching terminal under certain conditions. Ordinarily, when door closing is initiated by closure of contacts CLA in line 34, power to relay DT is interrupted upon the release of the brake as the car is started by the opening of contacts BK1 at line 34. However, when the car is parked at the terminal, contacts BK1 are not opened. Under these conditions, relay DT is deenergized by the operation of relay CL4 which opens its back contacts at line 35 to place limit switch contacts 559 in control. The operation of relay CL4 will be described. It is to be noted, however, that this relay initiates door closing by by-passing the non-functioning contacts CLA at line 34 and closing contacts CL4 at line 33 to energize relays DT, CLB and CL.

The present system of elevators is designed to operate "on call," that is, its cars run only in response to the registration of calls for service, usually car or hall calls although calls might also be registered from other locations and by other means such as from a main control as where a car is assigned to a predetermined landing at a certain time by a clock control. However, it is to be understood that many of the inventive features embraced herein are not limited in their application and can be employed with other than on call systems.

A car call registering means is depicted in FIGS. IX and X. Since the cars are arranged for optional passenger operation, they are provided with a main and an auxiliary panel of call registering devices, push button switches in the present embodiment. The circuits interconnecting these switches and their construction is set forth in detail in J. H. Borden's United States Patent 2,738,489 of Mar. 13, 1956 entitled "Auxiliary Car Button Controls for Automatic Passenger Elevators." They comprise a main push button switch for each landing serviced CC, C1, C2, C3, C9 and C10 for the basement, first, second, third, ninth and tenth landing car buttons shown in FIG. X and a corresponding auxiliary car button CCA, C1A, C9A and C10A for the basement, first, ninth and tenth landings. It is to be noted that in this discussion, those disclosures concerning hall buttons and those disclosures concerning controls individual to a landing are illustrated for exemplary floors only and are not represented for each floor which might be present in the system since the elements are duplicated for the several floors.

When the main car buttons are closed, they are held in by holding coils 563 of FIG. IX which are energized through resistors 564 and controlling contacts MGA, EL, BS2, RB and MGA by connection across a source of direct current (not shown). The contacts of main car buttons are also actuated by closure of auxiliary car button contacts CCA to C10A since the corresponding holding coils are momentarily energized by sufficient current to produce a magnetic flux which draws them closed and thereafter holds the closure by the lower level holding current which flows through resistors 564. Contacts TO at line 37 are opened by an attendant throwover switch shown at line 238 of FIG. XVI to disable the auxiliary bank of car buttons while the car is operated by an attendant.

The entire bank of car button contacts is normally released when the car is reversed by the operation of car button reset relay RB to open back contacts RB at line 41. Back contacts EL at line 41 are opened while the express-local relay for the car is energized to confine its operation to a lower region of the range of landings served and prevent the registration of calls for landings in the upper portion of the service range, e.g. if lead 565 were connected to landings 6 to 10, car calls could not be registered for those landings while the EL contacts for that car were open. Calls for these higher landings are barred from registration by the back contacts MGA at line 39 which are open while the car is at the first landing by operation of lower terminal car position relay MGA at line 220 of FIG. XV to avoid operation by departing passengers. However, contacts MGA close as soon as the car leaves the lower terminal to permit registration of calls for the upper floors. This feature corresponds to and can be expanded to embrace all features of E. B. Thurston's United States Patent 2,779,438 for "Car Call Cancellation Means" which issued Jan. 29, 1957.

Since the cars are normally stopped and reversed at the first landing and since a basement landing below the first landing can be served, contacts MGA close at line 43 before contacts RB at line 41 open so that the registration of a basement call, as signified by the closure of contacts BS2, will render the operation of contacts RB ineffective and maintain the energization of the car buttons until the car has traveled to the basement.

The above described car button controls control groups of buttons. In the case of an erroneous car call registration an individual car call can be canceled by opening the holding coil circuit for that car button by means of a reset button 566 in the main panel or a corresponding button 567 in the auxiliary panel.

Registration of a car call actuates the circuit shown in FIG. X by stopping a moving car as it reaches a landing for which the call is registered and by indicating the position of the call relative to the car as above or below the car. The car is stopped by energization of stopping sequence relay SC at line 54 when its floor selector brush 568 engages an active floor selector contact 569 in the car call contact lane. The car button contacts C2 through C10 render their car call ciruits active when closed. Similarly, the closure of contacts C1 at line 68 energizes car button relay CB1 to close its contacts at line 63 and closure of contacts CC at line 69 energizes basement service relay BS to close its contacts at line 66 and energize basement service relay BS1 closing contacts BS1 at line 64. Thus, contacts CB1 and BS1 correspond to contacts C2 through C10 for their respective landings in activating their floor selector contacts 570 and 572.

The location of registered car calls with respect to current effective car position is also determined on the floor selector machine by means of the lanes of normally closed contacts 570 and 572 for calls above and below the car respectively. A call above the car energizes car signal direction relays CB and CBA at lines 55 and 56 provided the car is not the next to be selected for up load as indicated by opening of back contacts CUN at line 55 and is not set for travel downward by opening of its down signal direction relay back contacts DL1. A call below the car energizes down car signal direction relay CBD if the car signal direction relay back contacts CB at line 65 are closed. Completion of these energizing circuits through contact lanes 570 and 572 is restricted to those car button circuits above and below the car respectively by means of floor selector crosshead carried cams 573 and 574, respectively. When the crosshead is at the fourth row of contacts, up cam 573 isolates the car buttons for the third floor and floors below from lane 570 by opening the second and third floor back contacts of that lane. In the same manner the third floor car button and buttons for the floors above are isolated from the down lane 572 by down cam 574 which opens the third and fourth floor back contacts for that lane. Accordingly, a car call for a landing above the current effective position of the car while it is set for travel upward will energize relays CB and CBA through the closed series of contacts 570 and any available one of the closed car call contacts CB1 and C2 through C10 to lead 575. Similarly, a car call for a landing below the effective car position will energize relay CBD through the series of closed contacts 572 and any available one of the closed car call contacts if relay CB is not energized to open contacts CB at line 65.

When the system is conditioned to reverse a car at its highest call, relay SC is sealed in through contacts SC and high call reversal relay contacts HCR at line 50. The top and bottom contacts 569 of the car call stopping lane on the floor selector are tied directly at lines 51 and 58 to the main lead 575 from the source of alternating current to insure stopping of the car.

The first landing contact 569 at line 56 is provided with supplemental circuits to insure stopping under certain conditons other than the registration of a car call. Since this contact is not in parallel with the car call position indicating circuit for connection by car button contacts as for landings above the first, contacts CB1 at line 54 are closed to stop the car when a first landing call is registered, and a circuit is completed for the car position circuits through contacts CB1 at line 63. If the car is operated by an attendant, contacts TO at line 52 are closed and the car is stopped unless the attendant exercises the option to by-pass call thus opening contacts BP at line 52 to eliminate the circuit in that line as a means activating the first landing contact 569. An up car from the basement will always stop at the first landing since contacts DL1 are closed at line 55. A down load car having no basement car call will stop at the first landing since its contact 569 will be activated through contacts DL1 and BS at line 56. However, a down load car with a basement car call and no down hall call registered at the first landing will by-pass the first landing since back contacts BS of the basement service relay at line 56 and contacts S1DA of the first landing down hall call relay at line 57 will both be open to bar activation of contact 569. Registration of a first down landing call insures that a down traveling car will stop by closing contact S1DA at line 57.

The operation of the high call reversal circuits and basement service involving relays BS, BS1, BS2, BST and BSTA will be discussed below.

Hall calls are registered, are effective in stopping the car, are reset, and are given preference at certain landings when registered for a predetermined interval in the circuits of FIG. XI. An up hall call button CU through 9U for actuating a latch-type relay SBU to S9U is provided for each landing having landings above and a similar down hall call button TD to 1D for the first through tenth floors having a landing below is provided to actuate corresponding latch type relays STD to S1D. These contacts and relay families are represented fragmentarily in lines 80 through 91. The down hall call relays can be of any convenient form wherein energization across one pair of terminals latches their contacts in actuated position until a second pair of reset terminals are energized to drop out the activated contacts. The present hall call relays are reset by energizing their reset terminals at the time the call is answered. One reset terminal is connected to a corresponding contact in a lane of floor selector contacts 576 to complete a circuit therethrough from main leads 577 and 578 connected to an alternating curent source. A similar reset circuit is provided for each up hall call relay from individual floor selector contacts 579 of the floor selector. Brushes 580 and 582 for the down and up lanes of contacts 576 and 579 are carried by the floor selector crosshead so that they engage a contact in advance of the arrival of the car and reset the registered hall call as soon as the car stopping operation is initiated. Only one brush is active at any given instant since up load and down load relay contacts UL and DL at lines 86 and 82 operate in a mutually excluding manner. Thus if the car is not set to by-pass, contacts BP of the by-pass relay at line 82 are closed, and it is an up load car, contacts UL of the up load relay at line 86 are closed, the hall call will be reset when the advance motor relay contact VR2 is closed at line 84 during car leveling. A down signal is reset in the same manner by brush 580 engaging a contact 576 while contacts DL are closed at line 82. The rapid resetting of hall signals is desirable since only one car should respond to each call and all cars of a bank are responsive to a registered hall call through parallel connected contacts on their individual floor selectors as indicated by the arrowheaded leads 583.

Basement hall call relay SBU sets a car to travel downward from the first floor as will be discussed. Therefore, actuation of the down hall call relay S1D at the first landing is arranged to actuate relay SBU by closing contacts S1D at line 92. This circuit does not impede resetting of relay SBU since its back contacts SBU are opened at line 92 when it is energized.

Before considering the details of stopping operations in response to car and hall calls and the functions of the pass and wait timers shown in FIG. XI, the general operation of a car will be described beginning with a car starting operation, its running functions and its slowdown functions. Car stopping generally and the specific operations in response to car and hall calls will then be set forth.

As will be described, the registration of a car or a hall call initiates a dispatching operation for a car located at a terminal which results in the issuance of a start signal for that car. At landings other than the dispatching terminals the cars are started an appropriate interval after they stop or after the last obstruction clears the door path. The starting circuits are shown on FIG. XIV. They involve the energization of car starting relay CS at line 170, and door closing relays CLA and CL1 at lines 172 and 174. These circuits are energized from a source of direct current while rectifier disconnect relay RE at line 20 is energized to feed main leads 584 and 585. The circuits are completed through one of the parallel circuits between lead 584 and 586, through back contacts VR2 of advance motor stopping relay, emergency relay contacts EM, door opening relay back contacts OP1, lead 587, relays CS and CLA, back contacts T0, contacts OE of the normally energized individual service relay and contacts TR of the start time relay. While a car is stopped, the emergency relay EM is normally energized at line 165 through the motor generator set run relay contacts LR and the safety switches at line 167, the rheostat contacts RH1, which are closed while the car is stopped, and the photocell relay contacts PC at line 166. Contacts BK and AM energize relay EM while the car runs even though at that time the photocell is arranged to be ineffective to maintain closed the photocell relay contacts PC at line 166.

If the car is on automatic operation and has been standing at the dispatching landing a sufficient interval for the start time relay to time out and close TR, then starting of the car is subject to the circuits between leads 584 and 586. When the cars are at landings other than the dispatching terminals, a starting circuit is completed at line 169 through the MG and MG1 contacts. The MG contacts are open while the car is at the lower terminal and the MG1 contacts are open while the car is at the top terminal. Contacts J0 at lines 170 are associated with the lower dispatch timer and close to by-pass contacts MG if that timer fails, similarly contacts K0 at line 170 avoid a lockup in the system and the accumulation of cars at the top terminal by failure of the upper dispatch timer.

When the car is at a dispatching terminal, any of several paths can be completed between leads 584 and 586 to institute a car starting operation. Dispatching upward is effected from the lower terminal by closing contacts STT at line 172 a short interval after an up dispatch signal is registered and that starting circuit is held thereafter until the car leaves the terminal. A down dispatch signal closes contacts CDD at line 175 to start a car downward from the top dispatching terminal.

The cars can be started at dispatching terminals without a dispatching signal being issued under several circumstances. On the off hours operating program, car doors are reclosed at the lower terminal. In order to avoid locking a passenger who inadvertently entered other than the load car, the cars are responsive, when their doors are reclosed (contacts RCL at line 168 are closed) and they are not on load status (contacts CUL at line 168 are closed), to calls registered on car buttons as indicated by the closure of contacts CB at line 168 to energize the car starting circuits and send the car from the terminal immediately. A down traveling car which has been selected for basement service will start from the lower terminal without awaiting a dispatch signal since its car starting circuits are completed through contacts DL1 and BS1 at line 177. Similarly, a car traveling upward from the basement will start from the lower dispatching terminal without awaiting a dispatch signal by virtue of closed basement run relay contact BR at line 176. Cars can be started without opening and closing their doors when stopped short of a dispatching terminal floor, as by an emergency stop, since gate relay contacts GA at line 174 are closed.

Contacts T0 at line 173 are closed when the car is operated by an attendant, however, under those conditions starting is subject to the operation of car start switches 588 and 589 since back contacts T0 in line 170 disconnect the start time control, contacts T0 at line 173 are closed and back contacts T0 at line 174 are opened so that relays CS and CLA are energized from lead 587 through lead 590 one of switches 588 and 589 on lead 592.

Energization of car starting relay CS closes its contacts at line 21 to a thermal timer TH of FIG. VIII. It also closes contacts CS at line 157 in the field and brake relay circuit of FIG. XIII to condition them for energization when the gate is closed. It initiates the timing out of flux decay type door closer buzzer time relay BZT by opening back contacts CS at line 185. Retiring cam relay RC of FIG. XIII is energized by the closing of contacts CS at line 150 to complete a circuit from direct current supplied main lead 593 to main lead 594 through the closed back contact OP1 at line 147 of the door open relay, relay RC and contacts CS at line 150. Retraction of the retiring cam permits the door and gate to be locked mechanically and electrically when they reach their closed positions.

Operation of door close relay CLA closes its contacts at line 176 to energize door close relay CL1, closes its contacts at line 141 to energize start time relay TR2, closes its contacts at line 34 to initiate door closing as described above, closes contacts CLA to complete a door close warning buzzer circuit at line 282 of FIG. XVIII which remains energized until relay BZT drops out to open its contacts BZT in that line, and opens back contacts CLA at line 291 of FIG. XIX in the hall lantern circuits.

When door close relay CL1 pulls in its seals the starting circuit around the timer contacts TR by closing contacts CL1 at line 171 between leads 587 and 592 thereby insuring the complete closure of the door and the starting of the car. It also completes an alternate starting circuit between leads 584 and 586 around contacts STT by closing contacts CL1 at line 171 and opens back contacts CL1 at line 82 of FIG. XI in the hall call reset circuits thereafter enabling calls to be registered at that landing from which the car is departing.

The car is started upon completion of the door closing operation by the simultaneous initiation of operation of an advance motor circuit and the elevator brake and lifting motor circuit. The acceleration and deceleration of the elevator lift motor is controlled by a rheostat in the control circuit for a generator supplying the direct current lifting motor. This rheostat is driven by a differential from the lifting motor and an advance motor in the manner described in detail in J. H. Borden's Patent 2,685,348 of Aug. 3, 1954, entitled "Elevator Control System" wherein the rheostat causes accelerating forces to be imposed until the car is up to speed. A constant speed advance motor is started at the instant the elevator lift motor is started. Since the lift motor accelerates gradually, the advance motor initially drives the differential in a manner to operate a series of cam controlled rheostat contacts (not shown in their entirety) in sequence to remove resistance from the generator field. As the lift motor gains in speed the rate of advance of the cam shaft is first reduced, then stopped and then reversed to open certain contacts and produce a balanced condition at speed wherein the differential output is stationary. The advance motor also drives the floor selector crosshead as described above.

When the crosshead picks up a registered call for a floor, as will be described, the advance motor stops essentially instantly centering the crosshead at the position on the floor selector corresponding to the landing of the call. When the advance motor stops, the differential drive operates the cams to operate the contacts in the reverse of their car start operating sequence so that the voltage to the lift motor is reduced and the car is decelerated as it approaches the landing. Shortly before it reaches the landing, leveling circuits assume control of its position, as will be described, thereby accurately positioning it and maintaining synchronism with the crosshead carriage which has corrected its position. This correction of car and crosshead alignment is effected at each stop to avoid malfunctions due to cable stretch, slip and the like.

When the gate is closed following operation of the car starting circuits, and all of the safety switches including the emergency exit switch 595 and the gate switch 596 at line 167 are closed, gate relay G is energized closing its contacts at line 120 in the advance motor circuit.

The direction of travel of a car is determined by direction throwover relay RL shown at lines 191 and 193 of FIG. XIV. The operation of this relay will be discussed later, however, it is to be noted that its contacts control the up and down signal direction relays UL and DL at lines 139 and 140 and maintain a completed circuit from lead 593 to 594 for one or the other of these relays under all conditions. It will be assumed for the present that contacts RL at line 139 are closed to energize relay UL and that back contacts RL at line 140 are open to deenergize relay DL so that the car is set for travel upward. This condition enables the up field relays UF and UF1 and the brake relays BK to be energized when the car start relay is energized to close its contacts CS at line 157, the gate relay G is energized to close contact G at line 159, and the landing interlock switch 597 is closed signifying the hall door is closed. The energizing circuits are from lead 593 through relays BK and BK1 at lines 157 and 160, lead 598, back contacts DF1, up generator field relays UF and UF1, lead 599, stop limit switch 600 which is closed except when the car is within a short distance of the top limit of elevator travel, the closed contacts UL and CS in line 157, contacts G and interlock switch 597 at line 159 to lead 594. Conversely, at all but the lowest landing relays DF and DF1 can be energized by a corresponding circuit if contacts DL are closed, limit switch 602 opening as the car approaches the lowest landing to prevent a start from that landing downward. During car travel the brake relays and field relays are maintained by the circuits discussed. Contacts US and DS at lines 158 and 159 are of the up and down inspection relays (not shown) and permit operation of the car for inspection purposes.

Operation of the brake relays BK and BK1 energize the brake release solenoids (not shown) to overcome the springs setting the brake and thereby release the brake. The brake relays also apply line voltage to the lifting motor and generator (not shown), and deenergize the protective relay (not shown). Relay BK opens its back contacts at line 115 and 116 to disable the correcting motor 603 to be discussed below. Relay BK1 opens its back contacts at line 34 to deenergize the door motor holding timer relay DT as described, opens its back contacts at line 191 to disable the direction throwover switch RL while the car is in motion, and closes its contact at line 147 to maintain retiring cam relay RC energized until the car is leveling again.

Up field relays UF and UF1 when energized close contacts UF in lines 112 and 114 to the second slowdown relays 2SD and the acceleration relays A and AA, close contacts UF at line 119 to energize the advance motor 604 as will be described, and close contacts UF1 at line 124 to prepare advance motor stopping relay V for energization. Relay UF also energizes the generator shunt field (not shown) in the lifting direction by closing appropriate contacts (not shown), and closes contacts UF at line 198 in the limit relay circuit. Relay UF1 energizes an auxiliary up generator field relay UF2 by closing contacts UF1 at line 143, closes contacts UF1 at line 156 to by-pass with high speed switch time relay back contact HT and protective relay contact LP at line 161 the car start relay contacts CS at line 157, and opens back contacts UF1 at line 159 to lockout the down field relays DF and DF1.

Down generator field relays DF and DF1 perform functions corresponding to the up field relays when down signal direction relay DL is energized to close contacts DL at line 160. Contacts DF at lines 111 and 113 close to relays 2SD, A and AA, contacts DF at line 121 set advance motor 604 for down travel and contacts DF1 close at line 125 to relay V. The generator field is polarized for down travel by contacts (not shown) of relay DF and contacts DF at line 196 are closed to relay L. Back contacts DF1 at line 157 are opened to disable relays UF and UF1, contacts DF1 at line 161 are closed to by-pass contacts CS of line 157, and auxiliary down generator field relay DF2 is energized by closing contacts DF1 at line 144.

Auxiliary up field relay UF2 at line 143, when energized, conditions the hall call stopping circuits to respond to up hall calls by closing contacts UF2 at line 95, partially conditions the up car high call reversal circuits by closing contacts UF2 at line 205, and closes contacts UF2 at line 217 to enable car position relay BUR to be energized. Similarly, auxiliary down field relay DF2 closes its contacts at line 97 to condition the hall call stopping circuits for response to down hall calls, and closes contacts DF2 at line 215 to car position relay BDR.

With contact UF at line 119 closed and the protective relays LP, LP1 and LP2 (not shown) and the main switch relay M (not shown) pulled in, as will occur in the absence of a malfunction of the system upon energization of the brake relay, the advance motor is conditioned to start. Advance motor 604 is a split phase motor having resistor 605 and capacitor 606 connected across its windings to produce the required quadrature relationship in windings 607 and 608. It is connected to a source of alternating current through leads 609 and 610 of FIG. XII upon the operation of the brake relay which causes the opening of back contacts LP1 at lines 118 and 119, the closing of front contacts LP1 at lines 119 and 121, and the closing of contacts M at line 120. Since the car is set for up travel, the advance motor rotates to operate the cam contacts and advance the crosshead upward by connecting winding 608 directly across the line and winding 607 through the phase shifting capacitor 606 both by way of contacts LP1 and UF in line 119, and contacts AT, VRT, G and M in line 120. Conversely when the car is set for travel downward it has its down field relay energized to close contacts DF at line 121 and winding 607 of the motor is energized directly while winding 608 is energized through the phase shift network to rotate the motor in the opposite direction.

As the advance motor increases its effective lead over the lift motor, cam contacts are successively actuated. Contacts 612 and 613 at lines 115 and 117 are cam actuated during the first portion of the advance motor lead, contact 612 being closed when a down travel lead is established and contact 613 being closed when the lead is for up travel. Acceleration relays A and AA and second slowdown relays 2SD are energized through closed contacts LP1 in lines 115 and 117 when the car direction has been established to close field contacts DF or UF at lines 111, 112, 113 and 114 and the motor normal field relay (not shown) has been energized to close contacts MFN at line 112.

In normal stopping and starting sequences the acceleration and second slowdown relays have no controlling effect on the lifting motor although they do enable the rheostat to perform a control function in the acceleration and deceleration by altering the resistance in series with the generator field (in a manner not shown). This enabling of the rheostat is subject to operation of contact RH3 which itself is subject to the rheostat. At the limits of car travel, the slowdown relays are effective in response to limit switches 614, 615 and subsequently acceleration relays A and AA are effective in response to limit switches 638 and 639 to alter the generator field if the rheostat fails to perform any portion of that function at appropriate points in the approach to the limits of elevator travel.

The effect of a call on a traveling car will now be considered. Assume that a call has been registered in the car for the third landing by closure of contact C3 at line 61 of FIG. X. This places power on the third floor contact 569 of the floor selector machine, car call stopping lane of contacts at line 54 so that engagement by brush 568 supported by the crosshead energizes car call stopping sequence relay SC. Operation of relay SC closes its contacts at line 121 to initiate the stopping of the advance motor, closes contacts at line 50 to enable a high call reversal operation, as will be discussed, and closes a contact at line 154 to high call reverse relay HCR.

If a hall call had been registered, the up traveling crosshead of the floor selector would have carried brush 616 into engagement with an active contact 617 of the lane of up hall call stopping contacts on the floor selector, only one contact, that for the second floor, being shown at line 95 of FIG. XI. Registration of a second up hall call by closure of contact 2U at line 87 to energize relay S2U closes contact S2U at line 95 to activate contact 617 and the corresponding contacts of the other floor selectors of the bank of cars all connected in parallel therewith through arrow-headed lead 618. Hall call stopping relay S is energized as brush 616 engages contact 617 if the express-local relay contacts EL, the up field relay contacts UF2, the load by-pass relay contacts LBP, the advance motor relay contacts VR2, the rheostat position relay contacts RH3, the by-pass relay contacts BP and the brake relay contacts BK all in line 95 are closed. Energization of relay S closes its contacts at line 93 and contacts S at line 122 to initiate stopping of the advance motor in the same manner as for a car call. Relay S is maintained energized until the car is leveled at the floor and the brake is set opening contacts BK. When the stopping sequence is initiated, advance motor stopping relay contacts VR1 are closed to establish a holding circuit for relay S with its contacts S at line 93. It is shortly after this holding circuit is established that the hall call relay is reset by engagement of brush 580 or 582 with rest contacts. The purpose of rapidly resetting these contacts is to avoid the completion of a second car stopping circuit when a following car passes the floor. Since the floor selector contacts 617 for the up stopping circuit and 685 for the down stopping circuit are connected in parallel for the several cars, a sneak path can be established through the stopping relay holding circuit. This path is opened upon the energization of advance motor stopping relay VR2 to open its back contacts at line 95. When the brake is set and the car is leveled, contacts BK1 and VR1 are opened to deenergize relay S.

The advance motor stopping sequence is initiated by the energization of advance motor stopping relay V. Contacts RH at line 124 of the rheostat position relay RH (not shown) are closed by operation of one of the cam operated rheostat contacts early in the rheostat sequence so that they are closed while the car is in motion except for a brief portion of the initial starting operation and the final stopping operation. Since the car is traveling upward contacts UF1 are closed at line 124. The car and hall call stopping realy contacts SC and S at lines 121 and 122 are connected to a series of stationary contacts 619 over which a pair of brushes 620 and 622 are caused to travel by the motion of the floor selector crosshead. While the car is running, advance motor auxiliary relays AMR and AMR1 are energized from lead 609 through the closed contacts LP2 of a protective relay (not shown) and back contacts VRT of an advance motor stopping relay at line 122, back contacts VRT, contacts G of the gate relay and contacts M of main switch relay (not shown) at line 120 to lead 610, thereby maintaining back contacts AMR1 at line 123 open.

When a hall or car call stopping signal is established, contacts SC or S at lines 121 and 122 activate contacts 619, brush 620 is traveling upward past the contact 619 for that landing but is still in engagement therewith and therefore causes the energization of advance motor stopping relay V. Relay V closes its contacts at line 123 and contacts at line 131. The V contacts at line 131 energize a family of advance motor stopping relays by energizing relay VR which seals itself in until the brake is set through contacts VR and BK1 at line 130. Relay VR energizes relays VR1 and VRT by closing contacts VR at line 133. Relay VR also introduces some resistance in the circuit of the brake solenoid to initiate the partial setting of the elevator brake and removes a shunt from a portion of the generator field resistance associated with the car leveling controls by means not shown. Relay VR1 energizes relay VR2 by closing contacts VR1 at line 131, deenergizes limit relay L by opening back contacts VR1 at line 197 and closes contacts VR1 at line 93 to complete a holding circuit for hall call stopping relay S. Relay VRT opens back contacts VRT at lines 120 and 122 to deenergize advance motor auxiliary relays AMR and AMR1 and to connect the advance motor to brushes 620 and 622. Relay VR2, when energized, opens the car start relay CS circuit by opening back contacts VR2 at line 176, closes contacts VR2 at line 84 in circuit to effect resetting of the call if a hall call, opens back contacts VR2 at line 95 to disconnect the hall call stopping brushes from the hall call stopping relay, and opens back contacts VR2 at line 205 in the highest call relay HCT circuit.

Upon the deenergization of limit relay L, relay RH drops out and contacts RH at line 124 open to deenergize relay V; however, relay VR and its family of advance motor stopping relays are held in at line 130 until the brake is set opening contacts BK1. The advance motor auxiliary relays AMR and AMR1 are therefore maintained deenergized until the car is leveled at the floor so that the back contacts AMR1 in leads 623 and 624 close to connect the advance motor winding 608 for up travel through lead 623 to upper brush 620 and to connect winding 607 for down travel through lead 624 to the lower brush 622. When the upper brush 620 engages contacts 619 for the floor at which the car is stopped, the advance motor causes the crosshead to move upward thereby disengaging the brush from the contact. Similarly, when the lower brush 622 engages the contact the carriage is driven downward. Thus, the carriage 539 is maintained centered on the row of contacts for the floor being served while the elevator is leveling at that floor despite any torque which is transmitted to the shaft of the advance motor 540 from the lifting motor 533 through the differential 544.

After the car has stopped, the advance motor stopping relays are deenergized, however, the advance motor auxiliary relay AMR1 maintains the advance motor subject to the centering control since it cannot become energized until gate relay and main switch relay M are energized. With the car leveled and the crosshead centered the differential output driving the rheostat actuating cam shaft may be off center, for example, due to slippage of the elevator cables. The shaft is brought back to center by a correcting motor 603 at this time. This motor corresponds to advance motor 604 in having a phase shifting capacitor 625 and an up and a down winding 626 and 627.

Under normal operation the protective relays remain energized so that contacts LP1 at lines 115 and 117 are closed, and back contacts LP1 at lines 118 and 119 are open. As the brake is fully set to stop the leveled car, brake relay BK is deenergized to close back contacts BK at lines 115 and 116. Closure of second up and down leveling relay contacts 2LU and 2LD at line 116 indicate the car is properly leveled. Under these conditions circuits are completed to normally open rheostat contacts 612 and 613. If the rheostat cam shaft is off center, one of these contacts is closed, contact 613 being closed if the shaft is displaced in the up direction from its stopped position and contact 612 being closed if it is displaced in the down direction from that position. Thus, if the shaft is displaced in the up direction, contact 613 closes to complete a circuit through the correcting motor field winding 627 to urge the elevator motor shaft input to the differential in the down direction. A friction clutch 543 (FIG. V) is provided between the sheave for the elevator cable and the coupling of the correcting motor to the lift motor shaft extension to the differential 544 so that the correcting motor causes this extension to slip relative to the stationary sheave and lift motor in a manner to bring the rheostat cam shaft on the differential output to the center position. Closure of contact 612 indicating a displacement in a down travel direction from the zero position is similarly corrected by causing motor 603 to drive the shaft extension in the opposite direction.

As the car approaches a floor for which its floor selector machine crosshead is stopped, the cam operated contacts are opened in a reverse succession from that in which they were closed during car starting so that the resistance in the generator field is increased, lowering the voltage applied to the lift motor and slowing the car. The cam operated contacts are synchronized with the position of the car relative to the crosshead so that they deenergize rheostat position relay RH3 (not shown) then rheostat position relay RH2 (not shown) and then rheostat position relay RH1 as the landing at which the stop is to be made is approached. This sequence transfers operation of the car from control by the rheostat cam contacts to leveling circuits associated with cooperating devices on the car and in the hatchway. Such leveling devices are often magnetically actuated and can be of the form shown in J. H. Borden United States Patent 2,598,214 of May 27, 1952, entitled "Inductor Leveling Switch." These leveling switches are represented in the dotted rectangle at lines 177 through 185 for high and low speed leveling in the up direction HLU and LLU and for high and low speed leveling in the down direction HLD and LLD.

As the advance motor stopping is initiated contacts AMR at line 180 are closed. This energizes acceleration time relay AT at line 186 to open its back contacts at line 120 and close its front contacts at line 411. If the car is operating without an attendant, door close buzzer time relay is energized at this time also through closed contacts CS, CL4 and TO at line 185. Since normal operation is assumed, contacts LP at line 180 of the protective relay are closed. Contact A at line 180 of the acceleration relay closes as the cam shaft deenergizes relay RH3 to open its contacts at line 113, and shortly thereafter, contact RH2 is closed at line 181 by operation of the cam shaft so that the leveling relays LU, LD, 2LU and 2LD can be energized as the inductor relay vane (not shown) in the hatchway is approached by the leveling units individually controlling contacts HLU, HLD, LLU and LLD.

The approach of the up traveling car to the landing closes contacts HLU when it is within about eighteen inches of the landing thereby energizing up leveling relay LU which introduces some additional resistance in the generator field further slowing the car by means not shown, closes contact LU in line 158 with no effect since a parallel circuit is held by contacts G and 597, opens back contact LU at line 159, and energizes the leveling acceleration relays LA and LA1 and high speed switch time relay HT by closing contacts LU at line 135. Further motion of the car toward the landing causes LLU to close at line 182 then LLD at line 184 and finally opens HLU at line 178 to set the car brake. Closure of contacts LLU energizes the low up speed leveling relay 2LU to close contacts 2LU at line 116 in the correction motor, opens back contacts shunting resistance across the generator shunt field (not shown), shunts some of the resistance in series with the generator shunt field (not shown), closes contacts 2LU in line 30 of the door open relay circuits, and shunts a resistance in series with the brake solenoid (not shown) all without effect until corresponding contacts of relay 2LD are also actuated by its energization. Relay 2LU does, however, add resistance (not shown) in series with the generator shunt field to reduce the car speed. When the car is sufficiently close to the floor to close contacts LLD, relay 2LD pulls in to cooperate with energized relay 2LU in the above enumerated functions including the closing of contacts 2LD at lines 30 and 116 and opening of back contacts not shown in the generator field and brake circuits.

When the car is level, contacts HLU reopen to deenergize relay LU and reopen contacts LU at line 158 to set the brake and remove power from the generator shunt field by deenergizing the brake and field relays. In stopping, the brake and field relay circuits are operated by opening the contacts CS at line 157 during the advance motor stopping sequence, however, the circuit is maintained through the HT and LP contacts of line 161 until the first leveling relay is energized to energize the HT relay and open its back contact at line 161. Upon interruption of the direct circuit to lead 594 an alternate connection is established through closed contacts LU and LD at line 158, lead 629, rheostat cam operated switch 628 and lead 630. Contact 628 is closed when the car is approaching the floor from below. As the car levels and contacts LU reopen the energizing circuit is broken completely after a suitable dropout interval as determined by the resistance 632 and capacitor 633 across each of the leveling relays in FIG. XIV. If during the dropout interval the car overshoots the landing, cam operated contact 634 and lead 635 provide an energizing path for the down field relays since the HLD contacts of the leveling unit are closed to energize relay LD thereby opening back the contacts LD in line 158 and closing the front contacts LD in line 159. The car is therefore caused to travel downward until HLD is again opened at which point the field is opened and the brake set. Thus, the car stops and is leveled with contacts LLU and LLD closed and contacts HLU and HLD open.

Leveling of a down car is achieved by corresponding functions to those described wherein relay LD is first energized, then relay 2LD, and finally relay 2LU after which relay LD is deenergized to set the brake. The initial energization of relay LD closes contacts LD at line 136 to energize the leveling acceleration relays LA and LA1 and the high speed switch time relay HT.

During the starting of a car the leveling controls are disabled by the energization of advance motor auxiliary relay to open back contact AMR at line 180 incidental to the closure of the car gate to close contacts G and the closure of contacts M of the main switch at line 120.

The interval between the initiation of the leveling of the car and the completion of leveling is defined by energization of relays LA, LA1 and HT. Relay LA while energized deenergizes the retiring cam relay RC by opening back contact LA at line 147 to enable the doors to be opened, maintains the second slowdown and acceleration relays 2SD, A and AA deenergized by opening back contacts LA at line 113 and adds a resistance in parallel with the generator shunt field by means not shown. Energized relay LA1 closes its contacts in line 20 to energize a thermal relay TH so that the leveling operation is limited to an interval defined by that relay in that the timing out of relay TH opens contacts at lines 156 and 166 to disconnect the brake, field, emergency and protective relays.

A limited time interval is similarly placed on the car starting operation by contacts CS at line 21 also to prevent malfunctioning of the system. Relay LA1 closes contacts LA1 at line 132 to hold relays VR1 and VRT in until the brake is set and the car is leveled and opens back contacts LA1 at line 134 to deenergize the low speed series field switch relay SF thereby removing a resistor from across the series field of the generator in a manner not shown. Timer relay HT alters the brake and field relay circuits as described by opening back contacts HT at line 161 and closes contacts HT at line 193 of the direction throwover relay RL.

Upon energization of the car starting circuits and the closure of the car doors the advance motor is energized to carry the crosshead away from the row of contacts corresponding to the landing at which the car is stopped and the differential is actuated to establish starting connections in the generator and lifting motor. Opening of the car starting relay contacts CS at line 185 deenergizes relay BZT. At the same instant relay CLA is energized to close its contacts at line 282. Since BZT is a slow dropout relay, contacts BZT and CLA in line 282 are both closed momentarily to sound a warning buzzer indicating that the car doors are about to close. Upon drop out of relay BZT the buzzer ceases to sound and door closing is initiated. The gate relay G at line 167 is energized when the doors reach a fully closed position.

Advance motor relay is energized upon the closure of contacts G at line 120 through a circuit from lead 609, relays AMR and AMR1, contacts LP2 and VRT at line 122, and contacts VRT, G and M at line 120 to lead 610. Back contacts AMR1 at line 123 are opened to disconnect the advance motor windings from brushes 620 and 622. At the same instant the up field relays and the brake relays are energized from lead 593 through an LR contact, safety switches, and thermal relay TH, thence through relays BK and BK1, contacts DF1, 600, UL (assuming the car is set for up travel) and CS at line 157 and contacts G and 597 at line 159 to lead 594. Energization of relay UF closes its contacts at line 119 and starts the advance motor upward by energizing winding 608 and from lead 609 through contacts LP1 and UF at line 119 and contacts AT, VRT, G and M at line 120 to lead 610. Relay AT drops out shortly after the energization of relay AMR and the opening of back contacts AMR at line 180. Since the advance motor is up to speed essentially instantly, the rheostat contacts are actuated to accelerate the car by increasing the drive of the lifting motor. The correcting motor is disabled upon the opening of brake relay contacts BK at lines 115 and 116 so that the rheostat cams are driven solely by the advance motor and the lifting motor in starting the car.

As the car continues its travel it is reversed at the top or bottom landing by simulated car calls through the direct connection of contacts 569 to main lead 575 at line 51 for the top and at line 58 for the bottom so that car call stopping relay SC is energized. If for any reason these circuits fail to function, the car is provided with limit switches which are actuated as it approaches the limits of its travel to stop it and prevent its restarting in the direction toward its terminal. These switches begin to function when the car has proceeded toward its limits of travel beyond the position wherein the advance motor stopping relay sequence would have functioned and the car initiated its normal slowdown sequence for the last landing. If the normal operation fails, the safety operation stops the car in a manner corresponding in some respects to the above described car stopping operation.

First limit relay L is deenergized by opening first stop limit switch 636 at line 198 when the car is near the top of its hatchway if the car is traveling upward as would be the case if contacts UF were closed or by opening first bottom limit switch 637 at line 196 when the car is near the bottom of its hatchway to break the circuit through closed contacts DF at line 196. These limits function in the place of back contact VR1 at line 197 to cause relay L to dropout thereby inserting resistance in series with the shunt field of the generator to begin the deceleration process and deenergizing rheostat position relay RH and high speed switch H so that their contacts function as described to disconnect a portion of the series field and insert additional resistance in series with the shunt field. The advance motor stopping relay V is deenergized in this sequence by opening contacts RH at line 124 and the motor field acceleration relay MFA (not shown) and the motor full field relay MFL (not shown) are maintained energized until the car brake is set.

As the car travels further toward the floor second mechanical limit switches are actuated to deenergize the second slowdown relays 2SD at lines 111 and 113, in the event that those relays have not been deenergized, by opening of motor field normal relay contacts MFN at line 112. An up and a down second limit switch 614 and 615 respectively are provided in series with contacts UF and DF, respectively, in lines 111 and 112. The second up switch 614 is actuated near the top of car travel at a position above the first switch 636 and the second down switch 615 is actuated when the car is below the first switch 637.

Supplementing first and second limit switches 614, 615, 636, and 637 to initiate some portion of the normal car stopping operation, a third set of limit switches, 638 for up travel and 639 for down travel, functions at lines 113 and 114 to deenergize acceleration relays A and AA and add additional series resistance to the generator shunt field, close the leveling circuits, actuate the thermal timer, and deenergize the highest call relay HCT. The third limit switches thereby are mechanically actuated to perform the functions ordinarily performed by the opening of leveling acceleration relay back contacts LA at line 113 or third rheostat position relay contacts RH3 at line 113.

In normal operation the car slows and stops at one of its limits or normal travel and, when stopped, is reversed and has its car call contacts reset by operation of the circuit shown in FIG. XIV at lines 187 to 195. Contacts 640, 642, 643, and 644 are located in a lane on the floor selector machine at rows respectively corresponding to a top dispatching terminal landing, those landings in a high zone below the top landing and a top landing of a low zone of landings, a bottom dispatching terminal landing, and a basement landing below the bottom terminal. As an up traveling car stops at the top dispatching landing floor selector brush 645 of the reversal circuit engages contact 640 to complete a circuit from lead 584 through car button reset relay RB at line 192, the lower coil of direction throwover relay RL and closed back contacts DL of the down signal direction relay, through lead 646, contacts 640, brush 645 and lead 647 to lead 585. Energization of relay RB opens back contacts RB at line 71 in the basement service circuits of FIG. X and resets the car button holding circuits of FIG. IX by opening back contacts RB at line 41. The alternate holding circuit for the car buttons at line 43 is opened at contacts MGA, which are open while the car is above the first floor, to break the connection through the holding coils 563 for direct current supply leads 648 and 649.

Energization of the lower coil of direction throwover relay RL deenergizes the up load relay UL by opening front contacts RL at line 139 and closes back contacts RL at line 140 to energize down load relays DL and DL1. Lower coil RL when energized, also throws over closed front contacts RL at line 291 in the up hall lantern circuit and closes back contacts RL at line 295 in the down hall lantern circuit. Thus, when the car is started from the top terminal its controls and signals are set for downward travel.

Similar reversals in car travel can be achieved at the top of the low zone or at the floors in the upper zone upon energization of the family of contacts 642 individual to those floors by the closure of express-local relay contacts EL and highest call relay contacts HC at line 188 under the condition that the car is set for serving that zone and no calls are registered above it.

When the car is at the lower terminal landing, it will be reversed unless a basement call is registered since the upper coil of relay RL will be energized through back contacts UL at line 191, back contacts BS of the basement service relay at line 192 and lead 650 to contact 643. However, if a basement call is registered as by the closure of contacts CC at line 69 of FIG. X to energize relay BS, back contacts BS at line 192 will open so that floor selector contact 643 for the first terminal will be disconnected from the relays. The car will then travel downward and serve the basement call and will be reset for up travel when brush 645 engages contact 644 for the basement landing.

This circuit also enables the presence of the car at a landing in the high zone below the top dispatching landing or at the landing at the top of the low zone to be sensed since brush 645 will engage one of the parallel family of contacts 642 for each of those landings and energize relay MGE at line 189. When relay MGE is energized during an up trip of the car, it seals itself in by closing contacts MGE at line 189. However, on a down trip relay MGE can be energized only while the car is at the landings since down signal direction back contacts DL are open at line 189.

The present system is illustrated with dispatching from a first landing and a basement landing below the first landing. Ordinarily the down traveling cars are reversed at the first landing and sent upward therefrom. However, a down traveling car with a car call for basement service registered will ordinarily proceed to the basement without stopping at the first landing unless a first landing car call or down hall call is registered. Once a car is stopped at the first landing without being subject to a basement call it is set for travel upward and is exclusively responsive to basement service for an interval, thereafter it is responsive to basement car and hall calls until it is placed in a load status of the dispatching sequence. A load status car at the first landing will respond to basement car calls until it is given an up dispatch signal but will not respond to basement hall calls.

Basement car calls are registered by closing push button contacts CC at line 69 of FIG. X to energize relay BS. Relay BS opens its back contacts at line 56 to prevent a down traveling car from stopping at the first landing unless a first landing down hall call has been registered to close contacts S1DA at line 57 or a first landing down car call has been registered to close contacts CB1 at line 54. Contacts BS are closed at line 66 to energize relay BS1 and in turn BS2 through closed contacts BS1 at line 67. Contacts BS at 192 are opened to prevent the resetting of the direction throwover relay RL when brush 645 engages first terminal contact 643. Thus, the car remains set for down travel even when stopped at the first terminal and is reset for up travel by energizing lower coil RL when contact 644 is engaged and the car is at the basement.

Relay BS1 indicates the presence of a call below the car if it is above the basement by closing contacts BS1 at line 64 to energize relay CBD. Contacts BS1 at line 70 close to provide a holding circuit for relay BS until the car signals are reset by opening contacts RB at line 71. Back contacts BS1 at line 74 are opened to drop out the basement service timer BST and thereby deenergize relay BSTA so that the basement service interval during which a car is responsive to hall calls for basement service is terminated. Contacts BS1 at line 177 energize the car start circuits while the car is at its lower terminal and set for travel downward. Contacts BS1 at line 194 close to enable a car which has been set for travel upward by energization of its upper RL coil to be reset for travel downward by energizing its lower RL coil upon the closure of contact TR2. Back contacts BS1 when opened deenergize up load relay CULB at line 251.

Relay BS2 closes its contacts at line 43 to maintain a holding circuit for the basement car button while the car is at the bottom terminal, thereby preventing the lockout of that car button. It closes contacts BS2 at line 296 to light the down hall lantern at the first landing and opens the circuit enabling a basement up hall call to institute the travel of a car downward by opening contacts BS2 at line 395. Back contacts BS2 at line 411 are opened to remove from the dispatching sequence a car which is to provide basement service by completing the break of the circuits through which the next and load relay CUN and CUL are energized as was partially accomplished by the opening of contacts BSTA. Relay BS2 also effectively removes the car from the group available for dispatching upon which the dispatching interval is based, as will be described, by opening back contacts BS2 at line 476.

Relay BU at line 395 of FIG. XXV cannot be energized if any car is in service (has its back contacts OEA at line 396 open), is below the second landing (has its contacts BS3 at line 394 open), and is subject to a basement service call (has its contacts BS2 at line 395 open). Relay BU is the medium for instituting basement service in response to either an up hall call from the basement or a down hall call from the first landing. Hence, if a car is to serve the basement and is in a region where it will reach the basement promptly, another car will not be actuated for basement service by a hall call.

Hall calls for basement service can be registered as a first landing down hall call by closing contacts 1D at line 85 to energize relay S1D or as an up basement hall call by closing contact CU at line 91 to energize relay SBU. Relay S1D energizes relay SBU if it has not already been energized by closing contacts S1D at line 92. It also energizes an auxiliary relay S1DA by closing contacts S1D at line 398 and indicates the presence of a first down hall call at the starter's panel by closing contacts S1D at line 509. Relay S1DA sets up a first landing stop in the car call circuits by closing contacts S1DA at line 57 and when the system is on the night program and the next load car has its doors reclosed, it causes that car to reopen its doors by opening back contacts S1DA at line 28, as will be described.

Relay SBU opens its actuating circuit at line 92 by opening back contacts SBU, closes contacts SBU at line 221 to energize basement run relay BR as the car runs downward from the first landing, closes contacts SBU at line 395 to energize relay BU if the above enumerated conditions are met, and actuates an indicator on the master control panel by closing contacts SBU at line 510.

When energized, relay BU enables a next up load car to be assigned for basement service by energizing BS through closed contacts CUN, BU and TO at line 72. The energization of relay BS enables basement service when actuated by relay BU in the same manner as set forth above for its actuation by push button contacts CC.

Additional circuits which function in accordance with car position are shown in FIG. XV. The circuits from lines 213 to 222 operate off the floor selector car position contact lanes so that significant car positions are indicated by relay operations. When a car is in service (has its contacts OEA closed), is not subject to a dispatch failure to open contacts FD, and is not given an instant dispatch by depressing button switch 652 at line 213, brush 653 of the car position lane of contacts on the floor selector is active. Bottom dispatching floor relays MG and MGA are energized while the crosshead is at the bottom dispatching landing position on the floor selector by engaging its contact 654 with brush 653. Similarly, top dispatching floor relay MG1 is energized when the crosshead is at the top floor and contact 655 is engaged by brush 653 as shown. As the crosshead runs down from the top landing, brush 653 engages contact 656 with down field contacts DF2 closed at line 215 to energize down car run relay BDR. Up car run relay BUR is similarly energized as the crosshead runs up from the main landing to carry brush 653 into engagement with contact 657. The contacts 656 and 657 for each car of the bank are connected in parallel through arrow-headed leads 658 and 659 so that the departure of each car from those landings actuate the car run relays. If basement run relay BR is energized so that back contacts BR are open or if the car is not traveling upward so that front contacts UF2 are open at line 217 relay BUR is not energized by passage of those cars. Basement run relay BR is energized when the floor selector brush 653 engages contact 660 as the crosshead moves downward from the main landing. Car position relay BS3 is deenergized while the car is below the second landing and is energized at all times that it is above that landing. A cam (not shown) carried by the crosshead closes contacts 661 while the car is at the second landing and above to energize relay BS3. Relay BS3 provides a holding circuit for relay BR by closing its back contacts BS3 at line 222. Relay BR when energized closes contacts BR at line 222 and seals itself in until the car runs up to the second floor and opens back contacts BS3.

Basement run relay can be energized under two options both requiring that the car run downward from the first landing to engage brush 653 with contact 660 while down field relay contact DF2 is closed. When switch 662 is open, it is also necessary that an up basement call be registered to close contacts SBU at line 221. When switch 662 is closed, any trip to the basement will energize relay BR.

The circuits of FIG. XV are fed from main leads 663 and 664 which are coupled to an alternating current source. Certain of the elements coupled to those leads are common to all cars of the elevator bank and are therefore connected in parallel to the cooperating elements of the individual cars by arrow-headed leads. The relays BDR and BUR, as well as the family of hall call relay contacts STD to S1U and contacts H3A and H4A supplementing that family in lines 200 to 213, and the relay SS and the cooperating contacts H4A, SS and J2 are common to all cars. These circuit elements are interconnected for the several cars by means of their floor selector contacts in their respective highest call circuit contact lanes by arrow-headed leads. Arrow-headed leads 665 are connected to the respective car brushes 653 to render those brushes effective through contacts FD and 652. Leads 666 connect the contacts of the several floor selectors to appropriate junctions in the lane of normally closed hall call contacts employed in sensing calls above the cars.

As will be discussed more fully below in connection with the restarting of each of the motor generator sets in sequence as required after the system has been shut down, the circuits including contacts CDD, EM, LSA and MG located at lines 210 and 211 connect the car position brush 653 to the top terminal relay MG1 under the stated conditions. This enables the restarting of the cars despite their presence at an intermediate floor by simulating their presence at the top landing and effectively utilizing the top dispatching and selecting equipment.

The car position circuits from line 200 to line 212 are represented fragmentarily. The presence of the car at its highest call is sensed in this circuit. In practice a hall call relay contact for each of the floors above the lower terminal is included in the family of back contacts comprising up hall call contacts S1U for the first floor, down hall call contacts STD for the top floor and up and down hall call contacts for each intermediate floor served by the car. A junction between each of the up and down hall call contacts for each floor is coupled to a highest call floor selector machine contact 667 for each car in the elevator bank. Further, a similar contact is connected to the junction between the contacts S1U and S2D. A floor selector brush 668 for each car is connected through a chain of contacts to a highest call relay HCT, to lead 669 and thence through parallel contacts LCR and H2 at lines 208 and 209 to lead 664. Each car has its highest call relay HCT connected through contacts LCR and H2 by means of arrow-headed lead 670.

A car call above the car energizes car signal direction relay CBA shown in FIG. X, as described, to open back contacts CBA at line 205 and bar operation of relay HCT. In the absence of a car call for that car for a landing above the car contacts CBA are closed and the circuit is able to sense the presence or absence of hall calls above the current effective car position. If the car is not on a down peak program, back contacts H3A at line 204 are closed. If it is not set for local service nor for by-passing calls, back contacts EL and contacts BP at lines 204 and 205 are closed. The accelerating relay AA is energized when the car is approaching the floor and is deenergized during the stopping sequence, so that contacts AA at line 205 are closed when brush 668 first engages contact 667. Relay VR2 is energized prior to the dropout of relay AA in the stopping sequence and is dropped out before contact AA at line 205 closes in starting. Thus, a circuit from relay HCT through contacts AA, VR2, UF2 and CBA can be completed only during a brief portion of the car stopping interval.

The highest call circuit is made effective only during up travel by closure of up field relay contacts UF2. Further it is not effective on the off peak program, to be discussed, since back contacts H2 at line 209 are open at that time, unless the late car reversal relay is energized to close contacts LCR. Thus under normal operation relay HCT is energized to signify the absence of any call above the car which can be served by the car when brush 668 engages a contact 667 which is connected through the contacts above it to lead 663, e.g. through closed back contacts STD, S9U, S9D and S6U in FIG. XV to contact 668 at line 204. Brush 668 is coupled through relay HCT to line 669 through back contacts H3A and EL at line 204, closed contacts BP, AA and UF2 and back contacts VR2 and CBA at line 205, lead 669 and either contacts LCR or back contacts H2.

When a car is assigned to serve a lower zone of floors, the floors below the seventh in the example, it is desirable to restrict its operation to that zone to as great an extent as is convenient without antagonizing passengers. This is achieved by simulaing a highest call signal for any local car which is above the fifth landing. As described in connection with the direction throwover switches RL, contacts in a floor selector lane of contacts 642 are provided for the top landing of the lower zone and all landings above and a relay MGE at line 189 is energized while an up traveling car is above the top landing of the lower zone as its floor selector crosshead passes the contacts for that landing. Relay MGE when energized for an up traveling car seals itself in until the car is set for down travel. On the down peak program with relay H3A energized, the express-local relays EL are energized for those cars having their local zone switches 672 closed at line 262 to set those cars for assignment to the local zone. Thus, contacts H3A at line 204 are open for all cars on the down peak program and contacts EL at line 204 are open and at line 205 are closed for the local zone cars. The hall call contact family is separated into two groups by opening back contacts H3A at line 205 to create an upper group for the high zone cars and a lower group for the low zone cars. By opening back contacts H3A at line 205 and by closing front contacts H3A at line 205 to lead 663, contacts S6U are made the lower limit of the high group and S6D are made the upper limit of the low group. Further, the highest call circuits of the low zone cars are prevented from responding to up hall calls in the low zone by by-passing the up hall call contacts as S2U and S5U with contacts H3A at lines 210 and 207.

The highest call relays of express zone cars are inoperative while the cars are below the top of the low zone since contacts H3A and MGE at lines 204 and 203 are both open. Contacts MGE are closed and the circuit is operative to sense the highest call as soon as the car reaches the top of the low zone. The highest call relays of the low zone cars are energized at the highest low zone down hall call through back contacts MGE and contacts EL at line 205. Once a local car reaches the sixth floor, its MGE relay is energized to connect relay HCT directly to lead 663 through closed contacts MGE at line 206. Thus, the presence of a car call for a floor above the sixth landing will maintain back contacts CBA open for a local zone car but as soon as the car responds to the highest car call in that region contacts CBA close and relay HCT is energized through the continuously closed MGE contacts.

Contacts H4A and J2 at line 212, contacts SS at line 211 and contacts H4A at line 210 all function in the night service program in connection with the operation of landing call indication relay SS as will be described. Generally relay SS is energized when no hall calls are registered since a circuit is completed from lead 663 through the family of normally closed hall call relay contacts and relay SS to lead 664. When a hall call is registered it opens one contact in the family to deenergize relay SS indicating its presence.

In addition to the basic functions outlined above the system includes other adjuncts which improve or augment the service provided by individual cars. In FIG. VIII load weighing means are provided which overcome inaccuracies heretofore present in means performing this function due to inertia of an accelerating or decelerating load and changes in the weight of the compensating cables with car position. Usually it is desirable to alter the operation of a car when its load attains some value slightly less than capacity, e.g. 80% of rated capacity. Since essentially no weight is added to that of the car while it is at its lower limit of travel and the compensating cable weight supported by the car increases as the car ascends, it is necessary to alter the car load level which will actuate the load sensing controls to correct for the additional weight of compensating cable according to car position if the useful load in the car is to be effective at a relatively constant level.

The eleven landings of the illustrative system are each provided with a load weighing contact 673 on the floor selector machine as shown at lines 22 to 27 which are engaged by a brush 674 carried by the crosshead. Although the effect of compensating cables on the load applied to the lifting cables is a continuously increasing value as a function of car height, it has been found that the change in load from a given floor to those adjacent that floor is not so great as to warrant changing the value of critical cable load for these controls. Accordingly, four load weighing contacts 675, 676, 677 and 678 are provided, each functioning at a predetermined load level which may compensate for changes in compensating cable weight with car height to become effective for a given load such as 80% of capacity at all car positions, or may be made effective for different useful loads at different car positions. These contacts have actuating mechanisms of conventional type which are located between the cable and the sling of the car and in the example are adjusted to close the contacts 675, 676, 677 and 678 at 80% of useful car capacity respectively at the first, third, sixth and ninth landings.

When the car is at the first or basement landings the first contact at line 26 must be closed to actuate the load responsive controls. The third contact at line 25 is effective for the second, third and fourth landings, the sixth contact at line 24 is effective at the fifth, sixth and seventh landings, and the ninth contact is effective for the eighth, ninth and tenth landings.

The load responsive controls are effective when the car is set to operate without an attendant, with back contacts T0 closed at line 20. Load weighing relay LW is energized when the crosshead has caused brush 674 to engage a floor selector contact 673 which is connected to a closed load weighing contact. Relay LW enters into the dispatching operation to be discussed. Load by-pass relay LBP is effective only during the door closing operation since it requires the closure of contacts CLB between its coil and the brush 674. This enables relay LBP to become energized only after the car load has stabilized and before inertia effects are introduced by the initiation of car travel. If relay LBP is energized by the engagement of brush 674 with an active contact while contacts CLB are closed, it seals itself in by closing contacts LBP at line 21 and holds that seal until the next door opening operation wherein back contacts OPA are opened. If the load is sufficiently decreased at that stop, the load measuring contact for that floor will be open when the LBP relay actuating circuit is closed and the load by-passing controls will not be effective for the remainder of the trip. However, if the load does not decrease sufficiently the LBP relay will again be actuated and sealed in as the door closes.

Load by-passing as introduced by the energization of relay LBP prevents the car from stopping at conventional hall calls by opening back contacts LBP at line 95 of the hall call stopping circuit of FIG. XI and indicates that it is in effect by closing contacts LBP at line 272 to actuate an indicator 679 in the starter's panel.

Another feature enhancing the service of individual cars in this system is that of measuring the length of the interval during which hall calls remain registered and unanswered. This control affords service to certain of the floors which might be left without service for a substantial interval due to the by-passing of the cars. It gives precedence to those hall calls so that their floors are served despite hall calls for those floors in the more favored locations unless the latter calls have been in registration for a predetermined interval.

The means for effecting registration interval measurements and for altering car operation in accordance therewith are illustrated in FIG. XI in the down hall call stopping circuits. The present utilization of these circuits is for a system wherein the down traffic is of a nature to fill the cars at the upper floors, or the upper floors of a zone and thereby actuate the load by-pass so that the lower floors in the zone are consistently by-passed at certain times of peak down travel. Accordingly, the upper floors other than the top floor of the express and local zones, floors 10 through 7 and 6 through 2 respectively, are each provided with a pass timer, T9P for the ninth floor and T5P for the fifth floor. The lower floors in those zones are provided with wait timers T8W, and T7W (not shown) for the eighth and seventh floors, and T4W (not shown), T3W (not shown), and T2W for the fourth, third and second floors.

Each of these timers are of a type which can be set to operate in an interval from a few seconds to several minutes, for example a motor driven timer. In the example they are all shown to be effective only during the down peak program when contacts H3A at lines 98, 100, 103 and 105 are closed and back contacts H3A at line 98 are open. For example, the pass timers can be set for twenty seconds and the wait timers for a minute so that if a hall call has not been registered for at least twenty seconds at the ninth floor and a call has been registered at the seventh or eighth floors for a minute or more an express car will stop and be set for down travel at the tenth floor, then by-pass the ninth floor and serve calls at the eighth and seventh floors. The express cars can also serve the second, third and fourth floor hall calls if one has actuated an overtime wait timer. Similarly, the local zone cars reverse at the sixth floor and by-pass the fifth to serve the fourth, third and second if any one of them has operated its wait timer and the fifth floor pass timer has not timed out.

In an express zone car, contacts EL at line 99 remain open on the down peak program and back contacts H3A at line 98 open for all cars, hence the circuit to the down hall call stopping brush 680 for an express car can only be established through the call timer lane of contacts 682 for floors 9 through 7 or 4 through 2 by means of brush 683 on the floor selector crosshead to lead 684 and the brush 680. If timer T8W or T7W has operated, one of their contacts at lines 106 and 107 are closed to energize the express by-pass relay PE thereby opening back contacts PE at line 96 to prevent the activation of the ninth floor contact 685 even though contacts S9D have been closed by a down hall call and the circuit thereto is otherwise complete from lead 686, through brush 683, contact 682, lead 684 and brush 680. The response of the car to the call which actuated the wait timer, assumed to be T8W, upon the simultaneous engagement of brush 683 with eighth contact 682 and brush 680 with eighth contact 685 cancels that call by opening the hall call relay contact S8D at line 99 to drop out the timer T8W and relay PE so that the next car will respond to down hall calls at the ninth floor. The above operation is prevented if a hall call has also been registered at the ninth floor long enough to operate pass timer T9P since that timer closes its contacts at line 97 to by-pass back contacts PE of line 96 and activate the ninth floor contact 685. An overtime wait call in the local zone will also be effective in causing an express car which is not being by-passed by other means to respond to calls in that zone through the contacts 682 for floors 2 through 4 since actuation of a wait timer closes one of contacts T2W, T3W and T4W at lines 110, 109 and 108 to energize local by-pass relays PL and close contacts PL at line 103.

Local zone cars have contacts EL at line 99 which are closed to maintain brush 680 effective in the hall call stopping circuits so that hall call stopping relay S is energized as under those operating programs other than the down peak program. The pass timer T5P at line 103 functions as does T9P to by-pass back contacts PL with contacts T5P at line 102 thereby causing a local car to stop at the fifth floor if a down hall call has been registered for twenty seconds. Wait timers in the local zone cause relay PL to by-pass down hall calls at the fifth floor if timer T5P has not operated by opening back contacts PL at line 101.

Car service is also expedited by operation of the highest call relay HCT at line 205 of FIG. XV as described since it energizes the highest call relay HC at line 237 of FIG. XVI when an up traveling car is stopped at a highest call to initiate a reversal of travel. Relay HC closes its contacts at line 188 of FIG. XIV to activate the car position contacts 642 of the floor selector for the top floor of the local zone and each of the floors in the express zone. Closed contacts HC at line 188 also enable a low zone car to reverse by energizing its lower RL coil through contacts EL at line 188 and the lowermost contact 642. Express and local zone cars are reversed in their respective zones through the energization of high call reverse relay HCR in FIG. XIII upon the closure of contacts HC at line 155 when either of vernier stopping sequence relay SC or high call slowdown relay SD are energized to close contacts SC at line 154 or contacts SD at line 155. When energized, relay HCR closes its contacts at line 50 in the circuit energizing relay SC to insure that relay SC is sealed in around the floor selector contacts, closes its contacts HCR at line 194 of FIG. XIV to energize the lower coil of RL and reset the direction of travel for the car if either car position indicator relay contacts BS3 at line 195 are closed, as they will be if the car is above the first landing, or contacts BS1 at line 194 are closed by virtue of a basement car call. Relay HCR also resets the top dispatch timer to be described by energizing relay BDR when the off peak program is in effect so that contacts H2 are closed, by closing contacts HCR for car A, B, C or D at lines 214 through 217. The energization of relay HC further insures the stopping of the car by closing contacts HC at line 104 to energize high call slow-down relay SD if the highest call is a down hall call, thereby insuring the energization of relay HCR. The hall call stopping relay S is energized through contacts HC at line 94 as the down signal direction relay is energized to close contacts DL in line 94.

During the stopping operation for a highest call which is a down hall call relay, S is maintained energized until the brake is set and while contacts RH3 at line 95 are open by closed contacts S and advance motor stopping relay contact VR1 both at line 93.

The door controls for the individual cars are arranged to accelerate the starting of a car when it is operating without an attendant by the utilization of safety controls which disable the door operator when an obstruction is encountered by a safe edge on its leading edge or an obstruction is sensed in the door closing path by a radiant energy detecting means. One such sensing means comprises a light source 687, photocell 688 and amplifier 689 as shown in FIG. XIX which are energized if the car is in operation without an attendant so that back contacts T0 at line 298 are closed and while the motor-generator set for the car is running as signified by the closure of contacts LSA at line 298. Conveniently, the light source is located on one side of the car door and the light eminating therefrom is columinated and projected across the doorway either along the closing path or essentially parallel and closely adjacent thereto. The photocell is located on or near the door jamb so that it is irradiated by the light beam in the absence of an obstruction in the door path. While the photocell is irradiated, the amplified signal maintains photocell relay PC at line 234 of FIG. XVI energized by closing contacts PCC if the safe edge switch 690 has not been opened by an obstacle encountered by the edge of the door and if the door open buttons 692 and 693 in the main and auxiliary car button banks, respectively, have not been opened. Relay PC can be maintained energized thereby eliminating the photocell control by closing cut out switch contacts 694 at line 233 or during attendant operation by closing contacts T0 at line 235. In the latter instance, the auxiliary door open button 693 is also disabled to place door operation under the exclusive control of the attendant at the main car control panel and control of the safe edge switch 690. The safe edge is by-passed by the closure of door position limit switch 695 when the door has closed sufficiently to prevent the introduction of an obstruction in its path.

Door timing at floors intermediate the terminals under automatic operation is accomplished by start time relays TR and TR2 at lines 153 and 142 of FIG. XIII and is supplemented by an expediting means which shortens the standing time interval after an obstruction is sensed by advancing the instant of operation of standing time saver relays TRL and TRLA at lines 232 and 230 of FIG. XVI. Relay TR is maintained energized while the car is running by auxiliary main switch relay contacts AM at line 153.

Door closing is dependent on the deenergization of relay BZT to close back contacts BZT at line 34. Relay BZT is deenergized by the energization of relay CS to open back contacts CS at 185, and relay CS is in turn dependent upon the closure of back contacts TR at line 170 and thus the deenergization of relay TR. As the car stops, contacts AM and BK open and relay EM is maintained energized by the closure of contacts RH1 through contacts PC at line 166 to hold open contacts EM at line 152. Prior to the interruption of the energizing circuit for relay TR by contacts AM, door open relay is energized to close its contacts OP1 at line 155 and maintain relay TR energized. Relay OP1 operates prior to the setting of the brake. Once the brake is set the energization of relay TR is maintained by contacts TRLA at line 154 of relay TRLA since the closure of contacts BK1 and OP1 completes its energizing circuit. The door opening relay drops out shortly after the brake is set to open contacts OP1 at lines 155 and 230. Relay TRLA is sealed in at this time through contacts TRLA, TRL and PC at line 231.

Both relays TR and TRL are timers. TR drops out a short interval after it is deenergized, e.g. two seconds. TRL operates a longer interval after it is energized. TRL is energized by TRLA upon closure of contacts TRLA at line 232. Thus, in the absence of the passage of an object through the car doorway to interrupt the light beam and deenergize relay PC, relay TRLA maintains TR and TRL energized until TRL times out and opens its back contacts at line 231. At that time TRLA drops out to initiate the timing out of relay TR. After TR drops out the car starting and door closing circuits are energized. If the time intervals of TR and TRL are assumed to be two and eight seconds a door normally remains open 10 seconds or the sum of the two intervals.

If an obstruction is present in the doorway, relay PC drops out. If TRL has not timed out this accelerates the door reclosing by dropping out TRLA to break the energizing circuit for relay TRL and the holding circuits for both TRLA and TR. While the light beam is interrupted, relay EM is deenergized to hold relay TR energized. When the light beam is reestablished, relay EM pulls in and relay TR is deenergized so that it drops out in two seconds to initiate the closing of the doors. Thus relays TRLA, TRL, TR and PC enable the door to be closed shortly after its path is clear and thereby expedite car service once a passenger passes through the doorway.

In all instances, even when the door is partially closed and encounters an obstruction which deenergizes relay PC, as by opening safe edge switch 690, the door is reopened and relay TR is reset so that reclosing is initiated only after relay TR times out. Reopening of the doors, if partially closed, is effected by the emergency relay which in dropping out opens contacts EM at line 176 to deenergize the CS and CLA relays. When CS drops out, it reenergizes BZT. CLA opens its contacts at line 34 and deenergizes relay CLB which closes its contacts at line 30 to energize door opening relays OPS, OP and OP1.

Relay TR2 is an auxiliary to relay TR providing an additional time interval after the drop out of contacts TR at line 142 for control of door reclosing under the off hours program, to be described, and for barring the resetting of the direction throwover relay RL for a car set to travel upward except at the lower terminal. Door reclosing circuits are shown in FIG. VIII. Reclosing is prevented by opening back contacts TR2 at line 26 so that cars which are to have their doors reclosed stand at the lower terminal with their doors open for a greater interval than is ordinarily defined for standing time at intermediate floors by imposing an additional interval on the TRL and TR intervals.

At the second landing and above contacts BS3 at line 195 are closed. If a car were on automatic operation so that back contacts T0 were closed it would be thrown over to down travel by the energization of the lower coil of relay RL through lead 695. Ordinarily relay TR2 is continuously energized when the car is at other than a dispatching terminal since contacts TR at line 142 or contacts CLA at line 141 are essentially continuously energized. At a terminal a car is held beyond its normal standing time by the dispatching mechanism and TR2 is permitted to time out since door close relay CLA is held deenergized. When relay TR2 times out the car can be reset for travel downward by a basement call since an energizing circuit for the lower coil of RL is available through closed contacts T0 and TR2 at line 195 and contacts BS1 at line 194.

Throughout the preceding discussion it has been noted that certain elements function in one manner when the car is set for automatic operation and in another manner when it is set for operation by an attendant. Each car is provided with an individual attendant throwover switch to enable all or only a portion of the cars to be operated by attendants while any cars without attendants operate automatically. Attendant throwover switch T0 shown in FIG. XVI is a motor driven unit having limit contacts 696 and 697 arranged to disable the motor when it has actuated the contacts. The switch T0 and its contacts T0 are illustrated in the condition for automatic operation throughout the drawings. When the car is placed in service, relay OE is energized to open back contacts OE at line 240 and close front contacts OE at line 238. The switch T0 is set for attendant control automatically at the time relay OE is deenergized by the reverse operation of contacts OE. The closure of contact OE at line 238 energizes the motor T0 through limit contact 696 provided manually operated switch 698 is closed at line 238 as shown causing the motor to rotate until all of the T0 contacts are placed in the condition shown, at which time limit contacts 696 are opened. If on the other hand, switch 698 is depressed to complete a circuit at line 239 the car remains conditioned for attendant operation when relay OE is energized. Closure of switch contacts 698 at line 239 or back contacts OE at line 240 while the car is in service and conditioned for automatic operation transfers it to attendant control by energizing the drive motor T0 through limit contact 697 so that it drives the T0 contacts to the positions opposite those illustrated and opens contact 697.

By-passing operation of the cars as discussed above is effective by deenergizing by-pass relay BP at line 241. That relay is energized while a car is in operation by the closure of contacts OEA at line 241 provided the failure relay for the car has not been energized to open back contacts F, as will be discussed, and the manual by-passing switches 699 in the master car control panel or 700 in the car are not maintained open. Under automatic car operation, by-pass switch 700 in the car is rendered ineffective by closed attendant throwover contact T0 at line 242.

Another individual control for each car which alters a number of operating functions is that of the express-local relays EL at lines 262 and 263. The express-local relays of each car are connected to lead 702 from a source of alternating current in the control section common to all cars of the bank through individual switches 672 which condition the cars for local service. Since the express-local option for car operation is available only under the down peak program in the example, all express-local relays are connected in parallel through lead 703 through a down peak program relay contact H3A at line 262 to a second lead 704 connected to another terminal of the source supplying current to the bank controls.

FIG. XVIII illustrates typical indicators which are primarily effective for individual cars and most of which are located in the starter's panel or a corresponding control point where monitoring of the cars is desired. The lamp 679 at line 271 is illuminated when the car is by-passing by the closure of contacts BP at line 271 and LBP at line 272 provided the motor generator starting relay is closed to complete contacts LSA to lead 705. During operation of failure relay F, contacts F and back contacts F are actuated at lines 270 to complete the circuit for the flasher and remove the by-pass around the flasher so that lamp 679 is illuminated intermittently.

Lamps 706 and 707 are provided for each car. They illuminate arrow indicators to indicate the direction for which the car is set to travel by the closure of up signal direction relay contacts UL at line 273 or down signal direction contacts DL at line 274. Contacts CUN and CUNA function during dispatching as will be described.

The car position at intermediate floors is indicated between lines 275 and 276. A lamp 708 is provided for each landing and is illuminated while the car position brush 709 carried by the floor selector crosshead engages a car position floor selector contact 710 for that floor.

The issuance of an up dispatching signal to the car is indicated by the illumination of arrow 712 incidental to the closure of contacts CUDA at line 276 while a down dispatch is indicated when contacts CDDA at line 277 are closed and arrow 713 is illuminated. The instant a car should be started by an attendant when it is subject to dispatching is indicated by a lamp 714 at line 278 located in the car. Lamp 714 is illuminated and a gong at line 279 which is mounted on the car is sounded by closure of either up or down dispatching contacts CUDA or CDDA at lines 278 or 279 provided the car is set for attendant operation as when contacts T0 are closed at lines 278.

An attendant is forewarned that his car will shortly be dispatched by illumination of a load light 715 in the car control panel when contacts T0 at line 280 are closed and the car is given the load assignment at the down or up dispatching terminals as signified by the closure of contacts CDLA or CULB at lines 280 and 281 respectively.

Fragmentary hall lantern circuits for a typical car are shown in FIG. XIX. Indicators for the top and bottom dispatching floors are connected across supply leads 716 and 717 by means of relay contacts. The top floor is illustrated as the upper dispatching floor, hence it is provided with a down travel indicating lantern 718 only at line 290. This lantern is illuminated while the car maintains the down load assignment by the closure of down load relay contacts CDL. Similarly, a car travel indicator in the form of a "This car up" sign 719 located at the lower dispatching terminal is illuminated at line 292 when up load relay contacts CULB at line 293 are closed if the car is not zoned to serve the lower zone so that back contacts EL are closed, and if the door reclosing feature implemented by relay CL4 is not effective to open contacts CL4 at line 291.

The remainder of the car travel indication functions are performed through up and down car travel indicator brushes 720 and 722 carried on the crosshead of the floor selector for each car in cooperation with up and down car travel indicator contacts 723 and 724 situated in respective lanes on the floor selector. A typical up travel indicator 725 is shown at line 291. It is illuminated when the car is set for up travel and brush 720 is in engagement with its contact 723 by the closure of contacts RL at line 291 and the opening of back contacts RL at line 295. A down travel indicator 726, for example at line 295, is illuminated with direction throwover relay RL in the opposite condition, with contacts RL at line 291 open and back contacts RL at line 295 closed, when the brush 722 has engaged its contact 724. The interval of illumination of a travel indicator at a landing is from the moment the advance motor relay drops out closing back contacts AMR at line 291 as the car controls initiate the stop at that landing until back contacts CLA are opened just prior to the closing of the car doors. These travel indicators will not function if the car has malfunctioned in a manner to deenergize the protective relay and open contacts LP2 at line 291, if the car is set to by-pass so that contacts BP are open and is required to stop for a car call, or if the car door reclosing is effective at the lower terminal to open contacts CL4.

Basement service requires special provisions in the travel indication circuits since the car is normally dispatched from a floor above the basement. The up lantern 727 for the basement is actuated when the car arrives at the basement and is set for down travel through lead 728. Lantern 727 is also lighted while the car is at the basement and set for up travel through lead 729 when the direction throwover relay has been operated. The "This car up" indicator is lighted by a car traveling upward from the basement when brush 720 engages contact 723 at line 292, if the up basement service relay BR is energized to close contacts BR and the car gate has begun to open so that contacts G are closed. A basement serving car according to the illustrated system remains at the first floor or lower dispatching landing for the standing time employed at any intermediate floor without being introduced into the dispatching sequence.

The dispatching sequence to be described involves selection of a car at a terminal as a next load car, assignment of that car to a load status, and dispatching. As a car arrives at the first floor and is selected it can be barred from a load assignment if it is to be sent to the basement. Under those circumstances, a down travel indicator 730 for the car is operated at the first floor even though the car has been set to travel upward by the closure of contacts RL at line 291 and the opening of contacts RL at line 295. Contacts CUNA at line 294 are closed by the up next car relay for that car to illuminate lantern 730 through up brush 720 while it engages contact 723 at line 292, and contacts BS2 are closed at line 296 so that the lantern is maintained illuminated through brush 722 when the car is reset to travel downward and until the brush is moved from contact 724 at line 296.

Stopping time relay MGF at line 297 measures the intervals over which a car's advance motor is deenergized at other than terminal floors. These intervals are defined by contacts MGA, MG1 and OE at line 297 and AMR and CL4 at line 291 all of which are closed. While the car is at the lower terminal, contacts MGA are open, and while it is at the upper terminal, contacts MG1 are open. Advance motor relay contacts AMR remain closed from the moment a car picks up a call for which it will stop to the moment the car gate is closed and the car advance motor is energized. Since the trip time of a car is a constant running time plus a variable time for stopping at landings, this relay indicates an interval which is a measure of the variable portion of car trip time. The stop time for each car when integrated for the system influences the operation of a number of system controls as will be described. Thus, the dispatch interval can be altered in response to variations in an element of trip time or of travel time over a portion of a trip to provide a car distribution calculated to better serve the structure even before the first car subject to the new demand has completed its current trip. Further, changes in these intervals may be employed to alter the operating program of the system automatically.

A pair of stopping time measuring circuits are shown in FIG. XX. These circuits function to indicate the portion of the time the cars of the system are stopped by maintaining a running integral of the stop time and thereby indicating the intensity of traffic in the system. The circuit is energized from leads 732 and 733 through transformer 734, measures up trip stopping time for cars A, B, C and D and actuates moderate up traffic relay MU and peak up traffic relay PU when the net up trip stopping time attains a level which is predetermined as characteristic of moderate up traffic or of peak up traffic respectively. Similarly, the circuit energized through transformer 735 actuates a moderate down traffic relay MD and a peak down traffic relay PD at predetermined levels of net down stop time for the system.

Each of the up and down stop time circuits operate similarly except that the portions of each for an individual car operate mutually exclusively so that the up travel circuit is energized for a car through closed ULF contacts while the down circuit for that car is opened at the open ULF back contacts and when ULF is deenergized the down circuit is completed through the ULF back contacts and the up circuit is opened through the ULF front contacts. Further the critical levels of stopping time which cause the traffic relays to pull in and drop out may be adjusted to different values and the number of relays actuated may be different as for low traffic, moderate traffic, heavy traffic and peak traffic for one or both circuits.

The up trip relay ULF for each car is operated as shown in FIG. XVI at line 243. Relay ULF is a latch type relay. It is energized by the closure of contacts UL at line 243 when the up signal direction relay is energized coincident with the first up trip door closing initiation signified by the closing of contacts CL at line 243. It is reset the first time contacts CL are closed after contacts UL are opened at line 243 and back contacts UL at line 244 are closed. Since this relay is instrumental in the program control functions, particularly during up peak service, and since it is desirable to discount the stopping time for a down hall call on up peak service, if the car reverses at a down hall call it is reset at the time the car picks up that high down hall call so that the stopping time for that call is not effective in the up traffic circuits of FIG. XX but is effective in the down circuits. Under these conditions the highest call, if a car call, is counted with the up stopping time even though the car is set to run downward during that standing time. Relay UL is reset as a car comes into a floor at which it is to reverse, however, relay ULF is not reset at a high call unless it is a high down hall call since contacts CL at line 243 cannot close until door closing is initiated. If the call for which the car stopped is a down hall call, contacts SD at line 244 close as the car is stopped and relay ULF is reset without awaiting the closure of contacts CL.

The up circuit includes a pentode 736 having a filament fed from filament secondary 737 and a plate potential developed through rectifier 738 from secondary 739 and smoothed by condenser 740. A screen and suppressor grid 742 and 743 are connected directly to plate 744 and thence to the positive terminal of rectifier 738. Cathode 745 is connected through resistance 746 and the actuating coils of peak up traffic relay PU and moderate up traffic relay MU to the grounded terminal of secondary 739. The current flowing in the cathode follower circuit including relays MU and PU is controlled by the potential between cathode 745 and control grid 747 and this in turn is a function of the potential at the upper terminal of condenser 748. This potential is derived from a voltage divider connected between the plate 744 and ground and having parallel resistances 749(A), 749(B), 749(C), and 749(D) serially connected to resistance 750. A lead from junction 752 is connected through a parallel combination of a unidirectionally conductive element or rectifier 753 and a resistor 754 to lead 755 between the parallel resistors 749 and resistor 750.

Condenser 748 is charged as a result of the stopping of elevator cars. The amount of charge accumulated is a function of the proportion of the time the several cars are set to be stopped as defined by the closure of their respective MGF contacts at line 301. When no up traveling cars are stopped the circuit from lead 755 to rectifier 738 is incomplete and any charge on condenser tending to make junction 752 positive leaks off through rectifier 753 and resistor 750 to ground. If car A were set for up travel, its magnetic latch, up trip relay ULF would be pulled in to close contacts ULF(A) at line 302 so that current would flow through resistors 750 and 749(A) while contacts MGF(A) were closed, thereby establishing a voltage on lead 755. That voltage would be greater if one or more other up traveling cars also stopped since the parallel resistances would cause a greater portion of the voltage to be developed across fixed resistor 750. The level of the voltage on lead 755 may charge the condenser 748 gradually through resistor 754 at a rate dependent upon the magnitude of the condenser and resistances and the charge currently on the condenser. That voltage may equal that at junction 752 and sustain the condenser charge, or may even be less than that at junction 752 and only reduce the rate of discharge of the condenser.

Since the potential at junction 752 determines the anode-cathode current in pentode 736, as it increases with increased up travel stops, the threshold level for the pull in of relay MU will be attained. A further increase to a second predetermined level will pull in relay PU. Rectifier 753 is poled to permit discharge of condenser 748 and thus reduction of the grid potential and anode-cathode current at a greater rate than those parameters are increased since it shunts resistance 754 with a very low resistance in the discharge direction. As anode-cathode current is decreased at some point, usually a substantial amount below the pull in threshold to avoid excessive shifts in operation, relay PU will drop out and at a still lower level relay MU will do likewise. These pull in and dropout points can be adjusted as is well known by altering air gaps in the relay magnetic structure, introducing resistances in parallel with the relay coils and the like. Further a slower discharge of condenser 748 can be realized by elimination of rectifier 753 or insertion of greater resistance in series therewith. A more rapid charge of condenser 748 can be introduced by reducing resistance 754 or by reversing the polarity of rectifier 753.

The down travel stopping time measuring circuit is arranged and operates as does the up travel circuit and will not be described in detail. It responds to the stop time of cars on their down trips only since back contacts ULF for the respective cars are open while they are on their up trips.

Another circuit for and method of operating traffic relays is shown in FIG. XXI. This circuit continuosly compares the integrated up travel stop time of cars of a group against the integrated down travel stop time of those cars. It actuates one or more relays when the up travel stop time predominates down travel stop time by a predetermined amount and it actuates one or more relays when the down travel stop time predominates by a predetermined amount. While these relays are illustrated only as down peak relay PD and up peak relay PU, low, moderate and heavy stop time responsive relays might be included for either up or down traffic or both. These extra relays can be suitably adjusted as to threshold levels of operation and can be incorporated into a control in the same manner as those of FIG. XX. It is to be appreciated that the contacts of relay PD and, when present, relay MD can be as shown throughout the remainder of the disclosure if this circuit is substituted for that of FIG. XX. However, the operation of the up traffic relays will be inverted so that front contacts PU and MU would be substituted for back contacts as now shown and back contacts PU and MU would be substituted for the present front contacts. This change is due to the operation of this circuit at a balance point affording an anode-cathode current of intermediate values wherein the down traffic relays are all energized and the up traffic relays are deenergized. Deviations from this balance point in the direction of heavier down stop time will increase the anode-cathode current pulling in the down traffic relays, while deviations in the direction of heavier up stop time will decrease the anode-cathode current to successively dropout the up traffic relays at critical points.

Power is supplied from leads 756 and 757 through transformer 758 to pentode 759 by way of a plate supply secondary winding 760, a rectifier 762 and a smoothing condenser 763. The pentode filament 764 is energized from filament secondary 765. One side of secondary 760 is grounded and the other is connected to anode 766, suppressor 767 and screen 768. Cathode 769 is connected through resistor 770 and the actuating coils of the traffic relays PD and PU to ground. The anode-cathode current energizes relays PD and PU in the cathode follower circuit. The potential of control grid 772 with respect to the cathode determines the anode-cathode current.

Potential for grid 772 is derived from an anode to ground voltage divider comprising resistors 773 and 774 at the junction 775 of those resistors. Lead 776 is connected to junction 775 to energize one end of a second voltage divider which is connected to ground at its opposite end and at all times comprises resistors 777 and 778. This second divider varies as a function of the car stopping intervals such that each up traveling car when stopped inserts a resistor 779 individual to it in parallel with resistor 778 and when stopped while traveling downward inserts that resistor in parallel with resistor 777.

The up peak traffic relay PU and any others which may be employed for measuring up traffic are deenergized at the time up traffic reaches a predetermined level according to this arrangement by adjusting the anode-cathode current level for the condition wherein no traffic exists or stop time in each direction is balanced such that the down relays are deenergized and the up relays are energized. Accordingly, the potential at junction 780 connected to control grid 772 is adjusted to cause an anode-cathode current to flow which is at the intermediate level where all up traffic relays are energized and all down traffic relays are deenergized if no stops are being made and the system has been quiescent for a sufficient interval to permit condensers 782 and 783 to discharge to the intermediate potential. The potential of junction 780 is altered by effectively altering the dividers 784 and 785, comprising respectively resistors 773 and 774 and resistors 777 and 778, through the introduction of resistors 779.

Each stop of a car at a floor intermediate the dispatching terminals causes the closure of the contacts MGF for that car at lines 313 to 316. When the car is set for travel downward its back contacts ULF at line 312 are closed so that its resistor 779 is connected in parallel with resistor 777. Up traveling cars have their back contacts ULF at line 312 open and their contacts ULF at line 317 closed so that during stops at intermediate floors their resistors 779 are placed in parallel with resistor 778. Each addition and removal of a resistor 779 alters the portion of the anode to ground voltage drop which occurs across resistor 774 of divider 784. However, for practical purposes when the values of resistance are properly chosen the effect of variations in resistance on the potential on lead 776 can be disregarded or if desired means can be employed to fix that potential as by the use of a voltage regulator tube between that lead and ground. Insertion of one or more resistors 779 in parallel with resistor 777 increases the potential of junction 780 with respect to ground and thus the control grid to cathode potential in pentode 759 since a greater portion of the voltage drop then occurs across resistor 778. Shifts in the potential of junction 780 are moderated or smoothed by condensers 782 and 783. Thus the stop of a down trip car in paralleling resistor 777 with its resistor 779 reduces the potential across condenser 782 thereby tending to permit junction 780 to approach more closely the potential of lead 776. That action tends to increase the potential across condenser 783 as an exponential function and tends to raise the potential of junction 780 with respect to ground in that manner. This tends to increase the anode-cathode current. If that current is increased sufficiently relay PD is energized indicating that the integrated down trip stopping time exceeds the integrated up trip stopping time sufficiently to warrant the actuation of the peak down relay PD.

Opposition to the tendency to increase the anode-cathode current or reduction of that current is effected by stopping of a car at a floor intermediate the dispatching terminals while it travels upward. Such a stop causes the closure of its back contacts ULF at line 317 and the closure of its contacts MGF to place its resistor 779 in parallel with resistor 778. This tends to decrease the proportion of the total voltage drop across divider 785 which appears across resistor 778 and tends to permit condenser 783 to discharge and lower the control grid to cathode potential, such action being reinforced by the increased potential between lead 776 and junction 780 tending to increase the charge on condenser 782. If the integrated stopping time for up travel exceeds that for down travel by a predetermined amount the anode-cathode current at one level will drop out the peak down relay PD, if it is energized, and at a still lower level, below the balance point, will drop out the peak up relay PU. As a balance of stops is approached for both directions of travel relay PU will again pull in and relay PD will remain dropped out. Thus this circuit of FIG. XXI operates in a manner related to the circuits of FIG. XX but performs a somewhat different function in that it alters the program controlling traffic relays as a function of relative stopping time in the two directions of travel while the circuits of FIG. XX alter those relays as a function of absolute stopping time in the individual directions of travel.

A program control is shown in FIG. XXII which is responsive to the amount of traffic in the bank of cars as indicated by the operation of relays PU, PD, MU and MD as well as to other conditions in the system, to the time of day, or to manual selection. A manual program selection switch 786 is provided having a movable contact arm 787 and a plurality of contacts 788, 789, 790, and 792 individually engageable by said arm to actuate program relays. Contact 788 at line 334 establishes an "off hours" program by energizing relay H4, contact 789 at line 332 is connected to down peak program relay H3, contact 790 at line 330 is connected to off peak program relay H2, and contact 792 at line 328 is connected to each of the program relays H2, H3 and H4 through program selection relay contacts PS2A, PS3A and PS4A so that the program is shifted automatically in response to the automatic controls.

Each of the programs embodies features which are chosen to serve the building most efficienctly under the conditions for which the program is designed.

The up peak program for the illustrated system involves dispatching the cars from the lower dispatching terminal at regular intervals, dispatching in advance of the normal dispatch instant if the car is loaded to a predetermined level and stopping and reversing the cars at the floor corresponding to the highest car or down hall call registered. In operating on the off peak program cars are dispatched from the upper and lower dispatching terminals. As the cars accumulate at a terminal on off peak operation the dispatching interval is shortened for that terminal to maintain them distributed. Normally up traveling cars on off peak operation continue to the top dispatching terminal; however, if a predetermined portion of the down dispatch interval has expired and no car is at the top terminal an up traveling car is reversed at its highest call.

The building is divided into a high zone or express zone and a lower or local zone for the down peak program. Controls and indicators on the local cars are arranged to discourage their utilization by up traffic, thus keeping these cars in service only in the low zone. These cars are also nonresponsive to up hall calls and their car buttons are disabled while they are at the lower terminal to further reduce their use by up traffic. The down hall call timers which register the length of the interval a hall call remains registered are effective on the down peak program so that a call registered for an overtime wait period will cause the next descending car to give that call priority, by-passing calls that have not been registered for the minimum wait interval. The high zone cars do not stop for ordinary low zone down hall calls but will respond to calls in the overtime wait zone if an overtime wait call is registered. Cars are not dispatched under this program but rather depart from the top floor of the zone or the highest call in the zone a fixed interval after the stop or the last passenger clears the door closing path at that floor or call.

Off hours operation embraces operating principles which tend to concentrate traffic in a single car. The cars are parked at the lower terminal by virtue of the use of timed dispatching from that terminal and high call reverse operation. Car doors are closed on all cars including the load car except in response to a hall call at the lower terminal or upon the return of a car to the terminal. In order to avoid transfer of the load assignment from a car which is partially shutdown when an operating car returns to the lower terminal, the load assignment is maintained on the active car even though it is away from the lower terminal unless another hall call is registered for service at that terminal or a hall call remains in registration after a given portion of a dispatch interval has expired following the dispatch of the load car. Thus, ordinarily only one car has its motor generator set functioning during this program and the remainder are shut down. When a second or more cars are required to be placed in service by virtue of receiving a load assignment, that assignment is maintained by the current load car when the system again becomes sufficiently quiescent to require the operation of but one car by maintaining the doors of that car open until the last of the remaining in service cars has returned to the lower terminal and reclosed its doors. The load car doors are then closed until it is called into service. Each car is immediately responsive to car calls, without reference to selection, load assignment, or dispatching once its doors are closed to avoid inconveniencing passengers who may enter other than a load car while its doors are open at the lower terminal.

Clock control of the programs is effected by the circuit shown in FIG. XXIII supplied from a suitable source of alternating current over leads 793 and 794. The timer 795 is supplied through transformer 796 from a separate alternating current source. Timer 795 includes a clock 797 in the starter's control panel, a contact actuating program clock C, and a switch 798 to maintain synchronism between clock 797 and the program clock during maintenance. The clock is illustrated as actuating three contacts, however, it is to be understood that greater or fewer contacts can be employed depending upon the number of programs or other time controlled functions to be operated. For example, if the up peak program is to be instituted at 7:45 a.m., the clock is arranged to close its contact C1 at line 347 at that time. This momentarily energizes program selection relay PS1. Relay PS1 can be of the magnetic latch type constructed and functioning according to the disclosures of R. A. Burgy application Ser. No. 632,064 of Jan. 2, 1957 entitled "Elevator Controls." Current from lead 793 passes through rectifier 799 and contacts C1 to lead 794 in a single direction to pull in the armature of relay PS1. This closes contact PS1 at line 347a in the reset circuits of relays PS1 and PS3. If relay PS3 is latched in, its reset coil is energized to drop out its armature through leads 800 and 802, rectifier 803, the PS1 contacts and contacts C1. Relay PS1 is not dropped out since its reset circuit does not provide sufficient flux to overcome the flux of its pull in or main coil. At the time clock contacts C2 are closed, the reset coils of relays PS1 and PS3 are energized through leads 802, 804 and contact C2 by current flowing to lead 794 from lead 793, through the rectifier 799 and, in the case of relay PS3, lead 800 to the reset coils. Relay PS3 when energized also resets relay PS1 if its armature is pulled in, thus, the clock control circuit permits only one program selection relay upon which it is effective to be energized at any one instant.

When the clock program control is utilized switches 805 and 806 at lines 321 and 323 of FIG. XXII are closed. Each of the circuits including one of these switches also includes contacts of a clock actuated program selection relay, contacts PS1 in line 321 and PS3 in line 323, so that under appropriate conditions those contacts become effective to maintain up program selection relay PS1A or down peak program selection relay PS3A energized.

The conditions for energization of relay PS1A are those which energize peak up relay PU to close contact PU, an up trip stop time level at some predetermined value established by adjustment of the control circuit parameters. Relay PS1A remains energized while contact PU is closed and is held in for a clock controlled interval if relay PS1 is energized coincident with PS1A through the path including switch 805 and contacts PS1 and PS1A at line 321 extending from alternating current fed lead 807 to lead 808. Relay PS3A is similarly energized when peak down relay closes its contacts PD at line 324 and is held in, if the clock controlled relay PS3 has closed its contacts PS3 and switch 806 is closed, through switch 806 and contacts PS3 and PS3A at line 323.

Program selection and thus the individual features incidental to program selection can be introduced by combinations of stop time with other conditions or service requirements. The combination of stop time and car load is particularly advantageous in localized service areas where a high intensity of a particular type of service is required. Consider a building having several floors occupied by one tenant whose employees work different hours from those of the remaining tenants. At periods adjacent the beginning and end of those work intervals heavy traffic will be concentrated at those floors. While a stop time measuring means might be employed which monitored only those floors and introduced appropriate program in accordance with its level, the present system is arranged to sense and to satisfy these requirements employing the stop time measuring means shown. Immediately preceding a work interval as described, the cars will be fully loaded at the lower terminal so that the full load dispatch relay FLD at line 267 of FIG. XVII will be energized, and the cars will usually stop at each of the floors on their up trips to raise the stop time to a moderate level on the up trips. This traffic condition can best be served by operation on the up peak program. Accordingly, this program is introduced by the coincidence of the operation of the full load dispatch relay FLD in response to a predetermined level of load and the operation of the moderate up stop time relay MU in response to a predetermined level of up stop time. Relay PS1A is energized, under these conditions, through closed contacts MU and FLD at line 322. Advantageously, a clock controlled holding circuit for PS1A as at line 321 can be made effective coincident with this period of the day so that the program will be maintained once it is introduced and will revert to another program on the termination of the period or the decline of the actuating conditions below the critical level, whichever occurs later.

It is to be appreciated that other combinations of stop time level and one or more conditions such as time of day, number of car calls, number of hall calls (in a particular direction of travel or a particular group of floors), length of call registration, distribution of cars, arrival of cars at particular locations with respect to a timed schedule, failure of a function and the like can be employed to shift programs or introduce particular service features in accordance with this invention.

If neither of the up peak or down peak program selection relays PS1A and PS3A are energized, as where the stop time in both directions of travel has fallen below the peak levels, their back contacts at line 326 are closed to activate lead 809 and permit either off peak program selection relay PS2A or off hours program selection relay PS4A to be energized. During normal service of the type the off peak program is designed to serve, normal service relay ECA at line 335 is energized through the closed back contacts RCL of the door reclosing relay which is energized only when at least one car of the bank has its door reclosed and the first dispatching interval relay contacts DS1. If desired, door reclosing can be disregarded by closing switch 910 to place control of relay ECA solely responsive to the first sensed level of integrated stopping interval of the cars as indicated through relay DS1.

When the system is required to provide only limited service, as where the stop time is insufficient to energize relay DS1 and thus relay ECA, the off hours program relay PS4A at line 325 is energized from lead 809 through back contacts ECA and PS2A to lead 808. As the traffic increases to operate relay ECA, its back contact at line 325 is opened to deenergize relay PS4A and its front contact ECA at line 321 is closed. The dropping out of relay PS4A closes its back contacts in line 321 to complete an energizing circuit from lead 809 to lead 808 for relay PS2A.

A seal-in or holding circuit for relay PS2A is provided around contacts ECA so that the system will not revert to the off hours program as a result of momentary lulls in traffic which briefly deenergize relay ECA. This seal-in circuit comprises back contacts ECT and closed contacts PS2A at line 322. A companion circuit prevents the energization of relay PS4A while relay PS2A is energized by means of back contacts PS2A at line 325.

The interval of the traffic lull deenergizing relay ECA which is required to expire before relay PS2A will drop out is established by off hours shift timer ECT at line 326. This timer can be energized only while relay PS2A is energized to close its contacts PS2A at line 326 and relay ECA is deenergized to close back contacts ECA at line 326. Timing is initiated at the instant those conditions are coincident and is terminated by the elimination of one of those conditions. Thus if the traffic level picks up before timer TCT times out, timing ceases and the timer ECT is reset to its initial point. Alternatively, when the timer times out it opens its contacts ECT at line 322 to drop out relay PS2A thereby opening contacts PS2A at line 326 to reset it to zero and energizing relay PS4A by the closure of back contacts PS2A at line 325. This illustrates one mode of altering a program in response to a coincidence of a predetermined level of stop time, that insufficient to energize relay DS1, and a predetermined timing operation.

If contact arm 787 of selector switch 786 is in engagement with contact 792 of the automatic program, energization of relay PS1A has no effect other than to insure the deenergization of all other program selection relays so that the system operates on its standard or up peak program.

Under automatic program selection, energization of relay PS2A institutes the off peak program when traffic, as determined by the integrated stopping time of cars in a predetermined range of travel, the floors intermediate the dispatching terminals in the example, has reached a predetermined level and is below the peak traffic levels. Relay PS2A closes its contacts at line 329 to energize relay H2 from active lead 812 to lead 808. Both bottom and top dispatching are employed under this program; however, if no car is available at the top terminal at the time a car should be dispatched downward, an up traveling car is reversed at its highest call by energizing late car reversal relay LCR at line 340 through the closure of contacts DFDA of the top dispatch timer sequence in the manner disclosed in E. B. Thurston's United States application Ser. No. 447,801, filed Aug. 4, 1954 for "Late Car Dispatching From High Call." That circuit is rendered effective by the closure of off peak program relay contacts H2 at line 340. The opening of contacts H2 at line 209 places the highest down hall call circuits of FIG. XV for each car under control of the late car reversal contacts LCR at line 208.

Another feature of the off peak program is to introduce top dispatching and to abbreviate the dispatch interval at the top terminal if two cars are present at the terminal and the level of integrated stops on up or down trips is sufficient to energize a moderate traffic relay. Top dispatch acceleration relay K4 at line 342 performs these functions. Under all but the off peak program relay K4 is energized so that the top dispatcher cannot time its maximum interval, as will be described. During the off peak program back contacts H2 at line 341 are opened to open the holding circuit for relay K4. When two cars are present at the top terminal, contacts BD2 at line 342 are closed. If the level of integrated stopping time at the selected floors, those floors intermediate the top and bottom dispatching terminals, attains a level for up travel to actuate moderate up traffic relay MU at line 304, contacts MU at line 343 will close. If the level for down travel is sufficient to actuate moderate down traffic relay MD at line 309, contacts MD at line 342 will close. When the closure of contacts BD2 and MD or MU is coincident, relay K4 will again be energized to accelerate the dispatch of a car from the top terminal. At the time only one car remains at the top terminal contacts BD2 open and that car is dispatched only after the expiration of a full dispatching interval.

The accumulation of three cars at the top or bottom terminal causes two of them to be dispatched by a single dispatch signal on the off peak program since contacts H2 at line 399 are closed to place the bottom terminal three car relay contacts BU3 in control of up scheduling relay timer KUT at line 400 and top terminal three car relay contacts BD3 in control of down scheduling relay timer KDT.

Energization of relay PS3A when the system is subject to automatic program control energizes down peak program relay H3 through the closure of contacts PS3A at line 331. Since the down peak program requires a substantial number of alterations in the system, a motor driven throwover switch H3A is provided. This switch is actuated by the closure of contacts H3 at line 337 so that it is driven to a position actuating its contacts, opening limit contacts 815 and closing limit contacts 814. Swtich H3A is reset when relay H3 drops out to close back contacts H3 at line 336 and to energize its motor through contacts 814 and those back contacts until it has deactivated all its contacts including contacts 814.

When the down peak program is in effect the cars are segregated into two groups, one serving a local zone and the other an express zone by closure of contacts H3A at line 263 of FIG. XVII to enable express-local relays EL to be energized on selected acrs. Bottom terminal timed dispatching is eliminated by the closure of contacts H3A at lines 428, 430, 432 and 434 of FIG. XXVI to energize the dispatch relays for the individual cars as they arrive at the lower dispatching terminal and close their respective contacts MG. Since timed dispatching upward is dispensed with, the up dispatch timer is disconnected by opening back contacts H3A at line 496 of FIG. XXIX and the up load light control by contacts CULB at line 293 of FIG. XIX is enabled by closure of contacts H3A at line 253 whereby lead 815 is activated from alternating current fed lead 702 when a car is given its up dispatch signal and closes its CUDA contact. Failure timer FTD is rendered nonresponsive to hall call relay SS by opening back contacts H3A at line 250 during the down peak program.

Further increase in the efficiency of the system is effected by integrating the zoning and high call controls during down peak operation as shown in FIGS. XI and XV. The opening of back contacts H3A at line 98 places the down hall call stopping circuits for the express zone car under the control of brush 683 so that the car can stop only at down hall calls in the express zone and overtime wait calls in the overtime wait region of the low zone. The pass and wait group of timers are made effective by the closure of contacts H3A at lines 98, 100, 103 and 105. Opening of back contacts H3A at line 204 renders the highest call relay of the express zone cars ineffective in the local zone while the highest hall call circuits are separated for local and express floors by the opening of back contacts H3A and the closing of contacts H3A at line 205. Up hall calls in the local zone are rendered ineffective on the local car highest call circuits as illustrated by closure of shunting contacts H3A at lines 207 and 210.

Decline of traffic to a level energizing relay PS4A, when the system is set for automatic programming, closes contacts PS4A at line 333 to connect activated lead 812 to lead 808 through off hours program relay H4. The off hours program employs a motor driven throwover switch H4A having limit contacts 816 and 817 so that front contacts H4 at line 339 drive the switch to its pulled-in condition and back contacts H4 at line 338 drive it to the dropped-out condition. Many of the functions of the night service throwover switch are closely related to dispatching, motor-generator set shutdown and door reclosing at the lower terminal all of which will be discussed in detail subsequent to the disclosure of the dispatching means employed with this system. Contacts H4A at line 24 when closed enable the door reclosing controls through relays CL3T and CL4. The circuits measuring the number of cars at the terminals are disconnected by opening back contacts H4A at line 362 under the off hours program.

Under the off hours program when door reclosing is effective, the load car will receive a dispatch signal if the dispatch timer has timed out at the time relay SS at line 212 of FIG. XV is dropped out. The car will then leave the lower terminal without reopening its doors. When an up hall call at the terminal is registered, the car must open its doors to give the registering passenger an opportunity to enter. Contacts H4A at line 212 prevent the drop out of relay SS in response to a first up hall call so that the load car can reopen its doors through the opening of back contacts S1UA at line 28 before the car departs.

Back contact H4A at line 210 is opened on the off hours program to insure that relay SS remains deenergized once it is dropped out subsequent to the detent of the up dispatch timer. As will be described, this is employed to insure that the load car is the last to reclose its doors when door reclosing is effective.

The dispatching system described below is arranged to withhold the release of a car from a dispatching terminal until the coincidence of the expiration of a given interval and the registration of a call to which the car next to be dispatched can respond, such a system has been characterized as "on call dispatching." It is to be appreciated that other dispatching techniques can be incorporated with many of the features described herein and that therefore many aspects of this system can be utilized with other systems of dispatching. In particular the present dispatching scheme institutes a dispatch interval in response to the termination of a preceding dispatch interval and resets the new dispatch interval upon the response of a car to the termination of the preceding interval. Thus, if a car fails to depart from the dispatching terminal in response to a dispatch signal, another car will receive a dispatch signal a dispatch interval following the first signal. If the preceding car does depart, however, the following interval is remeasured from its departure. It is apparent that this feature is not confined to on call dispatching and might be employed with other than timed dispatching as where signals are responsive to the position of other cars in the system.

A car arriving at a terminal where dispatching is effective will actuate at least some of the following: individual car location responsive devices, individual car availability sensing devices, a car selector, next car assignment devices if it is selected, then load assignment means and dispatching means. Upon issuance of a dispatch signal on the up peak, down peak and off peak programs any other car available is selected, and assigned for dispatching.

Arrival of a car at a dispatching terminal energizes a dispatching floor relay, relay MG1 for a top floor and relays MG and MGA for a bottom floor as shown in FIG. XV at lines 213 and 220. Up dispatching sequence is instituted by closing contacts MG for the car at lines 411, 413, 415 or 417 and at lines 427, 429, 431 or 433. On the down peak program, contacts H3A at lines 428, 430, 432 and 434 are closed to energize the up dispatch relay immediately and send the car upward. When sequenced dispatching is effective at the lower terminal, the availability of a car for introduction into the dispatching sequence is indicated by a car available relay CA individual to each car, an available car is selected as next for load assignment by energizing its up next car relay CUN, a next car is transferred to a load status by energizing its up load car relay CUL, and an up load car is dispatched in response to the energization of its up dispatch relay CUD.

For a car to be available to the dispatching sequence, it must be at the dispatching terminal and be free of a basement service assignment. Its presence at the lower terminal is indicated by closure of its MG contacts at lines 411, 413, 415 or 417. Its freedom from basement service is indicated by closed back contacts BS2 indicating that no basement call has been assigned to it or by closure of contacts BSTA indicating that it has been at the lower terminal for an interval sufficient to receive a basement assignment and no assignment has been forthcoming. As described, a car can be assigned to basement service any time it is at the first landing by registration of a car call but only while it is in its next status can it be assigned by a hall call since the energization of relay BU closing contacts BU at line 72 is ineffective to energize its basement service relay BS except while the contacts CUN are closed. An additional form of basement service which a car might support while at the first landing is that of a return trip from the basement. Such a trip energizes its basement run relay BR. If energized, back contacts BR are opened to bar the car from the dispatching sequence. When a car has its contacts MG, BS2, or BSTA, BR, CUDA and CULA all closed at lines 410 through 417, its car available relay CA is energized to make it available for selection. This closes a CA contact at line 418, 419, 420 or 421 to energize up rotary dispatch selector RDSU provided another car has not been selected as next for load assignment as signified by the series of CUN back contacts at lines 419 and 421. A next car will hold its back contact CUN open in the energizing circuit for selector RDSU, hence this selector can function only when no next car is assigned. The rotary dispatch selector RDSU rotates its shaft 824 to close in sequence the contacts RDSU. Thus, if car A had been the next car the selector will be positioned to close contact RDSU-1 and will close contacts RDSU-2, RDSU-3 and RDSU-4 in sequence when energized. In all but the off hours program the circuits to the right of the selector contacts are complete to lead 823. When the selector closes the contact in series with the up next car relay CUN for the car whose car available relay CA is energized, that CUN relay is energized to stop RDSU by opening the CUN contacts in series therewith. Back contacts NS, CL4 and NSCL are closed except in certain circumstances on the off hours program hence a holding circuit is maintained for the CUN relay through the selector contact.

A car's up next car relay CUN initiates operation of its motor generator set if it has been shut down by closing contact CUN at line 1 to complete a properly conditioned circuit through the up dispatch timer failure relay contacts JO and the door reclosing relay back contacts CL4 for that car. It also opens the car call above circuits disabling relays CB and CBA for that car, unless its doors have been reclosed and contacts CL4 at line 56 are closed, by opening back contacts CUN at line 55. During next assignment the car can be sent to the basement by virtue of the conditioning of basement service relay BS through the closing of contacts CUN at line 72 to render it responsive to a hall call for basement service represented by the closure of contact BU at line 72. When transferred to basement service contacts BS2 for the car at line 411, 413, 415 or 417 open as do contacts BSTA at line 410, 412, 414, 416 to remove it from the dispatching sequence.

When no car is available for load assignment, an arriving car can be transferred from next to load assignment as soon as the basement selection interval defined by BSTA has expired. In order to provide an opportunity for assignment of a car to basement service before transferring it to the load status, a basement service timer BST shown at line 74 of FIG. X is employed. This timer can be of the flux decay type which drops out after an interval of from a fraction of a second to several seconds. It is normally energized but is deenergized when the car receives the next assignment by the opening of its back contacts CUN or when it is assigned to basement service opening back contacts BS1 all at line 74. The drop out of BST deenergizes relay BSTA by opening contacts BST at line 73. Thus, a brief interval after a basement call has been registered or after the car has been given a next assignment relay BSTA is deenergized.

In normal operation a next up load car which is maintained in that status for a given interval after BSTA times out is conditioned for basement service. These functions are achieved through relays BSTA, LNT and CUNA. Contacts BSTA at line 420, 422, 424 or 426 close to enable the car's up load relay CUL to be energized if the closure was due to the up next car assignment. If the closure was due to a basement service assignment, energization of relay CUL is prevented and relay CUN is dropped out since contact BS2 at line 411, 413, 415 or 417 is opened together with its parallel BSTA contact. Relay LNT defines an additional interval during which a car can remain in a next up load status without conditioning it for basement service and, upon its drop out, effects that conditioning. Contacts BSTA at line 393 of FIG. XXV close to maintain relay LNT energized when the car receives its next load car status assignment and has its CUN contacts opened at line 394. When relay BSTA is deenergized relay LNT begins to time out.

When relay LNT drops out it closes its back contacts at line 265 of FIG. XVII to energize the auxiliary up next car relay CUNA through closed contacts CUN at line 265. Thereafter relay CUNA remains energized until the car is transferred from the next up load status. The availability of the car for down travel to the basement during the remaining portion of its next assignment is indicated by the illumination of down indicator lamp 707 in the lobby control panel when contacts CUNA close at line 275. This availability for down travel is also indicated by the down hall lantern at the first floor by closing contacts CUNA at line 294 of FIG. XIX even though direction throwover relay RL has been reset for up travel. The auxiliary up next car relay back contacts CUNA at line 27 permit door reopening if a first floor down hall call is registered to hold back contacts SIDA open at line 28 under the off hours program. Upon drop out of relay CUNA, the down travel indicators are deenergized and the up load car status for the car is indicated in the starter panel by illumination of lamp 706 by the closure of back contacts CUN at line 273.

When no up load car is assigned, as indicated by open up load car relay contacts CUL at lines 435, 436, 437 and 438 for all of the cars in the bank, timer relay DFUT is deenergized and after a suitable drop out interval it closes its back contacts DFUT at line 422. If no basement service has been required of the next car and its basement service timer has timed out to close its BSTA back contacts, the closure of back contacts DFUT energizes its up load car relay CUL through its closed up next car contacts CUN at line 420, 422, 424 or 426. Relay CUL seals itself in through the circuit from lead 822 to lead 825 through its contacts CUL at line 421, 423, 425 or 427 to lead 826 and thence to lead 823. The primary load status function is performed by the auxiliary up load car relay CULA at line 253 of FIG. XVII upon the closing of contacts CUL at 254. The subsidiary load status functions utilized particularly under the night service program are realized through closure of contacts CUL at line 2 of FIG. VII in the start circuit of the motor generator set, opening of back contacts CUL at line 74 of FIG. X to maintain the timer BST deenergized, opening of back contacts CUL at line 168 of FIG. XIV to bar instant car button starting of a load car whose doors are reclosed, closure of contacts CUL at line 420, 422, 424 or 426 to hold the load assignment on the operating car even though it is away from the lower dispatching terminal, and opening of back contacts CUL at line 355, 356, 357 or 358 to prevent the reclosing of the doors of a preferred load car until another car which has been placed in service by increased traffic has returned to the lower terminal and reclosed its doors.

Energization of relay CULA during up load assignment opens back contacts CULA at line 27 of FIG. VIII in the door reclosing circuits, opens back contacts CULA at line 411, 413, 415 or 417 to reset the car available relay CA and up next car relay CUN of the load car, and closes contacts CULA at line 427, 429, 431 or 433 to enable the car's up dispatch relay CUD to be energized.

If the car is at the first floor as it must be for these functions except under the off hours program, its MG contacts at line 427, 429, 431 or 433 are closed so that its up dispatch relay CUD is energized from lead 822 through contacts MG, CULA and KU upon the closure of contact KU at line 430.

Up dispatch relay KU at line 388 of FIG. XXV can be of the magnetic latch type wherein energization from lead 827 to lead 828 pulls in its armature while energization from lead 829 to 828 drops out its armature, and energization from both leads 827 and 829 to lead 828 causes the pull-in action to predominate. Main leads 830 and 832 for this circuit are supplied by alternating current, therefore, a rectifier 833 is included in lead 828 to enable the utilization of a highly sensitive direct current type of relay for relay KU. The cars can be dispatched by completing a circuit from lead 830 to lead 827. Closure of activating switch 834 and up dispatch switch 835 at line 387 as by buttons in the starter's panel energizes relay KU as does the coincident closing of up dispatch timer holding relay back contacts DFU and up dispatch timer relay contacts J3 at line 388, or the coincident closing of up travel relay contacts BUR at line 390 and up dispatch relay reset timer contacts KUT at line 389. Normal automatic dispatching is effected upon the closure of contacts J3 a fixed interval after the previous dispatch signal or departure of the preceding car while back contacts DFU are closed, whichever occured later. Discussion of the timing will be deferred.

Relay DFU is normally deenergized by open contact J2 at line 392. However, contact J2 is closed a predetermined interval after the initiation of an up dispatch interval timing operation and is held closed until the reset of the up dispatch timer. During the latter portion of the interval, relay DFU will be energized if no car has a load assignment either because it has not been assigned or has been removed from the assignment for basement service. Under these conditions the back contacts CULB at line 391 are all closed to energize auxiliary up dispatch timer holding relay DFUA and close its contacts at line 392. These contacts complete an energizing path for relay DFU. If no call to which the up load car can respond, as a car call in that car or a hall call, is registered throughout the interval, contacts J2 are closed and relay DFU is energized to bar release of the load car by relay KU. In the absence of a hall call to open one of the series of hall call relay back contacts at lines 290 through 212 of FIG. XV, landing call indicating relay SS is energized to close its contacts at line 390 and partially complete the circuit for relay DFU. If relay SS is deenergized by a hall call, it opens the energizing circuit for relay DFU at line 390. When a load car is assigned, its CULB back contacts in line 389 are opened so that the energizing path for relay DFU can be broken by registration of a car call to open its CB contacts at line 390.

When relay DFU is deenergized by either a car or a hall call, up dispatch relay KU is energized the instant contact J3 is closed. Contact KU at line 430 is then closed to energize the up dispatch relay CUD of the load status car. A car on automatic operation will have its motor generator set started without reliance on any other condition in the primary starting circuits when contacts CUD at line 6 of FIG. VII are closed. The auxiliary up dispatch relay CUDA is energized with CUD to energize an up dispatch starting time relay STT on closing contacts CUD at line 258 of FIG. XVII. A holding circuit for the up dispatch relay is established to lead 823 through lead 836 by closing contacts CUD at line 428, 430, 432 or 434 to maintain the relay energized until that car leaves the first floor and deenergizes its MG relay to open contacts MG at lines 427, 429, 431 or 433.

Auxiliary up dispatch relay CUDA closes its contacts at line 253 of FIG. XVII and opens its back contacts at line 251 to enable the auxiliary up load car relay CULA and the minimum dispatch timer CUT to be energized on the down peak program despite the by-passing of load assignment on that program. The load assignment of the car in conventional dispatching is canceled by opening back contacts CUDA at line 411, 413, 415 or 417 and dispatch indicators are actuated in the starter's panel by closing contacts CUDA at line 276 of FIG. XVIII and in the car by closing contacts CUDA at line 278.

Relay CULB is barred from energization while the car is subject to dispatching since it is not necessary to operate the dispatch timer holding circuits at lines 389 and 391 at that time. The load car indicators in both the car at line 281 of FIG. XVIII and the hall at line 293 of FIG. XIX are deenergized upon the issuance of a dispatch signal to the car. This extinguishes the "this car up" lamp for the dispatched car.

In order to avoid closing the doors of the dispatched car on an entering passenger who was attracted to the car by the "this car up" indicator which was just previously extinguished, the door is held open by up dispatch starting time relay STT for an additional brief interval following the energization of relay CUD which may be several seconds. This relay began to time out at the instant CUDA was energized. At the end of its timing interval it completes the car starting circuits of FIG. XIV by closing contacts STT at line 172 to connect lead 584 with lead 586.

When top terminal dispatching is utilized, it parallels that described above in many functions although it is considerably less complicated where no floor can be served above the top terminal, as in the present example. The down dispatching circuits are shown in FIG. XXVII. The arrival of a car at the top terminal closes its top dispatching floor relay contacts MG1 in its down load car relay CDL and down dispatch relay CDD circuits at line 454, 455, 456 or 457 and closes contact MG1 in its down rotary dispatch selector RDSD circuit at line 458, 459, 460 or 461. If its down dispatch relay back contacts CDD are closed and no down load car is assigned to open its back contacts CDL in line 460, down rotary dispatch selector RDSD is energized and rotates its armature shaft 837 to sequentially close contacts RDSD at lines 454, 455, 456, and 457. When the RDSD contacts for a car whose MG1 relay is energized are closed, its down load assignment is effected by energizing its relay CDL to open the RDSD circuit through back contacts CDL, at line 460 and to stop the armature in a position maintaining the RDSD contacts for that car closed. Contacts CDL at line 261 of FIG. XVII are closed to energize auxiliary down load relay CDLA for that car, contacts CDL at line 290 are closed to light the car's down hall lantern 718 at the top floor, and contacts CDL at line 367, 368, 369 or 370 are closed to energize the down scheduling relay reset timer DFDT and the down scheduling relay reset relay DFDL.

Auxiliary down load relay CDLA conditions the down dispatch relay CDD for the car for energization by closure of down scheduling relay contacts KD at line 466 by closing contacts CDLA at line 463, 465, 467 or 469. It enables relay KD to be energized by opening the energizing circuit of down dispatch timer holding relay DFD at line 381 of FIG. XXV so it can be deenergized under proper conditions. These conditions correspond to those required at the bottom terminal in that during the interval down dispatch timer contacts K2 at line 383 are closed a car must have a load assignment as signified by the opening of one of the back contacts CDLA at line 380 to deenergize auxiliary down dispatch timer holding relay DFDA and open its contacts at line 383, and must have either a hall call registered as indicated by open contact SS at line 381 or a car call registered in the load car so that a parallel pair of back contacts CDLA and CBD in lines 381 and 382 are both open for that car.

When relay DFD is deenergized its back contact is closed at line 385 so that upon completion of the down dispatch interval the closing of contacts K3, as will be described, energizes down scheduling relay KD. This relay can be energized manually by closing activating switch 834 at line 387 and down dispatch switch 838 at line 386. Relay KD corresponds structurally and functionally to relay KU and is reset by energizing lead 839.

In the past, it has been necessary to prevent the dispatching of more than one car in a bank at a time and to measure the delay in car operation so that the controls can be altered to permit subsequent cars to leave the terminal if the first car was delayed excessively. The interlocking of cars has been eliminated in the present system without loss of the means permitting the dispatch of but one car upon the issuance of a dispatch signal. When the down load relay CDL of a car is dropped out by operation of its down dispatch relay CDD, contacts CDL at line 367, 368, 369, or 370 are opened to deenergize relays DFDL and DFDT. Relay DFDT is of the slow drop out type so that its contacts at line 383 of FIG. XXV hold in momentarily while back contacts DFDL at line 383 close thereby resetting down scheduling relay KD by energizing lead 839. When relay DFDT drops out it closes its back contacts at line 460 to energize the down rotary dispatch selector RDSD. The rotary dispatch selector then operates to select another load car which, when selected, remains in that status until the end of the next dispatch interval. At the end of the next interval the load car is dispatched without regard to the previously dispatched car. Thus even if the previously dispatched car is held, as by operating the door safety circuits, or other malfunctions, the system cannot lock up and requires no supplemental failure timing to correct such lockups.

Similarly, the up scheduling relay KU is reset by activating lead 829 through contacts DFUL and DFUT at line 389. Upon energization of an up dispatch relay CUD the up load relay CUL of a car is dropped out by opening back contact CUDA at line 411, 413, 415 or 417 to deenergize DFUT and DFUL at lines 436 and 439. Relay DFUT drops out after a delay to open contacts DFUT at line 389 while contacts DFUL in series therewith are closed immediately to energize briefly the up scheduling relay reset winding. The up dispatch is maintained on the car through CUD holding contacts at lines 428, 430, 432 or 434.

A car having its CUN relay energized is advanced to load status as the load status of the preceding car is canceled upon the closure of back contacts DFUT at line 422. Another car is given the next assignment when RDSU causes its CUN relay to become energized. The up dispatch timer runs from the resetting of relay KU so that at the end of the next interval it again closes KU at line 430 to energize up dispatch relay CUD for the new load status car even if the up dispatch relay of a previously dispatched car is energized.

On the off hours program, as will be discussed, the car retains the up load assignment while away from the floor, hence when a dispatch signal is issued to the load car back contacts CUDA at line 251 of FIG. XVII are opened to drop out relay CULB. This opens contacts CULB at line 438, 439, 440 or 441 for that car permitting relay DFUL to drop out. Back contacts DFUL are closed at line 389 of FIG. XXV to complete a reset circuit for up scheduling relay KU with contacts DFUT of the still energized relay DFUT. Another load status car is dispatched at the next interval if the dispatched car fails to leave the terminal even though its load assignment was maintained during the interval since energization of relay DFU opens its back contacts at line 426 to open the load assignment holding circuit. The next car would then be given the load assignment through the conventional circuits when relay DFUT dropped out at line 436 and it would be dispatched at the end of the interval by the closing of contacts J3 at line 388.

During the off peak program, the control functions at the terminal are modified to avoid accumulating cars at one end of their travel. On all but the off hours program back contacts H4A at line 362 of FIG. XXIV are closed to activate circuits measuring the number of cars available at the dispatching floors. Relays BD2 and BD3 at lines 360 and 361 measure the presence of two and three cars respectively at the top terminal. The presence of these cars is indicated by the closure of their MG1 contacts at lines 359, 360, 361 and 362. This permits a current to flow between the alternating current supplied leads 840 and 842 by way of lead 843 which is a function of the number of cars present since each of the contacts has a resistor 844 in series. When two of the parallel resistors are connected from lead 840 to lead 843, the current is sufficient to pull in relay BD2, and when three resistors are connected in parallel the threshold level for relay BD3 is also exceeded. In order to insure the drop out of relays BD2 and BD3, back contacts BDR are opened each time a car leaves the top terminal thus requiring the relays to be pulled in again. Similarly contacts MG function when the cars are at the lower terminals to connect parallel resistors 845 between lead 840 and lead 843 whereby neither relay BU2 or BU3 is pulled in with one car present but the arrival of the second car pulls in relay BU2 and of a third car brings in relay BU3. Each of the up two car and up three car relays are reset as a car leaves the lower terminal floor traveling upward by virtue of the opening of back contacts BUR at line 364.

When top dispatching is effective as in the off peak program, the arrival of a second car at the top dispatching terminal energizes relay BD2 to open back contacts BD2 at line 381 of FIG. XXV and deenergize relay DFD so that the timer is permitted to time out. This timing is accelerated if the traffic is at a moderate level so that relay K4 is energized, and if below that level it expires in a normal interval.

The presence of three cars at the top or bottom terminal causes the next dispatch signal to start two cars away from the terminal on the off peak program. The circuits effecting this are shown in FIG. XXV. When three cars are present at the top terminal, contacts BD3 at line 399 are closed to energize down scheduling relay reset timer KDT through closed contacts H2. Three cars at the lower terminal will similarly energize up scheduling relay timer KUT through closed contacts BU3 at line 400. As the dispatch timer times out and a car responds to the dispatch signal as by starting away from the terminal, the scheduling relay KD or KU is normally reset by the closing of contact BDR at line 384 for relay KD or BUR at line 390 for relay KU through the energization of their respective reset coils. Similarly, when a car is late at the top floor relay KD is reset as it is high call reversed by the momentary energization of relay BDR through contacts H2 at line 214 and one of the high call reverse relay contacts HCR at line 214, 215, 216 or 217. This function ordinarily prevents a second car from being dispatched until a full dispatching interval has expired after the departure of the preceding car. However, when relay KDT is energized, the departure of a car from the top terminal energizing relay BDR momentarily, simultaneously energizes the pick up and reset windings of relay KD so that relay does not drop out. Relay KDT is of the flux decay type, hence, although it is deenergized by relay BDR through relay BD3 its contacts KDT hold in until after relay BDR drops out and the first reset impulse from BDR has expired. As the next down car is advanced to down load assignment it encounters a completed down dispatch assignment through the still latched-in relay KD and is started downward. However, at this time the relay KDT is dropped out since relay BD3 is not reenergized when only two cars are at the terminal. Hence, the closing of contacts BDR at line 384 by the second departing car resets relay KD so that a full timing interval is required before the last car will be dispatched.

The up dispatch of two cars from the bottom terminal when three are accumulated is effected similarly. Contacts KUT close at line 390 so that the first car departing upward does not release the latch of up scheduling relay KU. By the time the second car departs upward, contacts KUT have dropped out and relay KU is reset by relay BUR at line 390 to impose a full dispatch interval on the third car.

Under the off hours program all cars have their doors reclosed at the lower terminal after they have remained open a sufficient interval to enable the passengers who may have ridden downward to leave the car. This interval requires the successive timing out of relays TRL, TR and TR2 as described. No load car indication is exhibited at the lower terminal although all cars are parked at that terminal. After the cars have remained for a given interval at the lower terminal their motor generator sets are shutdown. The load car at the time of switch over to off hours service is the preferred load status car. Load assignment is maintained on that car while away from the lower terminal floor unless an up hall call from that floor is registered or a hall call is in registration when the load car has been away from the floor the portion of the dispatch interval defined by the operation of relay J2. If the load assignment is transferred to a second car, that car retains the assignment until it returns to the first floor. However, if two or more cars are placed in operation, the first of those cars to return to the terminal is then given the load assignment, and its doors are retained open until all other cars have returned and reclosed their doors. At that time the load car doors are reclosed.

Any car which returns to the lower terminal takes over the up next car status from the current up next car if that car does not have its motor generator set running. If another car has its set running and has therefore maintained the next car status, the returning car will be placed on standby status with no assignment unless that next car has its doors reclosed.

This concentration of next and load assignment on cars with open doors is calculated to avoid confusion of passengers as to the car which they should enter at the lower terminal since once a car receives a load assignment while available to passengers at that terminal it is not shifted under any circumstances until it is dispatched. Further, by concentrating traffic in a preferred load car the starting and stopping of motor generator sets is reduced to a minimum. Passenger inconvenience is avoided without disrupting the preferred mode of operation, even when a passenger enters a recently returned non-load car whose doors are thereafter reclosed since all cars which are not placed in the load status are immediately responsive to car button calls on the off hours program.

The load car is conditioned for service above the lower dispatching terminal and the next up car is arranged to serve floors below that terminal. Accordingly, the load car is responsive to all hall calls but a first down or a basement up hall call and the next up car is responsive to those calls. An up next car with its doors reclosed opens them for a first down hall call, and, if its motor generator set is shutdown, it starts its set in response to any hall call for basement service.

Energization of the off hours program relay H4 closes contacts H4A at line 24 of FIG. VIII for each car control in the bank to establish door reclosing for the cars when they are at the lower terminal upon energization of relays CL3T and CL4. These relays are energized when the car is below the second landing to close back contacts BS3, its main switch is open closing back contacts AM, it is set for automatic operation with back contacts T0 closed, all the above contacts appearing in line 24, its emergency relay is energized closing contacts EM and its normal standing time and an additional dropout interval defined by relay TR2 has expired closing back contacts TR2 both at line 26, its photocell relay is not sensing a door obstruction permitting contacts PC to close at line 27 and the door opening relay has been deenergized to close back contacts OPA at line 27. In addition, to reclose the doors without further qualifying conditions, the car must be in a standby status, that is, assigned as neither a load nor a next car so that its back contacts CULA and CUNA are closed at line 27. If the car has the "next" assignment so that contacts CUNA are open, it can reclose its doors only if no first floor down hall call is registered to open back contacts S1DA at line 28. A load car having contacts CULA open can reclose its doors only if no first floor up hall call is registered to open back contacts S1UA at line 28 and if no other car is above the first floor or has its doors open at the first floor to hold back contact XCL at line 28 open. Once energized, relays CL3T and CL4 are sealed in around contacts EM and TR2 by contacts CL4 at line 27 and around contacts XCL by contacts CL4 at line 29.

Relay CL4 controls the door opening circuit with back contact CL4 at line 30 and actuates door closing through contact CL4 at line 33 in the same manner as the car starting circuits and contacts CLA at line 34. At the end of the drop out interval of relay DT, measured from the opening of limit contact 559 when the door approaches a fully closed position by virtue of the opening of back contacts CL4 at line 35, the load car doors can be reopened by an up hall call at the first landing through the opening of contacts S1UA at line 28 while the next car doors are reopened by a down hall call at the first landing through the opening of contacts S1DA at line 28. Relays S1UA and S1DA are first hall call auxiliaries, as shown on FIG. XXV at lines 397 and 398 which are energized directly by the first hall call relays through contacts S1U and S1D respectively. Closure of back contact CL4 at line 30 institutes door reopening for the car while it is at the first floor.

In order to avoid the starting of a car away from the floor when the doors reclose, auxiliary gate relay GA at line 168 is deenergized by door reclosing timer relay back contact CL3T. This timer is of the slow dropout type to insure a positive sequence of door reopening prior to conditioning the car for starting when a first floor hall call is registered. Thus, the car start circuits are opened behind contacts GA at line 174 by back contacts OP1 at line 176 of the door opening controls which open before CL3T drops out to energize GA. Even if the gate has not opened sufficiently to open limit switch 595 at the time CL3T closes the gate relays have no effect on car starting until the car doors are fully opened and relay OP1 is deenergized. The doors are started closed in the usual manner after they have been reopened.

Once the doors of a car are reclosed, motor-generator set shutdown timing is initiated by closing contacts CL4 at line 14 to energize motor-generator set shutdown timer MGT. After an interval of several minutes timer MGT opens its back contacts at line 13 so that rectifier disconnect relay RE is no longer sealed in through motor-generator run relay contacts LR. The next and load car motor-generator sets are also shutdown in this manner since their closed contacts CUN and CUL at lines 1 and 2 are behind opened back contacts CL4 at line 2. Thus, the next and load car sets are shutdown if they are inactive for the timing interval of MGT and are restarted in response to a conventional dispatch signal through contacts CUD at line 6, car button signals through contacts CBD or CB at lines 3 or 7, or by the dropping out of back contacts CL4 at line 2 for the load or next cars. In order that car buttons for floors above the lower terminal are maintained effective while a car has a "next" assignment and its doors are reclosed, contacts CL4 are closed at line 56 to by-pass the open back contacts CUN at line 55.

Door close buzzer time relay BZT is deenergized by opening back contacts CL4 at line 185 to maintain a door motor holding timer energizing path through closed back contacts BZT at line 34 and contact CL4 at line 33 when the doors are reclosed.

So long as a car of the bank has its doors reclosed, master door reclosing relay RCL at line 354 of FIG. XXIV is energized through one of the CL4 contacts for the several cars of the bank at that line. Back contacts CL4 at line 355, 356, 357 or 358 enable relay XCL to be energized if a car whose doors are open does not have a load assignment, so that its CUL back contacts are closed, and if it is in service, so that its OE contacts are closed. Back contacts CL4 at line 411, 413, 415 or 417 aid in establishing a preference in "next" assignment for a car with its motor-generator set running. Back contacts CL4 at line 450, 451, 452 or 453 of FIG. XXVII aid in indicating the condition wherein a car is present at the lower terminal with its doors open while another car is in service away from that terminal.

While the doors are reclosed, the floor hall lantern indicators are disabled by opening back contacts CL4 at line 291 of FIG. XIX.

When one or more cars have their doors reclosed, relay RCL is energized to maintain the off hours program in effect by opening back contacts RCL at line 335 of FIG. XXII and thereby preventing the energization of relay ECA. Thus, door reclosing and more basically the activity of cars at a terminal are employed as conditions effecting automatic changes in the operating program of the system. Contacts RCL are closed at line 168 of FIG. XIV to render the car starting circuits responsive to a car call as contacts CB are closed. During periods of door reclosing, it is desiable to indicate the presence of any car at the lower terminal which has its motor generator sets started as signified by closed series connected contacts CA and LSA for the car at lines 350, 351, 352 or 353, by energizing night selection relay NS through contacts RCL at line 351. Relay RCL also enables relay NSCL to be energized under appropriate conditions by closing contacts RCL at line 451 of FIG. XXVII and partially completes the circuit which maintains the load assignment on a car while it is away from the lower dispatching floor by closing contacts RCL at line 422 of FIG. XXVI.

Night service load shift relay NSCL at line 451 of FIG. XXVII is rendered effective when leads 846 and 847 are connected to direct current supplied main leads 848 and 849. When any car of the bank is available at the lower terminal so that its contacts CA at line 450, 451, 452, or 453 are closed, and it has not reclosed its doors so that its back contacts CL4 in those lines and in series with contacts CA are closed, lead 846 is activated. Lead 847 is connected to lead 849 if another car is away from the lower terminal so its back contacts MG are closed and is in service so its contacts OE in series therewith in lines 450, 451, 452 or 453 are closed. Thus, the prerequisites for energization of relay NSCL are the presence of a car at the lower terminal with its doors open, another car with its doors reclosed, and a third car operating away from the lower terminal. Under such conditions the "next" assignment is shifted from a car having its doors reclosed to the car with its doors open at the lower terminal by the opening of back contacts NSCL at lines 412, 414, 416 and 418 since the only next relay which can be energized is that of a car having its MG contacts and its CL4 contacts closed. These conditions also open the load assignment holding circuit by opening back contacts NSCL at line 425 so that the cars relinquish their load assignment when they are dispatched and a next car is given that assignment. Since the next car is that one at the lower terminal with its doors open the assignment of the load to it gives rise to no confusion.

When off hours service is instituted, at least one car is at the lower terminal and is subject to an up load assignment. Thereafter, throughout the off hours interval that car is preferred for load assignment and sustains the major service burden. Assume car D is the preferred up load car, that all of the cars are parked at the lower terminal that all of the car doors have been reclosed, and that a hall call is registered above the lower terminal. Relay SS at line 212 of FIG. XV is deenergized to release up dispatch timer holding relay DFU so that after an appropriate interval contacts J3 at line 388 are closed to energize up scheduling relay KU so that up dispatch relay CUD(D) for car D is energized. This opens back contacts CUDA(D) at line 417 but with no effect since a holding circuit is available through contacts S1U and RCL at line 422, NSCL at line 425, and DFU, OE(D) and CUL(D) at line 426 to maintain relay CUL(D) energized and the load assignment on that car. No change in "next" status can occur since closed contact CUL(D) at line 438 maintains relay DFUT energized thereby barring advancement of the "next car" to load car status, and since no "next" vacancy occurs selector RDSU is not released to close another "next" relay circuit. When car D fulfills the requirements of its initiating call and any others it may encounter, it returns to the lower terminal, still as the load car, opens and recloses its doors and awaits the next call for service.

The load status can be taken from car D under either of two conditions. If an up hall call at the lower terminal had been registered while car D was away from that terminal, back contacts S1U would have been opened momentarily and then reset by the presence of the other cars at the terminal. This would interrupt the load assignment holding circuit. A hall call which deenergized relay SS to open contacts SS at line 424 at the time the dispatch timer holding relay DFU was energized also interrupts the hold circuit. Relay DFU can be energized only after contacts J2 at line 392 have been closed by the dispatch timer; hence, a substantial interval is afforded for the load car to answer calls before this transfer occurs. Relay DFU is energized by contacts DFUA at line 392 which is energized despite the maintenance of a load assignment on car D since back contacts CULB(D) at line 391 closed as the car left the lower terminal by virtue of the opening of contacts MG(D) at line 251. Thus car D relinquishes its load assignment permitting relay DFUT to drop out so that the "next" car, assumed to be car B, is given the load assignment and dispatched on the closing of contact J3 at line 388. Another car, car C, is selected as next by operation of selector RDSU as car B is transferred to the load status hence all assignments are again completed.

As will be described with regard to the operation of the up dispatch sequence, landing signal indication relay SS is ordinarily effective to detent the dispatch timer at a point prior to the termination of the dispatch interval if no call is registered. Ordinarily, the timer is returned to the detent position if relay SS is deenergized to release the detent and is then reenergized prior to the termination of the dispatch interval. In the off hours program this return of the dispatch timer to the detent by a call cancellation is barred so that the timer times out once its detent is released. This feature is included to avoid the transfer of load status from an operating car to one at the terminal having its doors closed since a returned operating car will reopen its doors creating a condition wherein a load status car has its doors closed while standing at the terminal while another car has its doors open. This would create passenger confusion. Accordingly, once contacts SS are opened at line 424 while back contacts DFU at line 426 are open the two are maintained open until the current load car is dispatched and the up dispatch timer recycled.

This completion of the dispatch of a load car which was actuated by an interruption of the holding circuit for the load status of the last car to leave the terminal is necessary only during the off hours program; accordingly, it is instituted by opening back contacts H4A at line 210. When the up dispatch timer energizes relay J2 to enable relay DFU, it opens back contacts J2 at line 212 in the energizing circuit of relay SS so that the only remaining energizing path is through front contacts SS at line 211. Accordingly, after contact J2 is opened, any momentary opening of contact SS opens the energizing circuit for SS such that it cannot be reestablished by the elimination of hall calls unless contact J2 is reclosed. Thus, once back contacts DFU are opened at line 426 the timing cycle is completed since relay SS is held deenergized to cause the timer to complete its cycle and dispatch the current load car.

When car D returns to the lower terminal the "next" assignment is transferred to it from car C if car C has its motor-generator set shutdown. The return of car D energizes relay CA(D) to activate lead 846 through closed contacts CA(D) and CL4(D) at line 453. Since car B is away from the terminal its contacts MG(B) and OE(B) are closed at line 451 to energize lead 847. Cars A and C have their doors reclosed so that contacts RCL are closed at line 451. Hence relay NSCL is energized to open its back contacts at line 416. Since car C has its doors reclosed, contacts CL4(C) at line 415 are open and the holding circuit for relay CUN(C) is opened. This permits selector RDSU to hunt for a suitable car; however, all cars with their MG contacts closed but car D have their CUN circuits open at open parallel contacts CL4 and NSCL. Since car D has not reclosed its doors contact CL4(D) at line 417 is closed and relay CUN(D) is energized when contacts RDSU-4 are closed to stop RDSU.

When relay NSCL is energized, it releases the "load" holding circuit for car B so that relay CUL(B) dropped out. After a short delay relays BSTA(D) and DFUT are dropped out to close their back contacts at lines 426 and 422. By the time those contacts are closed the transfer of "next" selection from car C to car D is completed so that car D is given the load assignment by actuation of relay CUL(D) through contacts CUN(D). Back contacts CULA(D) at line 417 are opened to deenergize relay CUN(D), CA(D), and NSCL and thus the selector RDSU is activated. Car A then can be selected as next.

The door of an open load car is held open at the lower terminal by means of relay XCL until all other cars return and reclose their doors. Relay XCL is energized to indicate that other cars are in service which are not up load cars and that those cars have not had their doors reclosed. In the case of car B contacts OE(B), CUL(B), and CL4(B) at line 356 are all closed to energize relay XCL until it returns to the terminal and its doors are reclosed opening contacts CL4(B). While relay XCL is energized, the door reclosing circuit of the load car, car D, cannot be completed since back contacts XCL at line 28 of FIG. VIII are open as are contacts CL4 at line 29 and back contacts CULA at line 27, both in parallel therewith. When XCL drops out, the reclosing circuit for the load car is completed through back contacts XCL at line 28.

Under all circumstances, the return of any car to the first terminal while another is in service at a point other than the terminal removes the cars having reclosed doors from next and load status and assigns the returned car to load status.

In the event that one of the standby cars has its motor-generator set running and its doors reclosed the system will exercise a preference in the selection of that car when it is permitted to select from cars with their doors reclosed. Assume that no car is at the terminal with its doors open or that no car is in service away from the terminal so that relay NSCL is deenergized to enable a next selection through the NSCL back contacts around the open back contacts CL4 at lines 411 through 418. This preference is effected by operation of night selection relay NS which is energized if a car available at the lower terminal has its motor-generator set started and any other car has its doors reclosed. Thus, contacts CA and LSA for a car are closed at line 350, 351, 352 or 353 as are contacts RCL at line 351 to energize night selection relay and open its back contacts NS at lines 412, 414, 416 and 418. A car with its motor-generator set running maintains its capacity for selection through its closed acceleration time relay contacts AT paralleling open contacts NS at line 411, 413, 415 or 417 since relay AT for each car is energized at line 186 of FIG. XIV if its relay RE at line 13 is energized to apply direct current to the circuit of FIG. XIV and its relay AMR is deenergized. The selected car is advanced to load status in the regular sequence and another car selected as next. When this selected car attains the load status, the load status hold circuit is sealed in if relay NSCL remains deenergized. Since the selected car did not have its doors open, relay XCL is not energized. Further when a car does return to the lower terminal it energizes both NSCL and XCL to remove the other cars from the load and next status, to place itself in the load status, and to maintain its doors open until all other cars have reclosed their doors.

If three or more cars are in service, the return of the third or later cars have no effect on "next" or "load" assignment of the first and second returned cars and when the doors of those later cars are closed, they are placed in the standby status to be selected only if the next car is advanced to a load status.

The next up car, that car having its CUN relay energized, serves hall calls for basement service. A first down hall call energizes S1DA at line 398 to open the energizing circuits for door reclosing at back contact S1DA of line 28 so that the car having its CUNA back contact at line 27 open drops out its CL4 and CL3T relays. The door of the next car then opens as described by energizing relay OPS through back contact CL4 at line 30. The delayed dropout of CL3T enables the doors to initiate their opening cycle prior to the energization of the starting circuits. Relay S1D energizes relay SBU to energize relay BU and thus relay BS for the next up car as described for conventional basement service. In turn relay BS1 is energized to reset the car for down travel through closed contacts BS1 at line 194 and contacts T0 and TR2 at line 195 by energizing lower coil RL and thus relays DL and DL1 at lines 140 and 141. Contacts DL1 and BS1 are thereby closed in the car start circuit at line 177 to cause the car doors to reclose through contacts CLA at line 34 and the car to travel downward.

A basement hall call operates a similar sequence by causing the operation of relay SBU to energize DL1 and BS1 for the next up car and cause it to travel to the basement. However, door reclosing is not canceled prior to the start of the car under these circumstances and the car doors open only upon its arrival at the basement landing. In the same manner a basement car call will energize DL1 and BS1 to cause any car in which it is registered to travel downward.

If all motor-generator sets are shutdown during off hours service the load car set is restarted upon the closure of contact CUD at line 6. However, no dispatch is given a next up car to send it to the basement and therefore a supplementary means of starting its set must be provided. This means is actuated by the deenergization of its CL4 relay which closes back contacts at line 2 to enable a start circuit through closed contacts CUN and J0 at line 1. Deenergization of relay CL4 is accomplished directly upon the registration of a first down hall call through the opening of S1DA. An up basement hall call operates BS for the up next car and pulls in its CBD relay to close a motor-generator set start circuit at line 3 of FIG. VII. Again the car will start without opening its doors since its DL1 and BS1 contacts at line 177 are closed. When the set is started power is applied to the circuits of FIG. XIV to energize relay EM through contacts LR, the safety switches, and closed contacts RH1 and PC. The car is started without reopening its doors since CL4 is not dropped out by a basement hall call and back contacts CL4 at line 30 in the door reopening circuits are held open. The balance of the starting circuits are as previously described.

The principal circuits involved in establishing dispatching intervals at the top and bottom dispatch terminals are shown in FIGS. XXVIII and XXIX. They can be segregated into four subcircuits each fed from an alternating current source over leads 850 and 851. The uppermost circuit 853 of FIG. XXVIII integrates the proportion of the time each car is stopped to establish what will be termed an integrated stopping time for cars. This circuit functions much in the manner of the circuits of FIG. XX except that it measures stop time for both directions of travel. The lower circuit 854 of FIG. XXVIII measures the number of cars subject to dispatching. Circuits 855 and 856 of FIG. XXIX establish the intervals utilized in dispatching the cars at the upper and lower terminals and are dependent upon circuits 853 and 854 to establish and to alter the rate at which those intervals expire.

Circuit 853 establishes a signal which represents the proportion of the time that cars in the system are stopped at landings intermediate the dispatching terminals. The level of elevator utilization is related to the stopping time since that time is a function of the number of stops as well as the length of individual stops in a system having the standing time control described above. Thus, a single passenger entering or leaving an uncrowded car makes his passage between the car and landing more rapidly than when the car is crowded, and a plurality of passengers will require a proportionally greater interval to transfer between the car and landing. Since the door closing operation is timed from the last passage through the doorway, a low level of traffic will expend a lower proportion of the time stopping at floors than a high level of traffic. The significant timing range for stops can be chosen to best suit the needs of the utilization. As illustrated, a system having upper and lower dispatching terminals wherein service to floors beyond those terminals is required only occasionally need not monitor stops at the terminals, such stops being controlled primarily by the dispatching circuits rather than by car utilization, or stops at landings beyond the terminals. The illustrated system is arranged to monitor only stops at floors intermediate the dispatching terminals as defined during the interval the contacts MGF for the individual cars are closed. It is to be recognized that it is within the scope of this concept to monitor other stops than those intermediate the terminals or to selectively introduce other stops as effective in this control under certain conditions, as by monitoring stops at a terminal under an operating program wherein timed dispatching is not utilized at that terminal.

Stopping time ratio relays R1, R2, R3 and R4 are successively energized as the integrated stopping time increases. At very low levels of stopping time none of the relays are energized. At the first effective level, relay R1 is energized then R2 and so on. Relays R1, R2, R3, R4 are connected in series in a cathode follower circuit of triode connected pentode 857. This pentode is supplied with filament heater current from secondary 858 of transformer 859 while its plate potential is furnished by secondary 860 through rectifier 862 and smoothing condenser 863. Integrated stopping time of the several cars in the bank is represented as a charge on condenser 864 connected in series with a parallel rectifier 865 and resistor 866 across resistor 867 forming a portion of a voltage divider connected across the plate supply.

The variable portion of the voltage divider comprises four resistors 868(A), 868(B), 868(C) and 868(D), conveniently of equal value where equal weight is to be given to the stops made by each of the four cars. These resistors are selectively connected in series with resistor 867 and the circuit connected across it during the stopping interval of the respective cars. When no cars are stopped, no potential is applied to lead 869 by the plate supply. Stopping of a single car connects lead 869 to the plate supply through a single resistor 868 to impose a potential on lead 869 which is a function of the relative magnitudes of resistors 867 and 868 and the charge on condenser 864. Two or more coincident car stops further increase the potential on lead 869 by further reducing the resistance between it and the positive or plate side of the plate supply.

The terminal of condenser 864 which is connected to lead 869 through rectifier 865 and resistor 866 is connected through lead 870 to control electrode 872 of pentode 857. Rectifier 865 offers a low resistance charging circuit for condenser 864 so that the condenser tends to develop the same potential across it terminals as is developed across resistor 867 at a rate which is a function of the resistance of the parallel forward resistance of rectifier 865 and resistor 866 and the capacitance of condenser 864. As potential on control grid 872 becomes more positive with respect to cathode 873 the current between cathode 873 and anode 874 increases. This increase for a given state in the system follows the exponential charging characteristic of condenser 864 to approach an asymptote. However, the system rarely maintains a given state for any appreciable interval since each car may be stopped over variable intervals separated by variable running intervals. Thus, during the stop of a given car one portion may coincide with a stopping interval by one other car and another portion by two or more other cars while they may also be intervals when no cars are stopped. Accordingly, when the system is subjected to substantial activity the potential on lead 869 is continuously varying toward one of five stable levels in a four car control.

The potential on lead 896 can also drop below that on lead 870 as at an instant when no cars are stopped following an interval during which condenser 864 has acquired a charge. The discharge rate of a condenser in a loop including resistance is a function of the magnitude of the capacitance and resistance, is generally exponential, and approaches an asymptote. Since rectifier 865 is poled in the charging direction it is essentially an open circuit so that essentially the full resistance of resistor 866 is effective to cause the potential on lead 870 to diminish at a lower rate than it was developed. The potential on lead 870 is thereby weighted to be maintained and is a function of the proportion of the time cars are stopped to closed their MGF contacts.

This integrated proportioning of stopping time when initially below a first level has no effect on relays R1, R2, R3 and R4. When it attains the first level it energizes relay R1 to pull in its contacts R1 at line 404 of FIG. XXV and energize relay DS1. Contacts R1 are held in until the anode-cathode current in pentode 857 declines to a predetermined level below that required to close the contacts. Similarly, relay R2 has a pull in level greater than that for relay R1 and will drop out prior to the drop out of R1 so that it is pulled in only while relay R1 is pulled in. Relays R3 and R4 operate in a corresponding sequence. Their circuits are modified by shunting resistors 875, 876 and 877 to enable them to pull in and drop out in the same range of currents as for relays R2 and R1. Thus a portion of the anode-cathode current through relays R2 and R1 is shunted around relay R3 by resistor 875 so that while relay R3 may pull in with the same current in its coil as that which pulls in relay R1, the shunting of a portion of the anode-cathode current greater than that which pulls in relay R2 requires a higher current to pull in relay R3. Relay R4 is energized by a still greater anode-cathode current yet is maintained in the same range of pull in current adjustment by shunting resistor 876.

When the number and/or length of stops increases the stopping time in the system to a level energizing relay R4, it closes its contacts at line 401 to energize relay DS4 at line 401 of FIG. XXV to close its contacts at line 471 and insert resistor 877 in parallel with relays R3 and R4. This further reduces the proportion of the anode-cathode current flowing through these relays so that relay R4 will drop out when the anode-cathode current is reduced to a lesser degree than would be required in the absence of the shunting path through resistor 877.

Relays R1, R2, R3 and R4 can be considered to signify the intensity with which the cars are being utilized. When they are used at high intensity a round trip consumes more time since there are more delays due to the greater amount of stopped time. In dispatching, it is desirable to maintain the cars spaced in time so that cars depart from the dispatching terminal at regular intervals. Thus, in a four car system, ideally a car is dispatched from a terminal one quarter of a round trip interval after the dispatch of the preceding car. As the round trip interval increases the dispatch interval must increase if the cars are to be maintained in an even distribution. Similarly, as the number of cars in the dispatching sequence declines the dispatching interval should be extended so that with three cars it should be one-third of a round trip interval and with two cars one-half of an interval. The energization of relays DS1, DS2, DS3 and DS4 in FIG. XXV by relays R1, R2, R3 and R4, respectively, is employed to effect changes in the dispatch interval in accordance with increases in stopping time. Relays OE3 and OE4 change the interval as the number of cars available for dispatching changes.

Dispatched round trips are between the dispatching terminals in the present system. That is, they involve dispatching a car from a lower terminal upward and dispatching it downward from the upper terminal. While the car is serving the basement it is not available to function on these round trips and therefore should not be considered to be subject to dispatching or available to the dispatching sequence. Circuit 854 is responsive to the number of cars available to the dispatching sequence. It corresponds in opertion to the counting circuits at lines 359 to 366 of FIG. XXIV in that it includes a plurality of parallel resistors 878 which are selectively connected to a common circuit to alter the current level in relays in the common circuit. When three resistors 878 are connected in parallel, the current through rectifier 879 to lead 880 and from 880 through relay coils OE3 and OE4 to lead 851 is sufficient to pull in relay OE3 but insufficient to pull in relay OE4. When four resistors 878 are paralleled both relays OE3 and OE4 are pulled in yet when a resistor is disconnected relay OE4 drops out and when two are disconnected relays OE3 and OE4 are both dropped out.

In order to connect a resistor 878, the car must have its individual service relay OE energized to close contacts OE at line 475, 477, 479 or 481, and must not be assigned to basement service. Basement service can occur only while car position relay BS3 is deenergized; hence if the car is above the position for energizing BS3 contacts BS3 and back contacts BR are closed at line 475, 477, 479 or 481. If a car is below the second landing so that BS3 is deenergized, its circuit is completed around contacts BS3 by back contacts BS2 at line 476, 478, 480 or 482 unless the car is assigned for basement service. When assigned for basement service back contacts BS2 are open since the car will not participate in the dispatching functions until it is released from its basement assignment.

Basement assignment release can take place when the car is reset for up travel at the basement; however, an up traveling car which stops at the first terminal does not enter into dispatching. Accordingly, basement run relay back contacts BR are opened under these conditions until BS3 is energized to bar the connection of resistors 878 and during that interval omit the car from the summation by relays OE3 and OE4 of cars available for dispatching. It is to be appreciated that the number of cars and counting relays can be adjusted to best meet the needs of the system.

Top terminal dispatch timer circuit 855 includes a series connection of down dispatch relays K1, K2 and K3 connected in parallel with relay K0 in a cathode follower circuit of pentode 882. Pentode 882 is supplied in the same manner as pentode 857 from a transformer 883 developing a positive plate voltage on lead 884 and a negative voltage on lead 885. Relays K1, K2 and K3 are energized in succession by an increase of anode-cathode current as a function of the potential on lead 886 connected to control grid 887. The expiration of critical intervals in the dispatching operation is defined by the pulling in of relays K1, K2 and K3 and generally is determined by the charging rate of capacitance between leads 885 and 886.

A charging circuit corresponding in some respects to that in circuit 853 is employed in circuit 855. It basically comprises a voltage divider connected across the plate supply for pentode 882 and having on the side which is positive with respect to lead 886 a series of resistors 888 through 894 which can be connected in parallel with resistor 896 and on the side negative with respect to lead 886 resistor 897 which can be connected in parallel with resistor 898 and/or resistor 899.

Four operating points are critical in circuit 855. The point of initiation of the timing, where the capacitance between leads 885 and 886 is essentially discharged, and the pull-in points for relays K1, K2 and K3. On the issuance of a down dispatch signal, down scheduling relay KD is energized to close its contacts at line 495 and opens its back contacts at line 485. This removes the plate supply from across the voltage divider of circuit 855 and connects low resistance resistor 898 between leads 885 and 886 to enable the capacitance thereacross to discharge rapidly and reduce the potential on lead 886 to that on 885. After the car is given a down dispatch signal, the top terminal scheduling relay KD is dropped out, reconnecting the plate supply across the voltage divider and eliminating the low resistance discharge circuit. Thus each time a car is given a dispatch signal the charging voltage is removed and the capacitance is discharged to initiate a new timing cycle.

Once the dispatching relay CDD establishes its holding circuit and KD is reset the new timing cycle initiates the build up of charge between leads 885 and 886 and thus the grid-cathode potential of pentode 882. In the absence of a malfunction of the door close and car start circuits the doors of the car begin to close at the instant the dispatch signal is generated unless there is an obstruction in the door path. Ordinarily the door path is clear and the door closes in about three seconds. The car then starts downward and as it passes a point below the top landing and above the next lower landing it actuates relay BDR. This response tn a dispatch signal or car departure as signified by BDR resets the dispatch timer in the same manner as did schedule relay KD by momentarily opening back contacts BDR at line 485 to disconnect the potential source and closing contacts BDR at line 494 to connect resisatnce 898 between leads 885 and 886.

Thus, ordinarily the dispatch interval is initiated by a dispatch signal and then reinitiated by the response of the car to that signal to define the following interval from that response. By proper selection of parameters in the timer circuits the extra interval introduced by this resetting operation can be taken into account in defining the interval between dispatch signals. Additional refinements might also be introduced to correct the timed interval for extraordinary delays as where a passenger holds the door when the car attempts to start.

In the event that the car which has been given a dispatch signal does not respond thereto within a dispatch interval, the dispatch timer times out from that signal interval and issues a second signal to the car currently on load status so that it can start. When a second car starts on this condition, the timer is reset and reverts to its normal cycle issuing dispatch signals in regular order. Throughout all subsequent operations the delayed car maintains its dispatch signal so that it starts when cleared and resets the timer as it starts.

The number of cars in service alter the time constants of the charging circuits by altering the capacitance between leads 885 and 886 whereby a greater time interval is provided for a given level of integrated stop time when three cars are available for dispatching than when four cars are available, and a still longer interval is defined when only two cars are available. This change is effected by back contacts OE3 and OE4 at lines 494 and 495 for down dispatch timer 855. A capacitor 900 is connected directly between leads 885 and 886 across resistor 897 to provide a minimum capacitance and thus a minimum interval to raise the cathode-grid potential to the several threshold values of K1, K2 and K3 for a given stop time. These intervals can be extended by the addition of capacitance in parallel with capacitor 900.

When only three cars are in service relay OE4 drops out, as shown in FIG. XXVIII. This closes back contacts OE4 at line 495 to connect capacitor 902 in parallel with capacitor 900. If it is desired to alter the interval from one quarter of a value established by stop time to one third of that value, the proportion can be established by changing the capacitance from, for example, 4 microfarads to 5.5 microfarads or by adding 1.5 microfarads. Similarly, when only two cars are available for dispatching, relay OE3 also drops out to close back contacts OE3 at line 494 and place capacitor 903 in parallel with capacitors 900 and 902. The proportion desired under these conditions might be ½ of a value instead of ¼. Therefore, the capacitance should be altered from 4 to 8 microfarads and the capacitor 903 should be 2.5 microfarads (4+1.5+2.5=8).

The conditions established by both stop time and number of cars available for dispatching is continuously monitored by this system and the current rate at which the dispatch intervals are running at any instant is a function of these two variables in the present system.

In conventional operation the stop time integrating control determines the charging potential for the capacitance across leads 885 and 886 so that for a level of traffic insufficient to energize relay DS1, resistors 888, 889, 890 and 891 are shunted by back contacts DS1 at line 489 and a relatively high voltage is imposed across the capacitance to develop a charge relatively rayidly. Successively lower rates of charging are realized by inserting additional resistors between leads 884 and 886 as the amount of stopping time increases so that resistor 891 is added as relay DS1 is energized, resistor 890 is added with 891 when back contacts DS2 open at line 488, etc. This charging rate thus fluctuates as the stopping time changes to maintain a continuous correlation of rate of expiration of the dispatching interval therewith.

As the charge builds up on the capacitance between leads 885 and 886 the potential of control grid 887 is increased sufficiently with respect to cathode 904 that the anode-cathode current rises to the pull-in value of relay K1 to open its back contacts at lines 491 and 494. The functions of contacts K1 will be discussed below. An additional increase in anode-cathode current as charging progresses pulls in relay K2 to close contacts K2 at line 383 of FIG. XXV enabling the dispatch timer holding relays DFD and DFDA to be energized under appropriate conditions, and to close contacts K2 at line 487 to shunt stop time controlled resistors 888 to 892 and increase the proportion of the voltage on resistor 897 to a level above the maximum capable of application by the stop time controls. This is intended to establish a fixed charging level during the final interval between the energization of relay K2 and the energization of final dispatch time relay K3. Operation of relay K2 can be viewed as the equivalent of setting a timer a fixed interval from the instant the dispatch signal is issued.

If no car is available for down load assignment at the top terminal during the final interval defined by the energization of relays K2 and K3, relay DFDA is energized as described to close its contact DFDA at line 493, thereby establishing a different potential on lead 886 and shunting resistor 897 with resistor 899. This potential is somewhat below that which can establish an anode-cathode current which pulls in relay K3. Thus relay K3 is held out, at least until a load car is available, and can pull in only upon the expiration of a predetermined interval after a load car becomes available and the voltage on lead 886 is raised by the opening of contacts DFDA to disconnect resistors 896 and 899. The connection of resistors 896 and 899 can be considered the institution of a detent corresponding to that employed in some motor driven timers of the prior art wherein the timer is held at some intermediate point in the dispatch timing cycle. They predominate over the resistors 893, 894, and 897 in this regard since they are of an order of magnitude lower resistance and therefore essentially eliminate or greatly reduce the time constants for charging capacitors 900, 902 and 903. In one embodiment resistors 893, 894 and 897 were 2.4, 3.9 and 14.1 megaohms while resistors 896 and 899 were 470 and 195 kiloohms.

In a regular timing cycle relays K1 and K2 operate during the latter portion of a dispatch interval such that for an interval requiring forty seconds to operate K3, K1 is pulled in about 30 seconds after its initiation and K2 is pulled in about 4 seconds later. As described above, under moderate traffic conditions it is desirable to abbreviate the dispatching interval at the top terminal when two cars are present at that terminal. Under the off peak program these conditions cause relay K4 at line 342 of FIG. XXII to be energized, closing its contacts at line 489. If this condition occurs during the early portion of the timer interval, prior to the pull in of relay K1, a circuit is completed at line 494 through back contacts K1 and contacts K4 to increase the potential on lead 886 toward the detent point by connecting resistors 896 and 899 across the respective sections of the voltage divider. As the detent potential is approached on lead 886, the anode-cathode current in pentode 882 reaches the pull-in level for relay K1 thereby removing the detent and permitting the condenser to complete its charge cycle energizing relays K2 and K3. Essentially all of the plate supply potential is imposed during charging by virtue of the closing of contacts K4 at line 489 to shunt all but resistors 893 and 894 in the path from lead 884 to lead 886 to complete in a minimum interval the charging to the level pulling in relay K3. Thus, the car is sent away after an abbreviated dispatch interval under this sequence by rapidly advancing the interval to a point and causing the timer to run at a fast rate from that point.

The ultimate level of grid voltage established by the connection of the grid to resistors 896 and 899 causes an anode-cathode current to flow which is sufficient to maintain all the armatures of relays K1, K2 and K3 pulled in if they have been closed. However, if the current has not attained the pull-in threshold prior to the connection of resistors 896 and 899 that threshold cannot be attained for relays K2 and K3 during their connection. This limited condenser charge affords an additional timing interval for certain functions and maintains the grid voltage for pentode 882 at a level which limits or prevents the flow of tube current thereby extending tube life. The reduction of tube current is significant when the elevator system is dormant and timer recycling dispatch signals are issued only rarely.

When no car is available for assignment to the load status relay DFDA is energized through its closed series of CDLA contacts at line 380 of FIG. XXV upon the pull in of relay K2 to close its contact at line 383. Closure of contacts DFDA at line 493 detents the dispatch timer as described so that relays K1 and K2 are energized but a further interval remains to run from the release of the detent before relay K3 is energized. When a car is assigned its load status, contacts DFDA are opened and the dispatch interval times out to energize K3.

A dispatching system encounters conditions wherein cars are available for dispatching yet there is no demand for their service. Under these circumstances the dispatcher in a system operating "on call" prevents the release of the load car. The present timer, when applied to an on call system, is permitted to time out, thereby raising its grid potential to the pull-in threshold for relay K3. However, since the load car is not released by a call the down scheduling relay at line 387 of FIG. XXV is maintained deenergized despite the closure of contacts K3 by open back contacts DFD of the down dispatch timer detenting relay. Down dispatch timer recycling requires the energization of scheduling relay KD to open contacts KD at line 485. Hence, in the absence of some provision to alleviate the condition, the timer grid potential rises to some value above the pull-in threshold for relay K3 and is maintained at that value throughout the detent interval. The life of the pentode 882 would be shortened by the flow of excessive grid current under these circumstances. Accordingly, the grid potential is reduced to the detent level when relay K3 is pulled-in and the down dispatch detenting relay is energized by connection of lead 886 to the voltage divider resistors 896 and 899 through the closing of contacts K3 and DFD at line 492. Since this detent level is attained after relay K3 is pulled in, that relay is held in by the level of anode-cathode current sustained at the detent point so that the load car is released by relay KD and the timer reset to its initiation point upon the drop out of down dispatch detent relay DFD.

Relay K0 prevents the lock up of the system in the event of a failure of the down dispatch timer, as by an open heater circuit or a decline in cathode efficiency. This relay is maintained energized while the down dispatch timer is operative to hold open its back contact K0 at line 170 of FIG. XIV so that the car starting circuits are opened while the car is at the top terminal by the opening of contacts MG1 and so that starting from that terminal is under the control of the car's down dispatch relay CDD having its contacts at line 175. It is arranged to carry the major portion of the anode-cathode current of pentode 882 at the minimum current levels for the tube by paralleling the relays K1, K2 and K3 and limiting resistor 905 with a relatively low resistance circuit comprising actuating coil K0, limiting resistor 906, and back contact K1, so that enough current flows through its coil to pull it in even at this level. As the anode-cathode current is increased the current in relay K0 is limited by the energization of relay K1 which opens its back contact at line 491 to place resistor 907 in series with resistor 906 and the coil. Again the minimum current with resistor 906 in circuit is sufficient to hold in relay K0 so that its back contact remains open. Upon failure of the timer, relay K0 drops out to close its back contact at line 170 and enable cars to start from the top terminal after expiration of the timing cycle effective for stops at floors intermediate the dispatching terminals.

Dispatch timing of cars for travel upward from the lower terminal is effected in a circuit 856 corresponding to the top dispatch timer. Thus, it utilizes three bottom dispatch timer relays J1, J2, and J3 and a bottom dispatch timer failure relay J0 all of which are in the cathode follower circuit of a pentode 908 whose anode cathode current increases with time as the capacitance comprising capacitors 909, 910 and 912 connected to its control grid 913 is charged to raise the potential of the grid with respect to cathode 911. Relay J0 is energized while the bottom dispatch timer is operative to open back contacts J0 at line 170 and render relay MG effective to place the car starting circuits under control of the up dispatch relay CUD through contacts STT at line 172 when the car is at the lower terminal.

Bottom dispatch timer circuit 856 is rendered ineffective on the down peak program by opening back contacts H3A at line 496 to disconnect the timing condenser charging circuit. When that charging circuit is energized, it functions much as its counterpart in top dispatch timer circuit 855 in utilizing the stop time actuated relays DS1, DS2, DS3 and DS4 to successively increase the up dispatch interval. The second bottom dispatch timer relay J2 when pulled in establishes a fixed, higher charging voltage than was previously available by closing contacts J2 at line 498 as well as activating the up dispatcher detent relay circuits by closing its contacts J2 at line 392 of FIG. XXV. The absence of a load car at the lower terminal energizes relay DFUA to hold the charging potential below the threshold for pull in of relay J3 by closing contacts DFUA at line 505 to connect the junction of voltage divider resistors 914 and 915 to lead 916 and grid 913 and establish a limit on the grid potential which limits or avoids appreciable grid current while holding in relays J2 and J1 and preventing the development of the pull in potential for relay J3. Thus the timer runs for a fixed interval as determined by closed contact J2 at line 498 from the assignment of a load car by opening contacts DFUA to release grid 913 and condensers 909, 910 and 912 from the limitations of resistors 914 and 915.

If a load car is present yet there is no call to which it can respond, timing is permitted to proceed to the pull in of relay J3. Relay DFU is energized at line 392 under these conditions to close its contacts at line 503 so that the closure of contacts J3 in series therewith reduces the grid potential to the detent level by connecting resistors 914 and 915 to condensers 909, 910 and 912. This level will sustain relay J3 once it has been pulled in yet is low enough to avoid drawing excessive tube current. Thus, the registration of a demand for service by the load car, in dropping out relay DFU enables up scheduling relay KU to be energized immediately through contacts J3 and DFU at line 388.

The bottom dispatch timer is reset to its initial condition by the opening of contacts KU at line 496 and the closure of contacts KU at 505 and is reset a second time as the dispatched car travels upward from the bottom terminal and energizes relay BUR to close its contacts at line 505 and open its back contacts at line 496.

Dispatching from the lower terminal is expedited when a load car receives a certain portion of its full load, e.g. 80%, as determined, for example, by a weighing device which energizes full load dispatch relay FLD at line 268 of FIG. XVII. When this relay is energized, the bottom dispatch timer is accelerated to define a shortened dispatch interval of fixed length by closing contacts FLD at lines 499 and 504. If this occurs before the pick up of relay J1, the potential is advanced to the detent position expeditiously by completing a circuit from resistors 914 and 915 through contacts J1 and FLD at line 504. After relay J1 pulls in, an additional fixed interval is required to raise the potential on lead 916 to the threshold for relay J3. This interval is established by the charging rate introduced by closing contact FLD at line 499 since that contact imposes a major proportion of the plate supply voltage across condensers 909, 910 and 912. Once relay J3 is energized, relay KU releases the load car for travel upward.

Full load dispatch relay FLD also will be energized to shorten the bottom dispatch time interval in the above manner if the traffic in the system attains a moderate level in the down direction of travel as indicated by the energization of relay MD at line 309 of FIG. XX to close its contacts at line 266, and if two cars have accumulated at the lower terminal to energize relay BU2 at line 364 and close its contacts at line 266.

The bottom dispatch timer 856 differs from top dispatch timer 855 in that it is arranged to reset the final portion of the dispatch interval from the pick up of relay J2 to the pick up of relay J3 when a car is taken out of the load status and sent to the basement. In this manner that portion of the interval is applied to a substituted load car to apprise prospective passengers by suitable indicators that the new load car is the next to leave the terminal and to enable those passengers to board that car conveniently. As described, a car can be sent to the basement when at the bottom terminal at any time up to the instant its dispatch relay CUD is energized. If the car is the load car, its up load relay CUL is dropped out when its basement service relay contacts BS2 at line 411, 413, 415 or 417 are opened to initiate the drop out interval of relay DFUT so that after the expiration of that interval contact DFUT at line 502 opens. During the interval DFUT is closed, relay DFUA is energized since a new load status cannot be assigned until DFUT drops out. Closed contacts DFUA at line 504 and contacts DFUT at line 502 by-pass relay J3 and drop it out while closure of contacts DFUA at line 505 reduces the potential on grid 913 to the detent point. The opening of contact DFUT at line 502 renders relay J3 subject to the anode-cathode current of pentode 908 once again and enables a new load car assignment which opens contacts DFUA at line 505 so that a new final portion of the dispatch interval is instituted. Upon the expiration of this portion of the interval relay J3 pulls in to institute the dispatch of the new car.

Exemplary starter panel indicators are shown in FIG. XXX. They can comprise lamps bearing suitable indicia and selectively actuated by contacts of relays in the circuits whose conditions are to be indicated. Lamps 917, 918 and 919 are hall call indicators for first floor up, first floor down and basement hall calls as respectively illuminated by contacts S1U, S1D and SBU. Lamps 920 and 922 respectively indicate that the top and bottom dispatchers are detented and are illuminated by the closure of contacts DFU and DFD at lines 512 and 513. Lamp 920 signifies an excessive delay in the departure of a car from a dispatching terminal after a dispatch signal has been given the car by being illuminated intermittently. Flasher 923 is operated in response to this delay or dispatch failure, by virtue of its insertion across the line through the closure of dispatch failure relay contacts FD and the opening of back contacts FD all in line 511.

When the system is operating on automatic program control, the program which is in effect is indicated at the starter's panel by lamps 924, 925, 926 and 927 which are illuminated for the up peak, off peak, down peak and off hours programs respectively by the closure of respective program selection relay contacts PS1A, PS2A, PS3A and PS4A at lines 514, 515, 516 and 517. Similarly, the current integrated stop time is indicated by the illumination of one of lamps 928, 929, 930 and 931. Lamp 931 indicates that the stop time is above the first level and below the second level when it is illuminated by the closure of contacts DS1 at line 521. Lamp 930 is illuminated and lamp 931 extinguished when service demand as represented by stop time is between the second and third levels by closing contacts DS2 at line 520 and opening back contacts DS2 at line 521. Lamp 929 is lighted and lamp 930 extinguisher for the range between the third and fourth levels, and lamp 928 is lighted and the other lamps of the group extinguished above the fourth level in a similar fashion.

The failure of a car to start from a dispatching floor has no adverse effect on the remaining cars in the bank since the system cannot be locked up by a stalled car.

Further a car stalled at a terminal after receiving a dispatch signal retains that signal so that it is placed in service as soon as the blockage is removed.

However, electronic timers can fail by a gradual decay to which the timer failure circuits might be insensitive so that J0 or K0 would remain energized although the anode-cathode current would not attain a level sufficient to pull in relay J3 or K3. In order to avoid this contingency a dispatch failure timer is provided to start all cars at the terminal which have their motor-generator sets running, to insure the start of the set of at least one car if no available car has its set running, and to start the set of a second car in the event the first car does not cancel the calls instrumental in actuating failure indication. Thus the failure detected by these circuits is in effect a failure to cancel a call registered for a predetermined interval.

Timing to determine if a dispatched car fails to start in a predetermined interval is also afforded. When the doors of an in-service car are partially opened, door operator slowdown relay OPS is energized and contacts OE and OPS are closed at line 255 of FIG. XVII for that car to energize relay OPC common to all cars. Relay OPS and thus relay OPC is not energized while the door is fully open or is being closed. Back contacts OPC at line 250 when open prevent dispatch failure timer FTD from being energized. When a car is at any floor with its doors opened or fully closed, timer FTD is energized if a hall call is registered to close back contacts SS at line 250 and the down peak program is not in effect so that back contacts H3A at line 250 are closed. Timer FTD is also energized if the doors are fully opened or closed, the car is in service so that contacts OEA at line 252 are closed, and a car call is registered to close either of contacts CBA or CBD in lines 251 and 252. The instant timer FTD is energized it begins its timing cycle which is interrupted if the car door is opened since relay OPC is energized to open its back contact, or if the condition instituting its energization is terminated.

When relay FTD is continuously energized for an interval sufficient to time it out, it causes its contact arm 935 at line 345 to shift from terminal 936 to terminal 937. Dispatch failure relay FD is thereby energized to close its holding circuit through contacts FD at line 343. A dispatch failure is indicated at the master control panel immediately by closing contacts FD at line 511 to energize the illuminating circuit for lamp 920. Dispatch failure is distinguished from an up timer detent by causing lamp 920 to flash since back contacts FD at line 511 are opened to energize the lamp through the flasher in parallel therewith at line 512. Relay FD starts all cars at either terminal having their motor-generator sets running by opening its back contacts at line 213 for each car position brush 653 in the floor selector circuits of the several cars. This deenergized MG1 for cars at the top terminal and MG for cars at the bottom terminal to close back contacts MG1 or MG at line 169 in the car starting circuits. All cars thereby start away from their terminals if their motor-generator sets are running.

Cars having their motor-generators sets shutdown will be started by the closure of contacts FD at line 4 provided its dispatch failure start circuit is conditioned for response by the closure of switch 938. In practice one car has its switch 938 closed so that a dispatch failure under conditions of limited operation causes only one car to be started to respond to the unanswered call.

If the unanswered call is not answered for a substantial interval after the energization of relay FD and the closure of contacts FD at line 343, a second dispatch failure timer FTDA at line 343 times out to close a motor generator start circuit in a second car through contacts FTDA at line 5. On the assumption that this condition would most likely arise under limited service, the start circuit including contacts FTDA is usually conditioned for operation in only one car by closing its switch 939. This circuit is energized only after a sufficient interval expires for a car to make at least a complete trip in one direction from a terminal so that a top landing call might be answered by the first car at the bottom landing to be made responsive to it by the dispatch failure.

Upon the cancellation of a call, as by response of a car thereto, the dispatch failure timer is deenergized since the circuit holding timer FTD is broken by opening back contacts SS at line 250 or front contact CBA or CBD at lines 251 and 252. Contact arm 935 of FTD returns to contact 936 when FTD is deenergized, thereby deenergizing relay FD to open the circuit for relay FTDA and return the system to the conventional controls.

At intermediate floors stops are timed and if they exceed a predetermined interval the car is set to by-pass thereby enabling other cars to respond to hall calls at that floor. Relay MGF at line 297 of FIG. XIX defines the stopping time of its car at intermediate floors as defined by the interval that advance motor relay back contacts AMR are closed at line 291. While the car is in service contacts OE at line 297 are closed, and if it is away from the terminal landings contacts MGA and MG1 are closed at line 297 and contacts CL4 are closed at line 291, to place the relay solely under the control of contact AMR whereby it is energized only when the advance motor is stopped.

In addition to the stop time controlled functions for measuring traffic level and influencing dispatch conditions offered by relay MGF it also energizes failure timer relay FT by closing contacts MGF at line 260. Relay FT is operative only under automatic operation with attendant throwover contacts TO closed. When relay FT has been energized for its timing interval, it shifts its contactor 940 from contacts 942 to contact 943 at line 257. This energizes failure relay F which seals itself in through contact F at line 256. Relay F opens its back contact at line 241 in the by-pass relay BP circuit and alters its contacts in the flasher control circuit of FIG. XVIII to initiate the flashing of by-pass lamp 679 at line 271 by opening the back contacts F shunting the flasher and closing the contacts F in series therewith at line 270.

Should a general power failure occur in the system all motor-generator sets will shutdown. Reestablishment of power will introduce the cars into the operating system in succession. Thus, all paths between leads X and Z of FIG. VII will open if no power is available. After a power failure CL4 is deenergized under all programs since relay EM cannot be energized until the set is running and contacts LR at line 167 are closed to close contacts EM at line 26. Therefore, back contacts CL4 at line 2 are closed to permit the completion of a circuit from lead X to lead Z at line 2 through up load car relay contacts CUL and contacts CL4. As the bottom dispatch timer filament heats up, which may require of the order of 7 or 8 seconds, contacts J0 at line 1 will be closed since the anode-cathode current in pentode 908 even at minimum control grid voltages is sufficient to pull in relay J0 once the timer is operative. When contacts J0 close, the next up car has its motor-generator set started since its contacts CUN are closed to complete the circuit between leads X and Z. In this fashion all cars at the lower terminal will have their sets started in succession as they become the next car.

Cars at the upper terminal have their sets started in sequence under control of the down dispatching circuit by the closure of their contacts CDD at line 8. Thus at the instant power was restored a car at the top would be given a load assignment although it could not have its set started until its dispatch interval had expired to energize its CDD relay. Cars at the intermediate floors when the power fails are started in sequence with the down dispatcher through their contacts CDD at line 8 by establishing conditions in their control circuits corresponding to those which exist when they are at the top terminal.

A simulated top terminal position for a car at an intermediate floor is established by energizing its top dispatching floor relay MG1. Since the car is not at the bottom terminal its contact MG at line 211 is closed. With its set shut down the motor-generator start relay contacts LSA is closed at line 211. This series circuit by-passes brush 653 and floor selector contact 655 to cause relay MG1 to operate as though the car were at the top terminal. Relay MG1 would introduce the car to the selection and dispatch circuits for the top terminal so that the car would be selected and dispatched in turn. As the relay CDD for the car is energized and the motor-generator set is started, the car's relay LSA is operated opening back contact LSA at line 211. Since the car is not yet set to run, relay MG1 must be held in until it is. A holding circuit is provided by contacts CDD and back contacts EM at line 210 until the motor generator set run relay LR is energized at line 151 to close its contact at line 167 and energize emergency relay EM at line 165. When relay EM pulls in, it opens its back contact at line 210 to restore the car position sensing circuit to the exclusive control of brush 653.

Certain aspects concerning the utilization of stop time to influence elevator operation and particular means for effecting control functions in response to stop time are disclosed and claimed in copending patent application for "Elevator Controls" which was filed Feb. 21, 1957, in the names of Joseph H. Borden and Raymond A. Burgy assigned Ser. No. 641,693, now Patent 2,889,010 issued June 2, 1959.

It is to be appreciated that no invention disclosed herein is to be interpreted as limited to the specific form of elevator system illustrated and that the present disclosure is to be read as illustrative of but one utilization of the invention and not in a limiting sense.

Having described the invention, I claim:

1. An elevator system comprising a car, a plurality of landings served by said car while traveling upward and downward, a source of current, a first and second capacitance connected in series across said source, a first and second resistance connected in series across said source, a connection between the junction of said capacitances and the junction of said resistances, means to alter the resistance across said first capacitance during stop time for upward car travel, means to alter the resistance across said second capacitance during stop time for downward car travel, and means responsive to the voltage across one of said capacitances for altering the mode of operation of said system.

2. An elevator system comprising a plurality of cars, a plurality of landings served by said cars while traveling upward and downward, a source of current, a first and second capacitance connected in series across said source, a first and second resistance connected in series across said source, a connection between the junction of said capacitances and the junction of said resistances, a resistance for each of said cars, means for connecting a respective car resistance across said first capacitance during stop time for upward car travel of each car, means for connecting a respective car resistance across said second capacitance during stop time for downward car travel of each car, and means responsive to the voltage across one of said capacitances for altering the mode of operation of said system.

3. An elevator system comprising a car, a plurality of landings served by said car while traveling upward and downward, a source of current, a first and second capacitance connected in series across said source, a first and second resistance connected in series across said source, a connection between the junction of said capacitances and the junction of said resistances, means to alter the resistance across said first capacitance as a function of the level of a first service requirement, means to alter the resistance across said second capacitance as a function of the level of a second service requirement, and means responsive to the voltage across one of said capacitances for altering the mode of operation of said system.

4. An elevator system comprising a plurality of cars, a plurality of landings served by said cars, a dispatching landing for said cars, a dispatcher for issuing starting signals to a selected car at said dispatching landing, means for selectively assigning individual cars to control of said dispatcher, means enabling said assigning means in response to the response of a car to a dispatcher signal, means barring operation of said enabling means in response to a predetermined service requirement, and means responsive upon registration of a demand for service at said dispatching landing while said predetermined service requirement prevails and the assigned car is absent from said landing for effecting the assignment of a second car to control of said dispatcher.

5. An elevator system comprising a plurality of cars, a motor-generator for each car, a plurality of landings served by said cars, a dispatching landing, means for dispatching cars from said dispatching landing, means for assigning a selected car at said dispatching landing to a load status subject to control by said dispatching means, means for measuring the level of service requirements on the system, means for maintaining said cars at said dispatching landing with their doors closed in response to a predetermined service requirement, means for shutting down said motor-generator set for an individual car in response to a predetermined service requirement while said car is at the dispatching landing, means for transferring the load status assignment from a car having its motor-generator shutdown to a car returning to said dispatching landing, means effective while a car is away from said dispatching landing for maintaining open the doors of a load status car which have not been closed at said dispatching landing, and means for reclosing the doors of a load status car when the remaining cars of the system are at said dispatching terminal with their doors closed, whereby service tends to concentrate in said load status car and load status assignment is to the last car at the dispatching terminal having its motor-generator set running.

6. An elevator system comprising a plurality of cars, a plurality of landings served by the cars, a landing for each car from which it is dispatched, means for defining a dispatch interval, means for issuing dispatch signals responsive to the termination of a dispatch interval, means to initiate a dispatch interval in response to the issuance of a dispatch signal, means to cancel an incomplete dispatch interval in response to the response of a car to a preceding dispatch signal, and means to initiate a dispatch interval in response to the response of a car to a preceding dispatch signal.

7. An elevator system comprising a plurality of cars, a plurality of landings, a landing for each car from which it is dispatched, means for defining a dispatch interval, means for issuing dispatch signals responsive to the termination of a dispatch interval, means for initiating a dispatch interval in response to the issuance of a dispatch signal, and means for canceling an incomplete dispatch interval and for reinitiating a dispatch interval in response to the departure of a car from its dispatching landing.

8. An elevator system comprising a plurality of cars, a plurality of landings served by the cars, a landing for each car from which it is dispatched, means for defining dispatch intervals, means for issuing a dispatch signal to a car at its dispatch landing at the end of a dispatch interval, means to initiate a dispatch interval in response to the issuance of a dispatch signal, means at a given position in the path of travel of a car for sensing car travel in a given direction to that position, means to cancel a dispatch interval in response to the car travel sensing means, and means to initiate a dispatch interval in response to the car travel sensing means.

9. In a control for an elevator system including a plurality of cars serving a plurality of landings, means for each car for defining quantities which are a function of the time intervals said car is stopped at landings, means for integrating said defined quantities for cars which are active in said system, means for establishing a given mode of operation for said active cars in said system in response to a predetermined level of said integrated quantities, a landing from which each car is dispatched, and a dispatch interval timer for establishing intervals between the issuance of dispatch signals to said cars when located at their dispatch landing, said integrating means integrating said quantities for the stopping intervals of cars at landings other than their dispatch landing, and said operating mode establishing means altering the interval between the issuance of dispatch signals to said cars in response to a predetermined level of said integrated quantities.

10. In a control for an elevator system including a plurality of cars serving a plurality of landings, means for each car for defining quantities which are a function of the time intervals said car is stopped at landings, means for integrating said defined quantities for cars which are active in said system, means for establishing a given mode of operation for said active cars in said system in response to a predetermined level of said integrated quantities, means to park each car at at least one landing and means to exclude from said integrated quantities any quantity which is a function of the time interval a car is stopped at its parking landing.

11. In an elevator system, a plurality of cars each serving a plurality of landings including a dispatch landing, a dispatcher for issuing dispatch signals to said cars, means for individually assigning said cars to the control of said dispatcher, means for issuing a start signal to an assigned car in response to a dispatch signal, means for releasing assignment of a car from control of said dispatcher following issuance of a dispatch signal, selectively actuated means to retain assignment of a car following issuance of a dispatch signal, selectively actuated means to bar further assignment of cars by said car assigning means following issuance of a dispatch signal, and first means responsive to a first system service requirement below a predetermined level for instituting the operation of said assignment retention means and means to bar further assignment whereby service tends to be concentrated in said car for which assignment is retained.

12. A combination according to claim 11 including second means responsive to a second system service requirement during the response of said first means for disabling said first means whereby said second service requirement can be accommodated by an additional elevator car.

13. A combination according to claim 12 wherein said second means is responsive to a predetermined call for service.

14. A combination according to claim 12 wherein said second means is responsive to a given demand for service at the end of a given interval following the issuance of the start signal to said car for which assignment is retained.

References Cited

UNITED STATES PATENTS

| | | | |
|---|---|---|---|
| 2,313,955 | 3/1943 | Martin et al. | 187—29 |
| 2,492,010 | 12/1949 | Santini | 187—29 |
| 2,597,506 | 5/1952 | Keiper et al. | 187—29 |
| 2,619,592 | 11/1952 | Paulson et al. | 187—29 X |
| 2,621,759 | 12/1952 | Esselman | 187—29 |
| 2,699,226 | 1/1955 | Bruns | 187—29 |
| 2,717,056 | 9/1955 | Santini et al. | 187—29 |
| 2,718,935 | 9/1955 | Eames | 187—29 |
| 2,740,496 | 4/1956 | Santini et al. | 187—29 |
| 2,761,528 | 9/1956 | Glaser et al. | 187—29 |
| 2,776,731 | 1/1957 | Savino et al. | 187—29 |
| 2,785,771 | 3/1957 | Santini et al. | 187—29 |
| 2,785,772 | 3/1957 | Santini | 187—29 |
| 2,795,296 | 6/1957 | Suozzo | 187—29 |
| 2,801,710 | 8/1957 | Keiper | 187—29 |
| 2,833,376 | 5/1958 | Burgy | 187—29 |
| 2,841,248 | 7/1958 | Pfister | 187—29 |
| 2,889,010 | 6/1959 | Borden et al. | 187—29 |
| 2,924,298 | 2/1960 | Marcredis | 187—29 |
| 3,009,543 | 11/1961 | Burgy | 187—29 |
| 3,026,971 | 3/1962 | Dinning | 187—29 |
| 3,065,823 | 11/1962 | Burgy | 187—29 |

FOREIGN PATENTS 732,754    6/1955    Great Britain.

ORIS L. RADER, *Primary Examiner.*

MILTON O. HIRSHFIELD, *Examiner.*

G. G. JENSEN, T. LYNCH, *Assistant Examiners.*